(12) United States Patent
Kostrzewski et al.

(10) Patent No.: US 7,317,814 B2
(45) Date of Patent: Jan. 8, 2008

(54) AUTHENTICATION SYSTEM AND METHOD

(75) Inventors: Andrew A. Kostrzewski, Garden Grove, CA (US); Gajendra D. Savant, Rancho Palos Verdes, CA (US); Tomasz P. Jannson, Torrance, CA (US); Joanna L. Jannson, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 539 days.

(21) Appl. No.: 10/724,552

(22) Filed: Nov. 28, 2003

(65) Prior Publication Data
US 2004/0101168 A1 May 27, 2004

Related U.S. Application Data

(62) Division of application No. 09/377,257, filed on Aug. 19, 1999, now Pat. No. 6,744,909.

(51) Int. Cl.
*G06K 9/00* (2006.01)
(52) U.S. Cl. .................. 382/115; 382/211; 382/278; 359/11; 356/300
(58) Field of Classification Search ............ 382/115, 382/116, 124, 211, 210, 278, 156, 212, 218; 359/11, 3, 29, 15, 561, 368, 125, 559, 558, 359/34, 577; 369/112.01; 356/71, 301, 356/300, 347
See application file for complete search history.

(56) References Cited

U.S. PATENT DOCUMENTS

| 4,073,010 | A |   | 2/1978  | Casasent et al. ........... 364/822 |
| 4,084,255 | A |   | 4/1978  | Casasent et al. ........... 364/822 |
| 4,210,899 | A |   | 7/1980  | Swonger et al. ...... 340/146.3 E |
| 4,308,521 | A |   | 12/1981 | Casasent et al. ...... 340/146.3 P |
| 4,359,259 | A |   | 11/1982 | Horner et al. ............... 350/3.7 |
| 4,429,954 | A |   | 2/1984  | Caulfield et al. .......... 350/3.64 |
| 4,558,951 | A |   | 12/1985 | Ludman et al. ............. 356/346 |
| 4,588,260 | A | * | 5/1986  | Horner ....................... 359/29 |

(Continued)

*Primary Examiner*—Sheela Chawan
(74) *Attorney, Agent, or Firm*—Leonard Tachner

(57) ABSTRACT

An authentication system using a correlator that correlates an input with a reference wherein at least one of the input and reference comprises a phase volume mask having structures, preferably points, that are each less than about six microns in size and can have an aspect ratio (AR) greater than 1:1 so as to produce a phase encoded random pattern having millions of combinations in a mask that is as small as one square millimeter. The random pattern can be convolved with a second pattern, such as a biometric pattern, to produce a phase convolved mask. The correlator preferably is a nonlinear joint transform correlator that can use "chirp" encoding to permit the input to be located in a different plane than the reference. The correlator optically Fourier transforms images of the reference and input that are thereafter nonlinearly transformed and inverse Fourier transformed by a processor to determine the presence or absence of a correlation spike indicative of authenticity. A spatial light modulator (SLM) can be used as an input or reference and preferably is a liquid crystal panel having pixels or elements whose phase or grey scale intensity can be selectively controlled by a processor. The SLM can be used to display a biometric pattern, preferably scanned in real time from a person, that is correlated against an input or reference that can comprise a label on a card, a tag, or another object.

14 Claims, 25 Drawing Sheets

U.S. PATENT DOCUMENTS

| | | | |
|---|---|---|---|
| 4,651,297 A | 3/1987 | Schlunt | 364/822 |
| 4,765,714 A | 8/1988 | Horner et al. | 350/162.13 |
| 4,813,761 A | 3/1989 | Davis et al. | 350/162.15 |
| 4,826,285 A | 5/1989 | Horner | 350/162.13 |
| 4,832,447 A | 5/1989 | Javidi | 350/162.13 |
| 4,838,630 A | 6/1989 | Jannson et al. | 350/3.7 |
| 4,898,450 A | 2/1990 | Jannson et al. | 350/96.21 |
| 4,926,412 A | 5/1990 | Jannson et al. | 350/3 |
| 4,958,892 A | 9/1990 | Jannson et al. | 350/3.6 |
| 4,969,189 A | 11/1990 | Ohta et al. | 380/25 |
| 5,016,976 A | 5/1991 | Horner et al. | 350/162.13 |
| 5,018,814 A | 5/1991 | Jannson et al. | 350/96.15 |
| 5,024,508 A | 6/1991 | Horner | 350/162.13 |
| 5,026,131 A | 6/1991 | Jannson et al. | 350/3.7 |
| 5,040,140 A | 8/1991 | Horner | 364/822 |
| 5,055,383 A | 10/1991 | Koblinger et al. | 430/312 |
| 5,056,039 A | 10/1991 | Caulfield | 364/513 |
| 5,067,788 A | 11/1991 | Jannson et al. | 385/2 |
| 5,073,006 A | 12/1991 | Horner et al. | 359/561 |
| 5,083,219 A | 1/1992 | Jannson et al. | 359/1 |
| 5,095,194 A | 3/1992 | Barbanell | 235/379 |
| 5,111,515 A | 5/1992 | Javidi | 382/43 |
| 5,119,443 A | 6/1992 | Javidi et al. | 382/42 |
| 5,132,813 A | 7/1992 | Caulfield et al. | 359/11 |
| 5,148,316 A | 9/1992 | Horner et al. | 359/561 |
| 5,153,670 A | 10/1992 | Jannson et al. | 356/301 |
| 5,193,114 A | 3/1993 | Moseley | 380/23 |
| 5,221,957 A | 6/1993 | Jannson et al. | 356/301 |
| 5,230,969 A | 7/1993 | Savant et al. | 430/2 |
| 5,239,595 A | 8/1993 | Takemura et al. | 382/31 |
| 5,245,404 A | 9/1993 | Jannson et al. | 356/301 |
| 5,260,826 A | 11/1993 | Wu | 359/368 |
| 5,276,537 A | 1/1994 | Savant et al. | 359/3 |
| 5,276,636 A | 1/1994 | Cohn | 364/822 |
| 5,278,687 A | 1/1994 | Jannson et al. | 359/125 |
| 5,293,272 A | 3/1994 | Jannson et al. | 359/1 |
| 5,305,123 A | 4/1994 | Sadovnik et al. | 359/4 |
| 5,339,305 A | 8/1994 | Curtis et al. | 369/112 |
| 5,365,354 A | 11/1994 | Jannson et al. | 359/15 |
| 5,367,579 A | 11/1994 | Javidi et al. | 382/31 |
| 5,384,221 A | 1/1995 | Savant et al. | 430/19 |
| 5,411,824 A | 5/1995 | Vasudev et al. | 430/5 |
| 5,438,439 A | 8/1995 | Mok et al. | 359/10 |
| 5,438,632 A | 8/1995 | Horner | 382/278 |
| 5,461,475 A | 10/1995 | Lerner et al. | 356/300 |
| 5,467,403 A | 11/1995 | Fishbine et al. | 382/116 |
| 5,472,811 A | 12/1995 | Vasudev et al. | 430/5 |
| 5,485,277 A | 1/1996 | Foster | 356/445 |
| 5,485,312 A | 1/1996 | Horner et al. | 359/561 |
| 5,493,444 A | 2/1996 | Khoury et al. | 359/559 |
| 5,497,430 A | 3/1996 | Sadovnik et al. | 382/156 |
| 5,515,184 A | 5/1996 | Caulfield et al. | 359/34 |
| 5,534,386 A | 7/1996 | Peterson et al. | 430/320 |
| 5,572,228 A | 11/1996 | Manasson et al. | 343/785 |
| 5,598,485 A | 1/1997 | Kobayashi et al. | 382/278 |
| 5,604,634 A | 2/1997 | Khoury et al. | 359/559 |
| 5,609,939 A | 3/1997 | Peterson et al. | 428/141 |
| 5,623,552 A | 4/1997 | Lane | 382/124 |
| 5,629,996 A | 5/1997 | Rizkin et al. | 385/31 |
| 5,631,754 A | 5/1997 | Jannson et al. | 349/64 |
| 5,660,181 A | 8/1997 | Ho et al. | 128/665 |
| 5,668,648 A * | 9/1997 | Saito et al. | 359/9 |
| 5,712,912 A | 1/1998 | Tomko et al. | 380/23 |
| 5,721,630 A | 2/1998 | Horner et al. | 359/15 |
| 5,735,988 A | 4/1998 | Chau et al. | 156/209 |
| 5,743,633 A | 4/1998 | Chau et al. | 632/331 |
| 5,764,317 A | 6/1998 | Sadovnik et al. | 349/5 |
| 5,815,124 A | 9/1998 | Manasson et al. | 343/785 |
| 5,815,597 A | 9/1998 | Horner et al. | 382/211 |
| 5,815,598 A | 9/1998 | Hara et al. | 382/211 |
| 5,835,212 A | 11/1998 | Kissa et al. | 356/345 |
| 5,838,403 A | 11/1998 | Jannson et al. | 346/65 |
| 5,841,489 A | 11/1998 | Yoshida et al. | 349/17 |
| 5,841,907 A | 11/1998 | Javidi et al. | 382/210 |
| 5,854,697 A | 12/1998 | Caulfield et al. | 359/34 |
| 5,869,822 A | 2/1999 | Meadows, II et al. | 235/380 |
| 5,878,157 A | 3/1999 | Mukohzaka | 382/124 |
| 5,886,675 A | 3/1999 | Aye et al. | 345/7 |
| 5,892,597 A | 4/1999 | Iwata et al. | 359/11 |
| 5,903,390 A | 5/1999 | Kane et al. | 359/561 |
| 5,903,648 A | 5/1999 | Javidi | 380/10 |
| 5,920,058 A | 7/1999 | Weber et al. | 235/457 |
| 5,922,238 A | 7/1999 | Savant et al. | 252/1 |
| 5,926,555 A | 7/1999 | Ort et al. | 382/124 |
| 5,933,515 A * | 8/1999 | Pu et al. | 382/124 |
| 5,952,128 A | 9/1999 | Isao et al. | 430/5 |
| 5,956,106 A | 9/1999 | Peterson et al. | 349/64 |
| 5,959,747 A | 9/1999 | Psaltis et al. | 359/22 |
| 6,185,319 B1 * | 2/2001 | Fujiwara | 382/127 |
| 6,229,906 B1 * | 5/2001 | Pu et al. | 382/116 |
| 6,424,729 B1 * | 7/2002 | Soon | 382/124 |

* cited by examiner

AUTHENTICATION SYSTEM AND METHOD

CROSS-RELATED APPLICATIONS

This application is a divisional of U.S. application Ser. No. 09/377,257 filed Aug. 19, 1999 now U.S. Pat. No. 6,744,909 .

FIELD OF THE INVENTION

The present invention relates to a system for determining whether a person or thing is authentic and more particularly to an authentication system where an input is compared against a reference by an optical correlator to determine whether the input is authentic.

BACKGROUND OF THE INVENTION

Counterfeiting of money, banknotes, stock certificates, bond certificates, debit cards, credit cards, identification cards, social security cards, health insurance cards, immigration documents, transit passes, visas, auto parts, aircraft components, software, computer chips, consumer goods, to name simply a few, cost individuals, businesses, organizations, and countries billions of dollars each year. Similarly, fraud committed by people using a fake identity or the identity of another has become increasingly costly and burdensome to society.

Many technologies have been developed in response to such counterfeiting and fraud. Examples of such technologies include bar codes, magnetic strips encoded with authentication information, electronic "smart" cards having embedded integrated circuits that store authentication information, laser cards, and holograms. However, bar codes can easily be scanned and replicated using even the most rudimentary scanning and printing equipment. While more secure, magnetic strip readers and encoders are readily available and magnetic strip controls can be easily forged.

While "smart" cards are very sophisticated, their technology can also be copied. For example, their authentication information is an electronic key contained within the card that can always be broken because these cards are based on standard microcontrollers, typically of 8-bit construction, that can be reprogrammed. In addition, generic reprogrammable cards are widely available and can be used to mimic the performance of any "smart" card.

Laser cards suffer from similar, if not worse, drawbacks. This is because laser cards rely on technology virtually identical to the technology used to make compact discs. Thus, a laser can be used to scan the encoded surface of the card to record the key and any other authentication information that later can be easily replicated on blank laser cards.

Holograms on labels are affixed to goods, cards, tags, and other articles to provide a visual indication of authenticity. For example, holograms are commonly applied to credit cards and clothing tags so that a merchant will know by looking at the hologram that a card or article of clothing used in a purchase is not counterfeit.

Unfortunately, modern technology has rendered holograms relatively easy to copy and mass produce primarily because holograms possess limited information and are comprised of embossed surface structures. The use of redundant information dramatically decreases the complexity and security of a hologram because it decreases the amount of information stored. This is because thermal embossing techniques used to produce holograms limit the depth of their structure essentially to the surface of the label. Such thermal embossing techniques cannot produce a much more sophisticated hologram because the label material is made of many different moieties and thermal distortion during embossing limits the depth of the structure that can be embossed essentially to the surface. As a result, digital scanners and holographic copying machines can be used to scan a hologram and mass produce it rendering its security effectively meaningless. Also, the holograph embossed into the label can be hardened and then used as a pseudomaster for use in duplicating the hologram in a standard holographic copier.

Finally, since authentication of holograms is done visually, there is no statistically reliable method of verifying its authenticity. As a result, even counterfeit holograms of poor quality may pass visual inspection by a merchant. As a result of these many drawbacks it is obvious why holograms have become less and less useful as a deterrent to counterfeiting.

What is needed is a method of authentication that cannot be easily copied or replicated by a counterfeiter. What is preferably needed is an authentication method that is impossible to copy or replicate. What is also needed is a label or applique' that can be replicated with high aspect two-dimensional or volume surface structures that can extend below its surface so as to more securely store authentication information. What is still further needed is a label or applique' that masks the authentication information to make it difficult, if not impossible, to copy. What is also needed is a label or applique' having these characteristics that is read by a reader that positively verifies its authenticity. What is still also needed is such a label or applique' that can record either or both key authentication information and biometric authentication information.

SUMMARY OF THE INVENTION

An authentication system and method using an input and a reference each having a pattern made up of a plurality of pairs of phase structures that each have a size smaller than six microns and can have a size smaller than about one micron so as to make the input and reference difficult, if not virtually impossible, to copy. Either the input or the reference, or both, are comprised of phase volume masks that have the structures phase encoded or replicated therein. The authentication system includes an optical correlator that is coupled by an energy recording device to a computer that preferably includes a digital signal processing engine made up of one or more processors.

The pattern is a random pattern that preferably is a stochastic random pattern. The pattern can also include a predetermined pattern, such as a biometric pattern, that is convolved or otherwise integrated with the random pattern to scramble and hide the predetermined pattern and produce a phase convolved volume mask. Preferably, the mask can be constructed such that the pattern, whether phase convolved or not, is invisible or substantially invisible to the naked eye.

The mask preferably is of laminate construction such that the phase structures are covered by a protective filler that also impedes the transmission of short wavelength radiation, particularly X-ray radiation, to make the mask more secure. A protective layer of a relatively hard material preferably is disposed between the filler and each of the structures and serves to further protect the structures while being capable of making them optically distinct. Where the mask is for a transmission-mode correlator, the protective layer is transparent. Where the mask is for a reflective-mode correlator, the protective layer is opaque and can even be reflective.

The mask can be replicated using a master or a submaster made from the master. The master is made using a recording medium that preferably is a photosensitive material. Light from a light source, preferably a laser, is directed through an aperture containing the master pattern, such as a diffuser or another mask, onto the recording medium. To produce such small phase structures, the size of the aperture is selected to be as small as possible, preferably no more than a few millimeters, relative to the surface area of the recording medium and the master pattern is spaced a distance from the recording medium. By this novel recording arrangement, a diffuser or another mask having phase structures larger than six microns and having an aspect ratio less than 1:1 can be used to record a master having a pattern of phase structures in the recording medium that can be each smaller than six microns and can have an aspect ratio (AR) greater than 1:1, typically greater than about 2:1 and preferably greater than 10:1 or more. Preferably, each structure can have an AR greater than the above recited values and in any given phase volume mask input or reference, at least a plurality of pairs of structures have an AR greater than 1:1.

Where the mask is a phase convolved mask, the recording arrangement is similar with the exception that another mask containing the predetermined pattern, i.e. an information mask, is placed adjacent another mask containing the random pattern, i.e. a scrambler mask. The spacing between the aperture and the recording medium is selected so as to Fresnel transform the predetermined pattern and the random pattern such that they convolve together.

The master is therefore a key that can be used to directly replicate phase volume masks, some of which are used as references and others of which are used as inputs. The master can be used to construct submasters made of a metallic replica mounted to a substrate.

In turn, the submaster can be used to replicate by embossing or stamping the replica into a replicating material that has a relatively uniform molecular weight distribution so as to be able to reproduce the structures that are less than six microns in size and which can be of submicron size. Such a replicating material preferably is comprised of molecules that have a molecular weight that provides high homogeneity. The molecule of the replicating material is a polymer that preferably has one or more of the following structures: relatively long polymer chains for better thermal stability and integrity, ester and carboxyl groups to provide controlled cross-linking and high sensitivity, carbon chains having a saturated carbon for good rigidity and uniformity, alkene functional groups for minimizing shrinkage to maintain the integrity of structures of submicron size, and benzyl functional groups for providing rigidity and structural stability. One preferred replicating material is polyvinylcinnamate that is comprised of cinnamoyl chloride and polyvinyl alcohol that preferably has entrapped water molecules that function as plasticizers for prolonged mask life.

If desired, the master can be used to replicate masks by an adhesive replication process. In one preferred process, the master or a diffuser can be used to directly replicate masks. A drop of adhesive that preferably is ultraviolet light-curable is placed on a prepared portion of a substrate. The master or diffuser is placed over the adhesive such that the structures of the master or diffuser are brought into contact with the adhesive. Pressure, preferably from a roller, is applied to urge the adhesive into the voids between the structures of the master or diffuser and to squeeze out excess adhesive. Excess adhesive is wiped away before the adhesive between the substrate and master/diffuser is cured. After sufficient curing, the master or diffuser is peeled away and the formed adhesive is left to post-cure.

The correlator includes a light source, an aperture window arrangement that spaces the input and reference apart, a Fourier transform lens, and the energy recording device. Light from the source illuminates the input and reference producing pattern images that are Fourier transformed by the lens to produce a joint power spectrum at the output plane of the lens that has interference fringes.

The interference fringes are recorded by the energy recording device and the resultant image is electronically captured by a capturing device that preferably is a frame grabber. The image is processed by the computer preferably by first nonlinearly transforming the image before an inverse Fourier transform is performed. Such a correlator is a nonlinear joint transform correlator.

Where the input and the reference lie on different planes, such as where the input is carried by a box or other object remote from and exteriorly of the correlator, a quadratic term, i.e. a chirp, is encoded in the resultant image. This quadratic term is resolved by determining the two planes in which the quadratic phase modulation is zero to thereby locate the planes where the critical cross-correlation terms appear. Once the planes are located, the cross-correlation terms are ascertained and then used to determine the presence or absence of the correlation spot or spike.

To produce a correlator that is invariant to rotation, i.e. invariant to the case where the input is rotated relative to the reference, a circular correlation is performed. To produce a correlator that is invariant to illumination, the electronic image of the joint power spectrum containing the interference fringes is nonlinearly thresholded.

In one preferred correlator embodiment, either or both the reference and the input can comprise a spatial light modulator (SLM) that preferably is a liquid crystal panel having an array of pixel phase elements, each of whose phase can be selectively varied. The SLM is operably connected to a computer that can be in communication with a database of phase patterns that can be quickly downloaded to the SLM for comparison with inputs or references of many different kinds, classes or families.

Where the input is a phase convolved mask and the reference is an SLM, the computer can download to the SLM reference the random pattern, i.e. the scrambler mask, as well as the predetermined pattern, i.e. the information mask, that are both displayed by the SLM. If desired, the SLM can be coupled to a scanner that can scan, in real time if desired, a pattern that is used as the predetermined pattern or information mask. In this instance, the random pattern or scrambler mask is downloaded to the SLM from the computer. Such a scanner can comprise, for example, a scanner that scans biometric information of a person, such as a fingerprint, facial image, voiceprint, retina pattern, iris pattern or the like.

In another preferred correlator embodiment, the correlator is equipped with an optical scanner assembly that directs a portion of the light from the source onto an input that can comprise a phase volume mask that is part of a label on an object that can be a tag, label, box, or the product itself. As a result, the input is located on a plane different than that of the reference. Light in the form an image or pattern is reflected from the input returns to the scanner assembly where it is correlated with that of the reference to determine whether the input is authentic.

In a still another correlator embodiment, the computer controls access through a door depending upon whether the input is authentic or not. A door opening device is operably connected to the computer. Opening of the door is prevented if the input is not authentic and is permitted if the input is authentic.

In one preferred compact correlator embodiment, the correlator has a housing preferably of block construction with a light tunnel that preferably is generally U-shaped. The light source is disposed at or adjacent one end of a first leg of the tunnel and directs light toward a pair of aperture windows at the opposite end of the leg that hold and space apart the input and reference. A collimating lens and beam splitter are disposed between the light source and the aperture windows. The images reflected from the input and mask is directed through a Fourier lens in a middle leg of the tunnel toward a mirror that reflects the images the recording device, located at or adjacent one end of a third light tunnel leg.

In another preferred compact correlator embodiment, the light source is located onboard the housing and inboard of the other components of the correlator including a parabolic mirror that directs light from the source toward the aperture windows to illuminate the input and reference. The light source preferably is acutely disposed relative to the mirror at an angle between about 30° and about 60° that preferably is about 45°. The recording device preferably is located on-board the correlator housing.

In a still further preferred compact correlator embodiment, the light source and recording device are both located on-board the housing with the light source disposed generally transverse to the recording device.

Objects, features and advantages of the present invention include a correlator of compact and low cost construction that is well suited for commercial use, that uses a high-aspect ratio surface relief phase or volume mask that is highly secure in that it cannot be easily copied, that uses such a mask that can be quickly and easily recorded and which can be cheaply replicated in mass quantities as labels that can be quickly and easily applied to cards, tags and other objects; that uses masks that are resilient, durable, rugged, and long-lasting; that can use real-time biometric information to verify the authenticity of the input; which is versatile in that it can correlate an input that is located in a different plane than that of the reference or which is rotated relative to that of the reference; and which is a correlator that is flexible, rugged, durable, resilient, lightweight, and quick and easy to manufacture.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

At least one preferred exemplary embodiment of the invention is illustrated in the accompanying drawings in which like reference numerals represent like parts throughout and in which.

DETAILED DESCRIPTION OF THE INVENTION

I. Introduction

Figure 1:
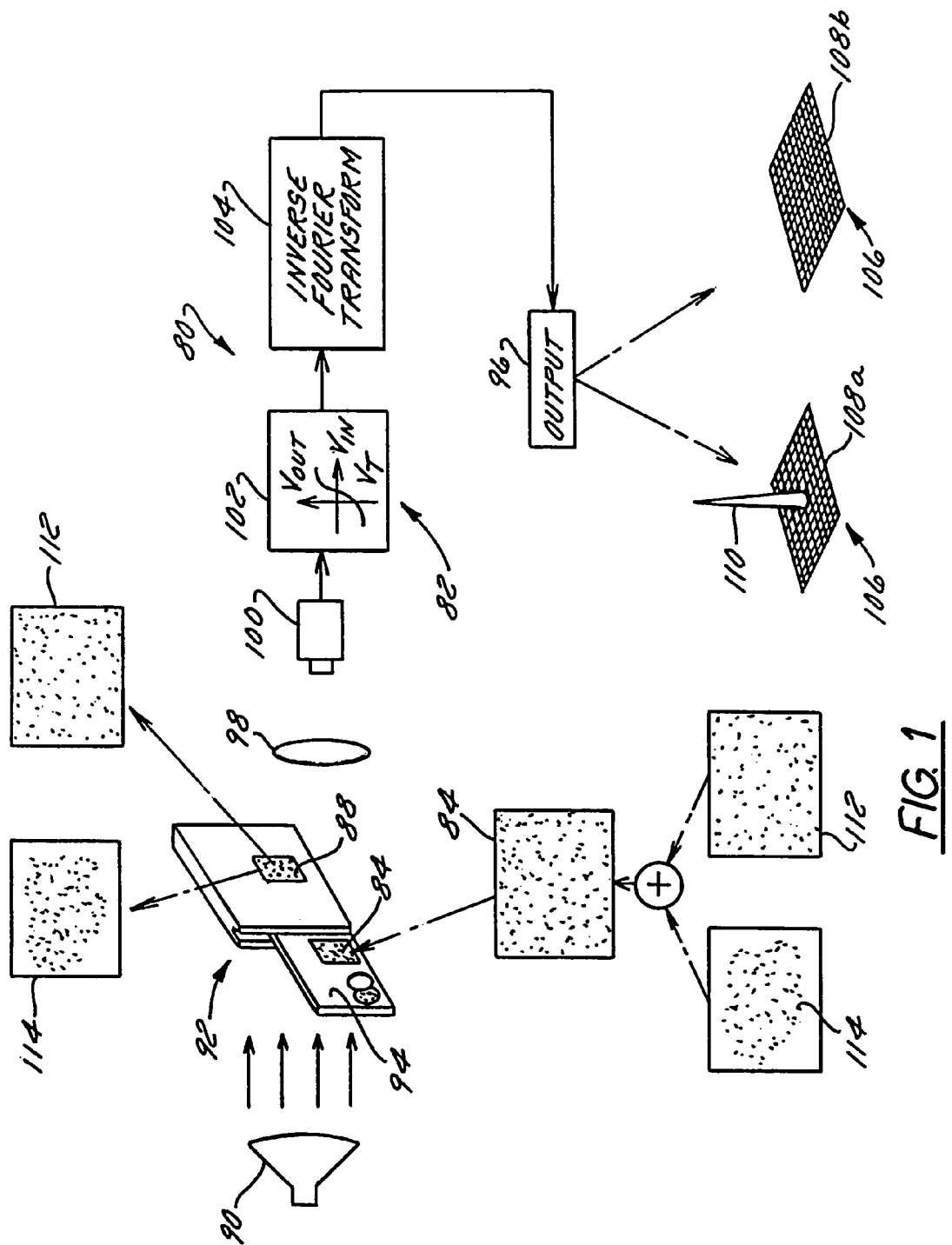
FIG. 1 a schematic of a generic correlator for correlating an input that can be a surface relief phase mask or a phase volume mask against a reference that can also be a phase volume mask to determine whether the result Fourier transformed joint power spectrum has or lacks a correlation spot that is spike-like upon the spectrum being nonlinearly and inverse Fourier transformed.

FIG. 1 illustrates an authentication system 80 of this invention that uses a processor 82 to process a volume phase input mask 84 having high aspect ratio volume phase structures 86 (FIG. 3) within the input mask 84 and compares it against a reference mask 88 to determine whether the input mask 84 is authentic or not. The authentication system 80 includes a light source 90 that is aimed at a target area 92, such as a card reader, where an object 94, such as a card, tag, label or product, carrying the input mask 84 is placed. Examples of other objects 94 to which the label or mask of this invention can be applied include: clothing, explosives, whiskey and other alcohol products, prescription and over-the-counter drugs, sporting goods, shoes, automobile parts, aircraft parts, computer components such as microprocessors, software, pre-recorded movie cassettes, compact discs, money, stock certificates, financial records, and bank notes.

Light from the source 90 illuminates both the input mask 84 and the reference mask 88 producing a combined light signal that undergoes at least one transformation, and preferably a plurality of transformations, to produce an output 96 from which it can be readily ascertained whether the input mask 84 is authentic.

Preferably, the combined signal undergoes a Fourier transformation when it passes through a Fourier lens 98 to produce a joint power spectrum that is recorded by an energy recorder 100. Thereafter, a nonlinear transformation 102 preferably is performed by the processor 82, to compensate for nonlinear phase distortions and the like, before the processor 82 performs an inverse Fourier transformation. The output 96 can be in the form of a display 106 that shows an output plane 108a having a characteristic correlation spike or spot 110 if the input mask 84 is authentic or an output plane 108b which lacks the spike or spot if the mask 84 is not authentic. The processor 82 preferably is an optical correlator that preferably is a nonlinear joint transform correlator. So as to be able to read a mask containing millions of submicron volume structures phase encoded in the mask, the correlator 82 of this invention has a resolution better than about six microns and preferably can resolve structures 86 that are one micron or smaller.

Both the input mask 84 and the reference mask 88 comprise a volume mask phase encoded with a complex random pattern 112, preferably a random stochastic pattern, comprised of at least a plurality of pairs of high-aspect ratio volume phase structures 86 that cannot be copied by conventional and state-of-the art copying and replication processes. Because the input mask 84 and the reference mask 88 both can have as many as hundreds of thousands or even millions of these structures 86, each mask 84 and 88 is capable of having millions, if not billions, of different combinations thereby enabling them to function as highly secure anti-counterfeiting keys. Moreover, since each structure 86 preferably is of sub-micron size, the structures 86 cannot easily be seen, much less scanned, recorded, copied or replicated. Finally, because the pattern of encoding the structures 86 is random, it preferably contains no redundancy providing even-greater security. If desired, a second pattern 114 that preferably is a predetermined pattern, such as a pattern containing biometric information or another pattern, can be combined with the random pattern 112 in the mask 84 and/or 88. Finally, one or both masks 84 and 88 can be constructed as a label or applique' that can be easily applied to an object.

These masks 84 and 88, along with the use of the nonlinear joint transform correlator 82, produce an authentication system of this invention that requires both the input mask 84 and the reference mask 88 to have the exact same pre-established complex, highly non-reproducible pattern of phase volume structures 86 for the input mask 84 to be deemed authentic.

II. The Phase Mask

Figure 2:
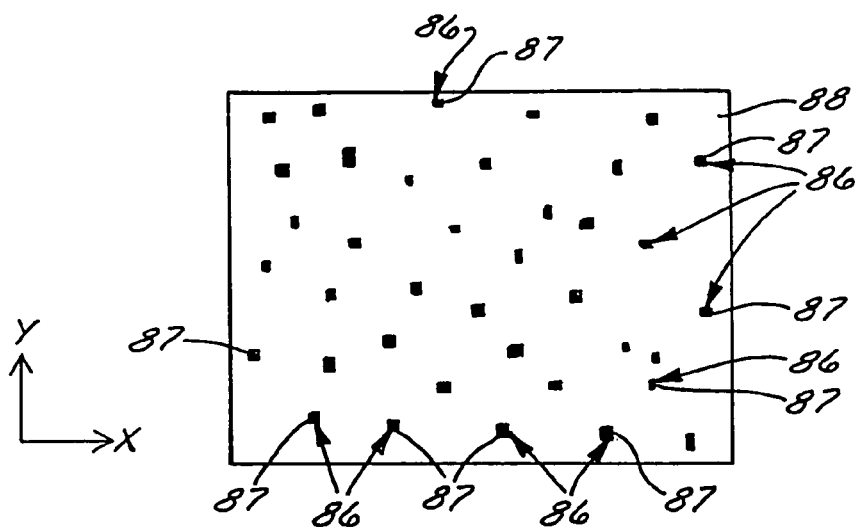
FIG. 2 depicts a simplified random phase pattern of a volume phase mask of the invention.
Figure 3:
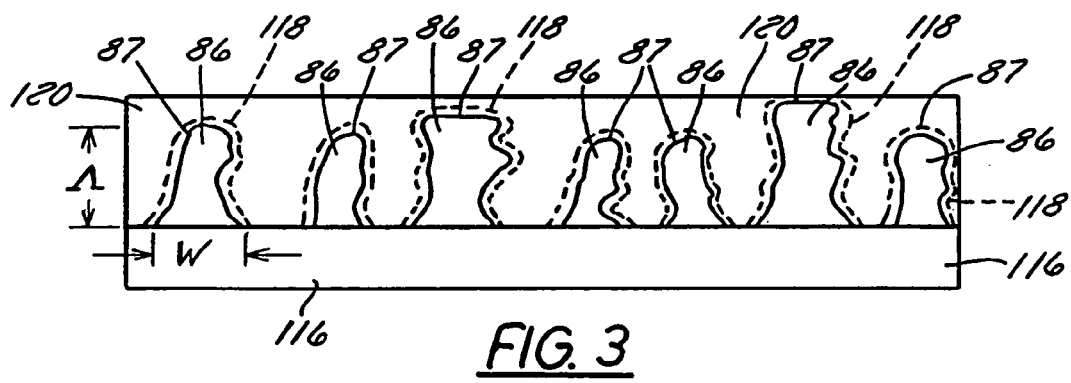
FIG. 3 is a cross section view of the mask depicting its small, high aspect ratio phase structures in an exaggerated manner to enhance clarity.

FIGS. 2 and 3 illustrate a simplified phase mask of this invention where the size of the structures 86 that comprise the pattern are exaggerated for clarity. In its preferred embodiment, the phase mask is a two-dimensional, random phase, volume mask or high-aspect ratio surface relief mask. If desired, the phase mask can be a two-dimensional random volume phase mask. Since the construction of the reference mask 88 is substantially the same as the input mask 84, for sake of simplicity, only the reference mask 88 will be referred to in this section.

The mask 88 shown in FIGS. 2 and 3 has over fifty of the structures 86 that are each located at an x,y point 87 on the mask. In reality, a one centimeter by one centimeter mask of this invention can contain as many as one billion such structures 86 per square centimeter of mask area and preferably contains at least one hundred million structures 86 per square centimeter of mask area. Each of the structures 86 can also provide a different phase within a phase range of between about 0 and about $2\pi$ (full phase modulation).

While structure 86 and point 87 are synonymously used herein, point 87 is used to indicate the top or frontal cross-sectional view of a structure 86 when viewing the structure 86 facing the front surface of the mask. Structure 86, as used herein, refers generally to the entire structure of a single phase element of a phase volume mask.

In FIG. 2, different phases of the structures 86 are represented, for example, by different size black areas. Different phases preferably are created by structures 86 having different indices of refraction, n, such that the refractive index at a particular location of the mask 88 can be represented by the function $n(x,y)$. As the result of a one centimeter square mask 88 containing at least at least one hundred million structures each capable of having a phase of between about 0 (zero) and $2\pi$, over one trillion structure pattern combinations are possible making any single pattern of structures 86 virtually impossible to guess and extremely difficult to break, even by using a computer.

The phase that each structure 86 possesses is dependent upon its height, $\Lambda$, or thickness. For example, where one structure 86 has a height, $\Lambda_1$, that is different than the height, $\Lambda_2$, of another structure 86, the different structures 86 will have different phases even though both structures 86 have the same refractive index, n. Thus, for a structure material of a given refractive index, n, it is the range of possible structure heights that determines the range of possible phases for each structure 86.

Each point 87 of each structure 86 is less than six microns in size while each structure 86 can possess a high aspect ratio (AR) that is greater than at least about 1:1 thereby making the pattern of structures 86 of a mask 88 virtually impossible to copy using conventional copying techniques, such as photoresist-type copying, as well as state-of the art copying techniques such as optical scanning, imaging and holographic copying techniques. Preferably, each structure is of submicron size and is no larger than a few microns. Preferably, the point of each structure 86 is no greater than about one micron in size such that its length and width are no greater than about one micron. It is desired that each structure 86 be no higher than about one micrometer (μm), no wider, at its base, than about one μm, and no longer, at its base, than about one μm to produce a structure that is generally point-shaped or generally pixel-shaped and of submicron root mean square (RMS) dimensions. It is desired that each structure 86 be higher than about 100 nanometers, be wider, at its base, than about 100 nanometers, and be longer, at its base, than about 100 nanometers. The point 87 of each structure 86 preferably is generally round or substantially square or rectangular. As is shown in FIG. 3, each structure 86 preferably can have a different volume than each and every other structure 86. Each structure 86 is a volume or surface relief structure, that has a height, width, and length such that it occupies a volume within the mask 88.

The high AR construction enables a point or location on a mask to be phase encoded with one of at least about 1000 phases while the cross-sectional size of the resultant structure 86 is no greater than at least six microns and preferably is greater than about one micron. The high AR construction is also advantageous because it prevents direct copying using, for example, a pseudomaster copying method, while advantageously minimizing the effect of dirt, dust, scratches and bending on the authentication determination.

Preferably, each structure 86 can be made to have an AR of height, $\Lambda$, to width, w, such that the AR is greater than 1:1, preferably is greater than about 2:1, and which can be as great as about 10:1 to about 20:1 or even greater. In a mask 88 of this invention, the mask 88 preferably has a plurality of pairs of structures 88 each having an AR greater than 2:1 and preferably greater than about 6:1.

The mask 88 of this invention preferably has millions of submicron, high AR, random-phase volume structures 86 to thereby achieve security to the level of maximum entropy which is equivalent to negentropy. By this construction, it is estimated that the probability of guessing the correct structure pattern of a one centimeter square mask 88 is less than one in $10^{28}$. To break the pattern, assuming about one second for each guess, could take as long as 10,000 years using modern computer technology.

To protect the structures 86 and further deter copying, the mask 88 is of laminate construction. Referring to FIG. 3, the structures 86 are preferably carried by a substrate 116 that can be made of the same material as the structures 86. Each of the structures 86 can be cladded with a protective layer 118, shown in FIG. 3 in phantom. A filler 120 is applied over the structures 86 and in the voids between the structures 86.

The substrate 116 preferably is comprised of a plastic, glass, float glass, fused silica, polycarbonate, polystyrene, or another suitable material to which the structures 86 will adhere or be attached. If desired, the structures 86 can be attached to the substrate 116, such as by an adhesive that can be an optical adhesive or the like. If desired, the substrate 116 can comprise the object 94 itself.

Where a transmission-mode correlator is used such that light must completely pass through the mask 88 during the authentication process, the substrate 116 preferably is substantially optically transparent to the wavelength of the light used so it will pass through the substrate 116 with a minimum of absorption. Where a reflection-mode correlator is used such that the light reflects off the mask 88 or mask 84 during the authentication process, the substrate 116 preferably is reflective, at least one the surface of the substrate, at least to the wavelength of light from the source 90. For example, one preferred substrate has a reflectance of at least about 92%.

The filler 120 is disposed in the voids between the structures 86 and preferably also covers the structures 86 to help support and protect the structures 86. Most importantly, the filler 120 securely bonds to the structures 86 or any coating or layer 118 on the structures 86 such that the filler 120 cannot easily be removed without destroying the integrity of some, if not most, of the structures 86 thereby providing a further copy-preventing feature.

The filler 120 is made of a material that is not transparent to short wavelength radiation thereby further enhancing security. More specifically, the filler 120 is made of a material that is not transparent to X-ray radiation and radiation having a wavelength no greater than about 0.12 angstroms to about 18.4 nanometers. Preferably, the filler 120 absorbs substantially all light and other radiation shorter than these wavelengths thus preventing much, if any, of the radiation or light from reaching the structures 86. Preferably, the filler 120 is substantially opaque to X-ray radiation and radiation having a wavelength no greater than about 18.4 nanometers. Preferably, the filler 120 will be damaged by exposure to such radiation, such as by blackening, and will not permit the complete penetration of laser X-rays.

Preferably, the filler 120 prevents X-ray radiation and other short wavelength radiation from successfully passing through the mask or being reflected from the mask. Preferably, the filler 120 is composed of a material that absorbs or otherwise blocks most (e.g., at least 60%) X-ray radiation and other short wavelength radiation. Preferably, the filler 120 blocks at least about 80%.

In contrast, the material of the filler 120 is selected so as to permit longer wavelength light, typically longer than about 400 nanometers, to penetrate and reach the structures 86 during the authentication process. The filler 120 is made of a material that is harder, stronger, and preferably tougher than the structures. Such a filler 120 has a refractive index that is different than the refractive index of any structure 86 and can be less than the refractive index of any structure 86. It must be different to permit the presence of the phase structures to be detected.

One example of a suitable filler material is a low refractive index epoxy optical adhesive. Such an epoxy can advantageously be applied in a liquid or liquid-like form and thereafter hardened or cured, such as by using ultraviolet (UV) light. Such an epoxy can have a refractive index of between about 1.49–1.59 and preferably has a refractive index of no greater than 1.58. Examples of other suitable materials that can be used include other compatible epoxies and adhesives with slightly different refractive indexes than the mask.

The protective layer 118 preferably is applied before application of the filler 120 and bonds well to the structures 86. Preferably, the protective layer 118 covers substantially completely the entire surface area of each and every structure 86.

Where the mask 88 is for use with a transmission-mode correlator, the protective layer 118 preferably is comprised of diamonds, diamond dust, or a diamond-like material that is sprayed, coated, brushed, vapor-deposited, or otherwise deposited on the structures. If desired, lacquer, cyanoacrylate, urethane, or UV-curable transparent epoxies can be used. Other materials can also be used.

Where the mask 88 is for use with a reflection-mode correlator, the protective layer 118 preferably is a coating that is opaque or reflective to the wavelength of light used by the correlator. Such a coating 118 can be a metallic coating. One preferred protective layer material is aluminum. Examples of other suitable materials that can be used include silver, nickel, chromium, and gold.

The pattern 112 of phase structures 86 recorded preferably is a fully random pattern, such as a speckle pattern, or another type of random pattern. One example of a suitable random pattern is the random speckle pattern 112 shown in FIG. 1. Another example of a suitable random pattern is the random noise pattern 112' shown in FIG. 4.

The pattern 112 preferably is a stochastic pattern. A fully random stochastic pattern is advantageously spatially uncorrelated, meaning it has uniformly distributed sub-wavelength correlation areas that are preferably less than about five microns in size. As a result, its cross correlation function, discussed in more detail herein, is zero with extremely high accuracy having a signal-to-noise ratio of at least about 20 dB. Moreover, its autocorrelation function is a Dirac-delta like function that is essentially a peak function 110 having a width of a few microns making verification of authenticity easy to discern.

Increasing the aspect ratio that can be achieved at each point 87 of a mask increases the height or thickness of the phase element structure 86 that can be achieved. Thus, the range of thicknesses at each point, i.e. of each structure 86, that can be achieved increases thereby increasing the magnitude of the range of phase levels that can be encoded at each point. Where each point 87 has a size no greater than about six microns and preferably is less than about one micron in size or smaller, the number of points 87 for a given mask surface area dramatically increases. Because the size of each point 87 is so small, millions of structures 86 can be encoded in a given mask. Since the high AR provides a greater number of phase levels that can be encoded for each point 87 and the size of each point 87 is so small, millions and millions of different phase encoded patterns of points 87 are possible, thus increasing the complexity of the pattern and the corresponding difficulty of copying or deciphering it.

For example, where a mask is one millimeter by one millimeter square, has an AR of about 1:1, and has structures 86 each no greater than one micron in size or resolution, the mask can have over $10^6$ phase pattern possibilities. Where the AR is 3:1 there can be as many as $10^{20}$ or $10^{30}$ phase pattern possibilities for the mask. Theoretically, the number of phase pattern possibilities is virtually unlimited because the number of resolvable phases that a point 86 can be encoded theoretically is unlimited.

For example, where the range of possible phase levels that can be recorded during the recording process is 256 levels, each structure 86 of a mask can have one of 256 different thicknesses. While the number of phase levels can be more or less, depending upon the AR that can be achieved for a given recording medium and a given replicating medium, 256 is preferred in one embodiment because it lends itself well to 8-bit digitization. Such digitization can be used in the recording process to control the phase that each point is encoded by computer control but preferably is also particularly well suited for analog-to-digital conversion during correlation. Moreover, phase volume mask having points that can be encoded with 256 different levels lends itself well to being correlated against a reference (or input) that is an SLM having pixels or points each of whose grey scale range is an 8-bit range between 0 and 255 that can be selectively controlled or driven by one or more processors.

An AR of at least about 1:1 is required to selectively record or replicate up to 256 different thicknesses for a given structure 86 of the phase volume mask so that each structure 86 can be phase encoded with a phase that can vary between 1 and 256. Where each of the points or structures 86 has an aspect ratio of 1:1 or slightly greater, each point or structure 86 can be encoded with a minimum of 256 phases. Of course, where the AR is even higher, the range of phase levels that each structure 86 can be encoded is even greater.

Other phase ranges are possible. For example, where a 16-bit compatible phase range is desired, each point of a mask can have a phase that is between 0 and 65,536.

III. Recording the Mask

Figure 5:
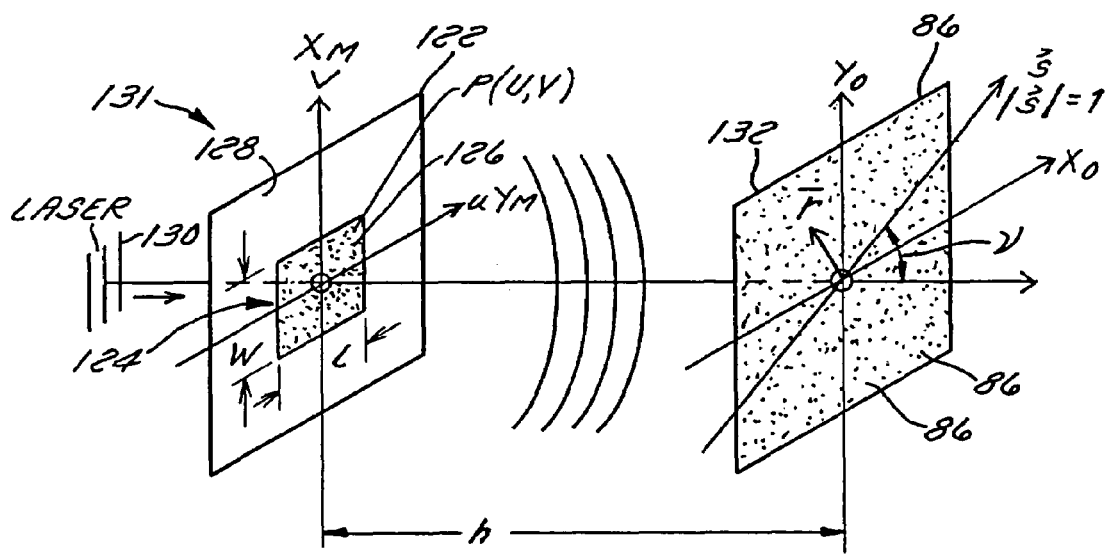
FIG. 5 depicts a preferred recording arrangement for recording a pattern that preferably is a random pattern in a recording medium that is ultimately used to form a mask or replicate other masks.

FIG. 5 illustrates one exemplary holographic recording arrangement 131 for recording a random pattern 112, a speckle pattern, in a recording medium 132, such as a volume phase recording medium or a surface relief recording medium, to form the mask 88, form a master from which the mask 88 is replicated, or form a master for making a submaster from which the mask 88 is replicated. The mask that results from the recording process is, in effect, a master random phase key that can be used to replicate many thousands of input masks 84 that can be then applied to objects, such as goods, cards, tags, and the like and which is used to produce the reference mask 88 for each correlator used to read the input masks 84.

A mask diffuser 122 is shown having an aperture 124 with speckles 126 in the form of ground glass, for example, and a blacked out area 128 imparting overall dimensions of W and L to the aperture and generally defining its shape, P(u,v). The diffuser 122 is exposed to a source of coherent light 130, such as a laser. The light is scattered by the mask diffuser 122 as it passes through the aperture 124 and propagates toward a volume phase recording medium 132 located a distance, h, from the aperture 124. As a result of passing through the mask diffuser 122, the light beam propagating toward the recording medium 132 can be characterized by numerous phasors having varying amplitudes and directions, i.e. phases. In random fashion, this light is recorded onto the medium 132 producing numerous submicron phase volume speckle structures 86 in the medium 132. If desired, a lens can be located between diffuser 122 and the medium 132 or mask 88.

Preferably, the diffuser 122 is illuminated with collimated light so as to minimize the criticality of the distance between it, the aperture 124 and the recording medium 132 with respect to diffraction. The recording arrangement preferably is set up so that the divergence angle of the light source 130, the diffusion angle of the master diffuser 122 and the geometry of the recording are matched nearly exactly. A laser 130, that preferably is a Krypton laser 130 having a wavelength at least as short as 414 nanometers is used to help ensure a higher recording resolution that produces structures 86 each having a size less than about six microns and preferably less than about one micron.

Because a large number of phasors are desired to create speckle structures 86 that are small, smaller than six microns in size and preferably of submicron size, the size of the aperture 124 is about eight millimeters to about twenty millimeters. Preferably, the size of the aperture 124 is larger than the size of the recording medium 132. Preferably, the distance, h, between the mask diffuser and recording medium is thirty-five millimeters to one hundred millimeters to help record structures 86 that are smaller than six microns and preferably of submicron size. While the aperture can be horizontal, vertical, or rectangular, it preferably is square so that the speckles are circular.

While one preferred mask diffuser 122 uses crushed glass to diffuse the light passing through, other types of diffusers can be used to produce speckles or other patterns. Examples of other suitable diffusers that can be used as the mask diffuser include a graded refractive index-type diffuser of the type disclosed in U.S. Pat. No. 5,365,354, the disclosure of which is hereby expressly incorporated herein by reference.

Suitable recording medium 132 include a photopolymer, a dichromated gelatin, a dichromated gelatin graft, Polaroid DMP-128 photoresist material, or another photoresist material whose phase can be selectively and volumetrically varied, at least within a desired range of phases, to form the desired pattern or arrangement of volume phase structures 86 within the recording medium 132 to impart to the mask 88 that results therefrom the desired random structure.

The recording medium 132 preferably is coated, such as by spin coating, on the substrate 116, not shown in FIG. 5, and is at least about one micron thick before recording and preferably is no thicker than about a few microns (six microns). Preferably, $\Delta n^{max}$ of a suitable recording medium 132 is at least about 0.002 and no greater than about 0.02. Preferably, $\Delta \phi^{max}$ is at least about zero and no greater than about $2\pi$. The wavelength of the light source preferably is at least about 420 microns and no greater than about 650 microns.

One preferred phase material well suited for recording the structures 86 of the mask 88 is a holographic photopolymer. Other materials, including photopolymers, such as those listed herein, can be used. A preferred thickness, T, of this photopolymer is no more than about 20 micrometers (μm) and has a maximum refractive index modulation, $\Delta n_{max}$, of about 0.05. Thus, the maximum phase modulation of the phase material is $\Delta \phi^{max}$ is equal to $2\pi/\lambda T \Delta n_{max}$ where $\lambda$ is the output wavelength of the light source. Where a low-cost, compact-disk laser diode is used as the light source, $\lambda$ is about 0.8 μm and is capable of producing a phase modulation sufficiently large for all volume phase mask recordings.

The resultant pattern recorded in the recording medium 132 is an entirely random, purely phase pattern made up of millions of submicron, high AR structures 86. In contrast to laser cards, optical recording of a master mask in this manner preserves perfect spatial and temporal coherence within the entire surface area of the recording medium 132 where the pattern is being recorded.

This recording process preferably is non-repeatable because it depends upon a number of factors that can vary from moment to moment and which is not likely to be repeated once the master mask is recorded. For example, factors such as laser fluctuation and the temperature can vary from moment to moment. Therefore, once recorded, the mask is, in effect, the master key from which the authentic input masks 84 and other reference masks 88, where more than one correlator is to be used, must be reproduced or replicated. Thus, once the master key is recorded, it is the only mask that will be used as an ultimate master to generate other phase volume mask references 88 and inputs 84.

IV. Replication of Masks

A. Making a Master

Figure 6:
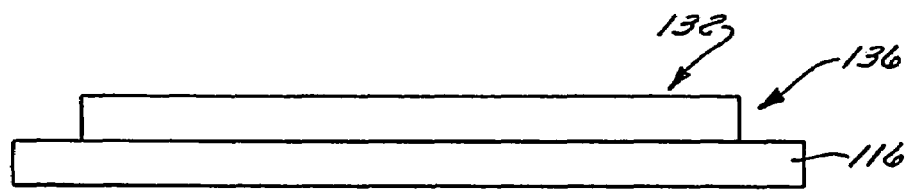
FIG. 6 illustrates an initial step in the recording process where recording medium is applied to a substrate.
Figure 7:
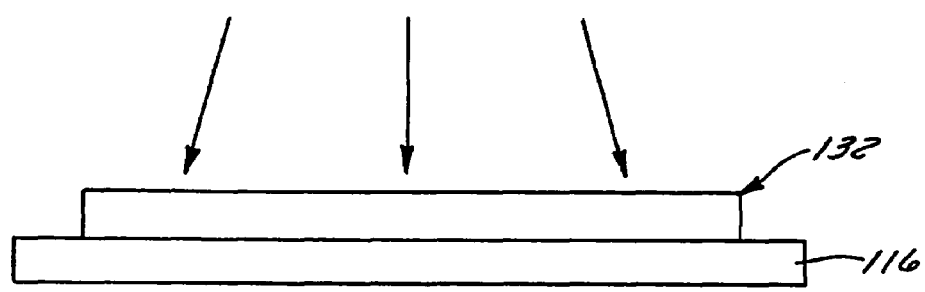
FIG. 7 illustrates the recording step of recording the pattern in the recording medium.

FIGS. 6–9 depict a method making a master 134 (FIG. 9) using the previously described recording arrangement that is used to make submasters used to replicate masks 84 and 88 in mass production. FIG. 6 depicts a blank 136 that includes a substrate 116, such as a photoresist plate, that is square or rectangular and which is coated with a recording medium 132 preferably comprised of a photoresist material. FIG. 7 illustrates the step of exposing the recording medium 132 to light to record the desired random pattern, such as pattern 112. It should be noted that an Argon-ion laser light source used with a light shaping diffuser to produce speckle patterns allows better control of the light spread angle, phase modulation depth (zero diffraction order) and mask size.

Typically, exposure time ranges from between about a few seconds and a few minutes. In one preferred embodiment, coherent light of a wavelength of about 457 nanometers is used along with a gradient index-type mask diffuser to record the random pattern in a photopolymer recording medium 132.

Figure 8:
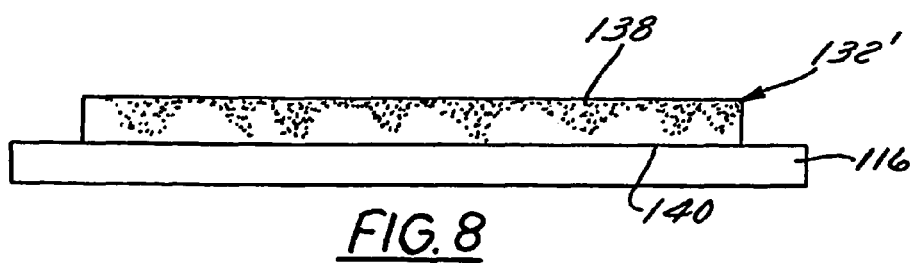
FIG. 8 illustrates developing the pattern in the recording medium.
Figure 9:
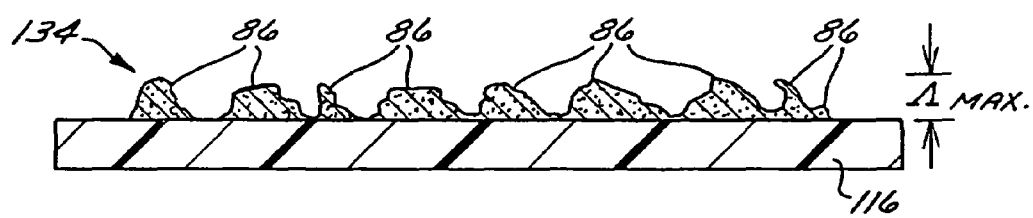
FIG. 9 illustrates the phase structures produced after exposed recording medium has been removed.

FIG. 8 illustrates the recording medium 132' after exposure. The lighter portions 138 on top depict the recording medium 132' that has actually been exposed to the light and the darker areas 140 on the bottom illustrate unexposed recording medium. Referring to FIG. 9, using positive photoresist, or a developer, the exposed phase material 138 is etched away leaving the unexposed phase material 140. The three-dimensionally contoured, high-aspect-ratio, submicron structures 86 left behind on the substrate form the master mask 134. As is shown in FIG. 9, the structures 86 of the master 134 preferably have a maximum height, $\Lambda_{max}$, of at least about one to two microns and no greater than about six microns.

Figure 10:
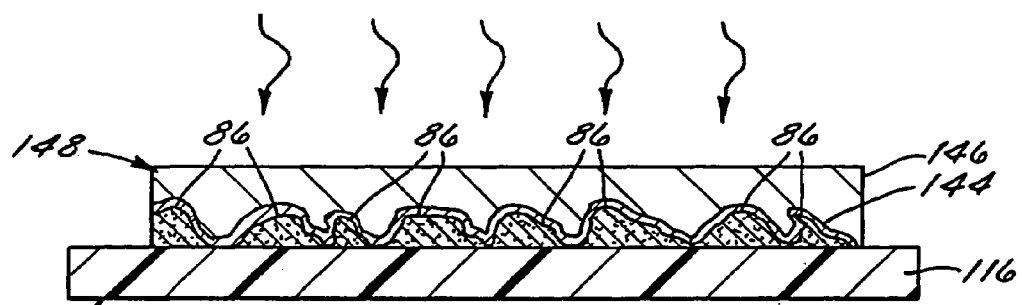
FIG. 10 depicts making a replica of a submaster.

Referring to FIG. 10, to produce a submaster 142 (FIG. 11) for replication of masks, the structures 86 of the master 134 are coated with a conductive material 144, preferably silver. Thereafter, a hard replica material 146 that preferably is of metallic composition is deposited on and around the structures 86, preferably by an electroforming or electro-deposition process, to create a female, converse or negative replica 148 of the structures 86. Preferably, the replica material 146 is nickel, a nickel alloy, another suitable metal, or another suitable synthetic material.

Figure 11:
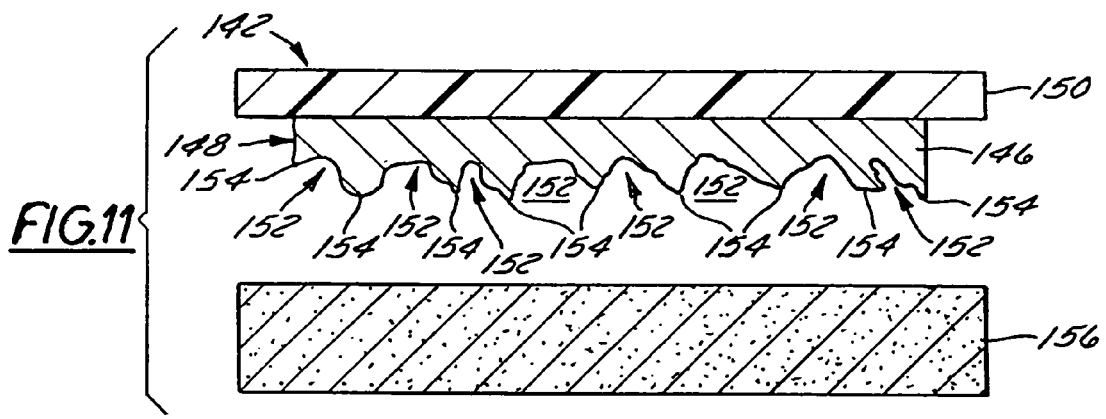
FIG. 11 illustrates positioning the submaster over a block of replicating material.

As is shown in FIG. 11, the formed replica 148 has a plurality of pairs of voids 152, each preferably of submicron size, that are the shape and size of one of the structures 86 of the master 134. The voids 152 are disposed between peaks 154 of replica material 146 that represent the voids between the structures 86 of the master 134.

After forming the replica 148, the replica 148 can be attached to a substrate 150 that is of strong and durable construction thereby forming the submaster 142 that can be used to replicate masks, such as masks 84 and 86, having structures 86 that are nearly identical in size, shape, and AR to the structures 86 of the master 134 shown in FIG. 9. Preferably, the thickness of the submaster 142, particularly its substrate 150, is controlled to produce a submaster 142 that is either relatively thin and flexible, so it can be used with a roller-type embossing replication process, or thicker and rigid, so it can be used with a stamping-type replication process.

B. Replication By Embossing

Figure 12:
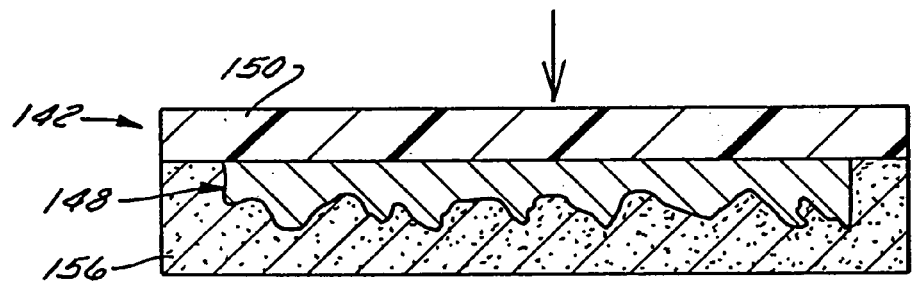
FIG. 12 depicts applying pressure against the submaster to imprint the pattern of its replica into the replicating material.
Figure 13:
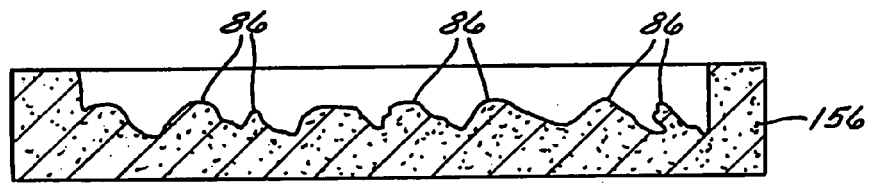
FIG. 13 illustrates the impression left in the replicating material after the submaster has been removed.

A first method of replication by embossing, such as stamping or rolling, is depicted by FIGS. 11–13. After the submaster 142 has been positioned over a sheet 156 of replicating medium in the manner generally depicted in FIG. 11, pressure is applied to urge it against the sheet 156, in the manner generally depicted in FIG. 12. As the pressure is applied, as indicated by the downwardly facing arrow in FIG. 12, the sheet 156 deforms and fills the voids in the replica 148 such that after the submaster 142 is removed, shown in FIG. 13, high AR structures 86 are stamped, embossed, or formed in the sheet 156, that ultimately produces a replicated mask that is nearly identical to the master 132 shown in FIG. 9.

Figure 14:
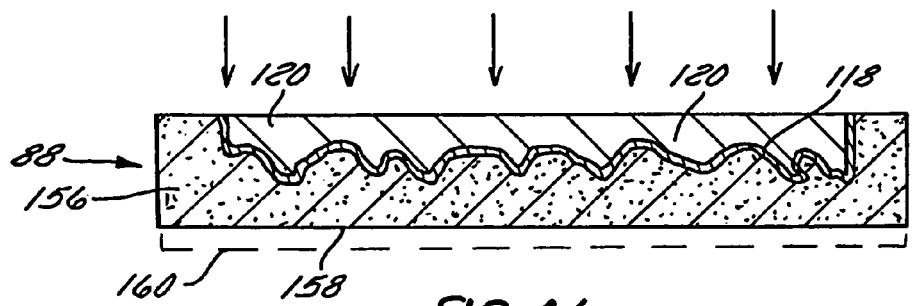
FIG. 14 illustrates applying a protective material and filler to the surface of the replicating material.

Referring to FIG. 14, after the submaster 142 is removed, the layer 118 of the protective material is applied or deposited on each of the structures 86. Thereafter, filler 120 preferably is applied and cured to produce a finished replicated volume phase mask 88 having a generally rectangular cross section. Where the replicated mask 88 is to be formed into a label, an adhesive can be applied to its rear surface 158 so that the mask 88 can be easily and quickly applied to another object. If desired, an adhesive substrate 160 (in phantom) can be applied to the rear surface 158 so as to enable the mask 88 to be stuck to an object.

This replication method is well suited for high rates of mass production. This replication method can be performed at high rates of speed to achieve high rates of replication, typically of at least about 9400 masks per minute.

A replicating medium 146 well suited for replication of masks by stamping or embossing has a narrow molecular weight distribution so that it is suitably homogenous and uniform so that it will shrink predictably and uniformly during replication of volume phase structures 86. This is particularly critical where the structures 86 are of submicron size or smaller. Such a replicating material 146 preferably is comprised of molecules having a narrow molecular weight distribution to enable small structures 86 to be produced that can be of submicron size. In a preferred embodiment, to achieve these desired properties, the replicating material has a molecular weight distribution that varies no more than about 20%.

Figure 15:
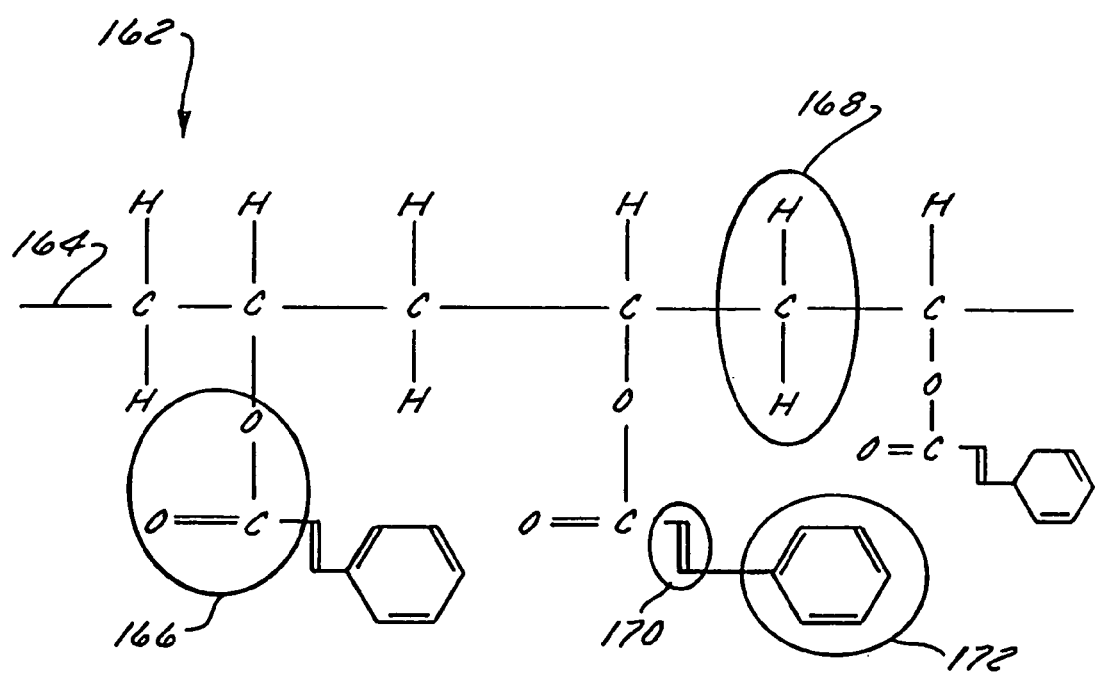
FIG. 15 depicts a molecule of a preferred replicating material.

An example of a preferred replicating medium 146 suitable for replication is polyvinylcinnamate copolymer whose molecular structure 162 is shown in FIG. 15. Polyvinylcinnamate is a copolymer of fully hydrolyzed polyvinyl alcohol (PVA) and cinnamoyl chloride (CC) having long polymer chain structures, one example of which is labeled with reference numeral 162, with a narrow molecular weight distribution that provides the desired homogeneity and uniformity to replicate such small structures 86. PVA is advantageous because it is soluble in water and can entrap water molecules that act as plasticizers. Preferably, the PVA used has a relatively narrow molecular weight distribution so as to impart homogeneity to the resultant polyvinylcinnamate.

Ester and carboxyl groups, one of which enclosed by the circle bearing reference numeral 166, of the molecule 162 desirably provides controlled cross-linking and high sensitivity. Each saturated carbon in the carbon chains, one of which is enclosed by oval 168, of the molecule 162 offers good rigidity and uniformity. Alkene functional groups, one of which is enclosed by circle 170, provides shrinkage control that enables the structures 86 of submicron size having a desirably high AR to be accurately replicated because there is a minimum of shrinkage during replication. Benzyl functional groups, one of which is enclosed by circle 172, simultaneously provides rigidity and structural stability under stress or impact which helps maintain the integrity of the structures 86 through repeated use, exposure to the elements, and wear and tear.

During manufacturing of polyvinylcinnamate, the PVA and CC are corrected using deionized water. The reaction preferably can be monitored by testing the presence of byproduct hydrochloric acid and adjusting accordingly. When PVA and CC are combined and the reaction is completed, a solution of polyvinylcinnamate is formed that can be spin coated to produce a relatively thin and uniform film layer 156, at least about 3–15 micron thick, preferably on a substrate. When dry, the film 156 is ready to be embossed, stamped or otherwise copied so as to reproduce the high aspect ratio structures from a master. Polyvinylcinnamate is preferred because of its ability to reproduce structures 86 having an AR as high as about 3:1 to about 20:1.

C. Epoxy Replication

Figure 16:
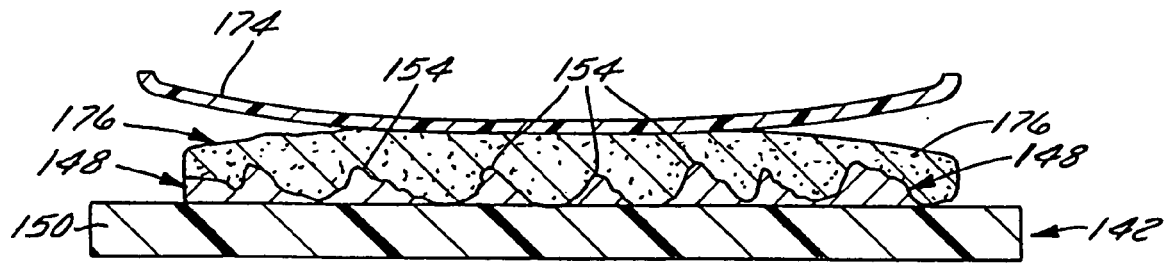
FIG. 16 illustrates use of the submaster in an adhesive replication process.
Figure 17:
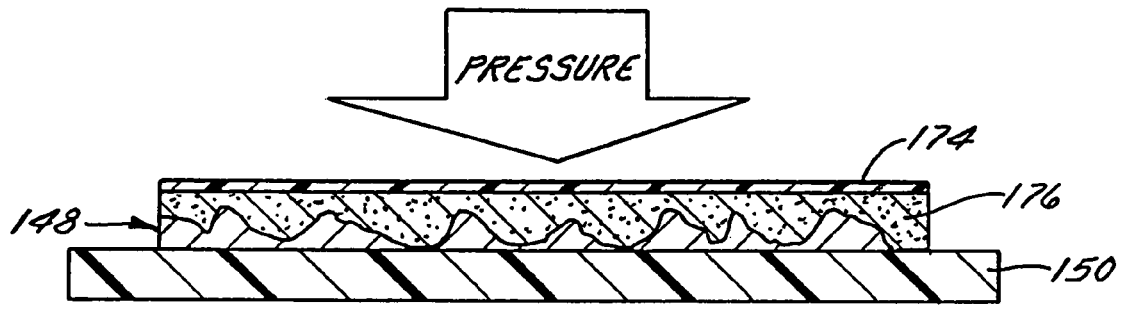
FIG. 17 depicts the step of applying pressure to urge the adhesive into the voids between the structures of the replica of the submaster.
Figure 18:
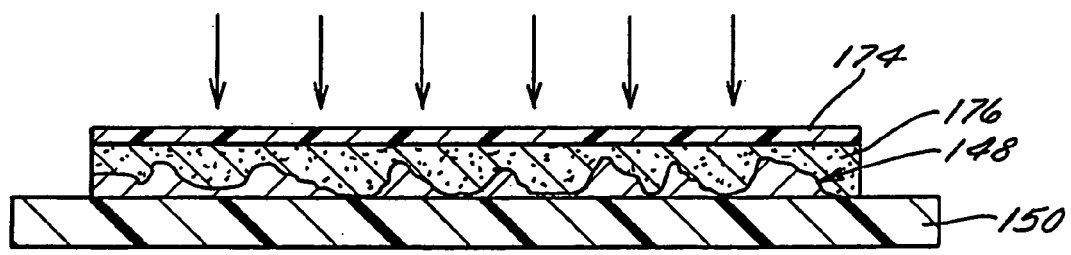
FIG. 18 depicts curing the adhesive.

Referring to FIG. 16, a thin film 174, preferably made of a plastic, such as PMMA or polycarbonate, carrying a curable replicating epoxy 176, such as Norland 61 UV-curable epoxy, is applied to the submaster 142 directly on the peaks and between the voids of the replica 148. As is shown in FIG. 17, pressure is applied against the film 174 and adhesive 176 to cause the adhesive 176 to fill the voids in the replica 148 and squeeze out excess adhesive 176. After, sufficient pressure is applied to ensure that all of the voids in the replica 148 are uniformly and completely filled, the adhesive 176 is cured. As is shown in FIG. 18, where the adhesive 176 is an UV-light curable epoxy, a plurality of beams of ultraviolet light irradiate the epoxy 176 to initially cure the epoxy, typically within four to five minutes. Depending upon the type of adhesive 176 used, curing may continue to take place after the adhesive 176 is no longer exposed to the UV light.

Figure 19:
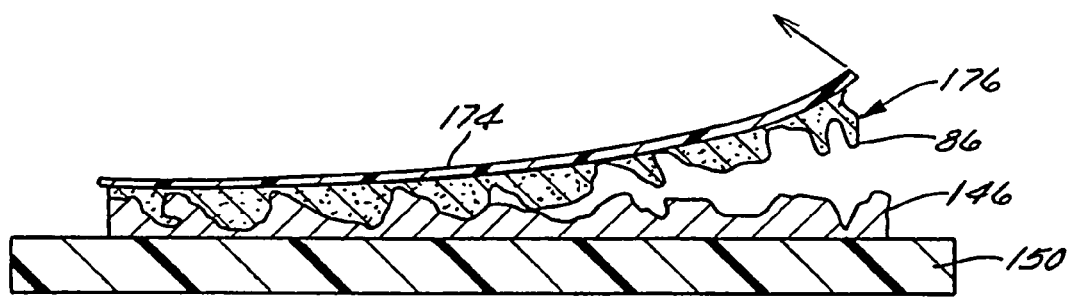
FIG. 19 illustrates peeling away the adhesive after it has been suitably cured.
Figure 20:
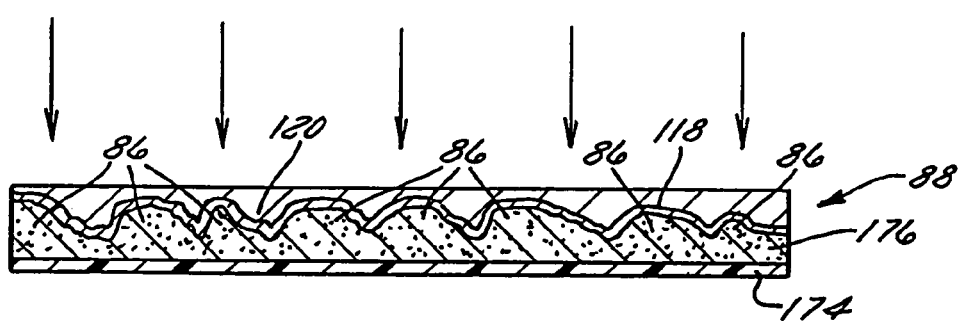
FIG. 20 is a side view of the mask resulting from the cured adhesive.

After the adhesive 176 is suitably cured, the film 174 is lifted, as is shown in FIG. 19, thereby lifting the adhesive 176 away from the replica 148. The result is a replicated volume phase mask 88 having high AR structures 86 substantially similar, if not virtually identical, to the structures of the master mask 134 shown in FIG. 9. Thereafter, the protective layer 118 is applied or deposited on the structures 86 in the manner depicted in FIG. 20. After the protective layer 118 is applied, filler 120 is applied producing a finished replicated mask 88.

Also, using essentially the above method steps depicted in FIGS. 16–20, masks, such as masks 86 and 88, can be mass produced by injection molding the epoxy 176 between the film 174 and replica 148 or by casting the epoxy 176 on the replica 148.

In another preferred method of epoxy replication shown in FIGS. 56–59, a diffuser 366 or master 134 can be used as the master instead of the submaster 142 described above to replicate the mask 88 in a manner similar to that described above. A square or rectangular portion 368 of the surface of a substrate 370, such as a plastic card, is prepared to receive epoxy. A drop 372 of epoxy adhesive, such as GAF 233 epoxy adhesive from Epic, Inc. of Las Vegas, Nev., is placed over the prepared square 368 and on the epoxy 372. A small roller (not shown) is used to apply pressure by rolling it over the diffuser 366 to thereby roll out excess epoxy and to fill voids in the surface of the diffuser 366. Excess epoxy is wiped away preferably using methanol on an Alpha wipe. To harden the epoxy, it is cured by exposing it UV light, such as in the manner depicted in FIG. 18, for about ten seconds. The diffuser 366 is peeled away from the epoxy 372 and the epoxy 372 is thereafter allowed to post-cure.

Figure 59:
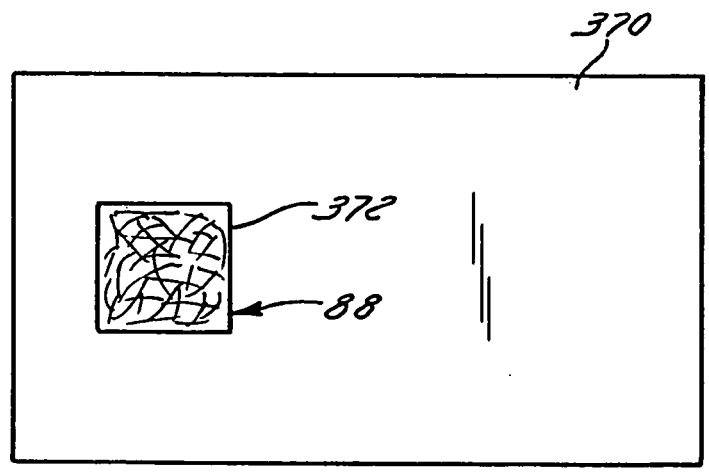
FIG. 59 is a top view of the mask that result when the replication process is complete.

Referring to FIG. 59, the result is a mask 88 having desired high AR, submicron structures 86 arranged in the form of the random pattern of the diffuser 366 or master 132. The protective layer 118 and filler 120 can thereafter be applied, if desired.

Figure 21:
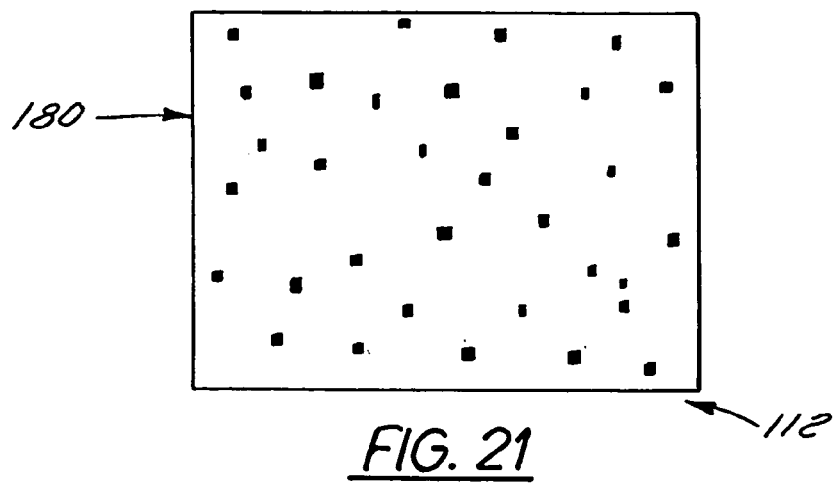
FIG. 21 illustrates a random pattern that comprises a scrambler mask.

V. Phase Convolved Mask

Where it is desired to record a predetermined pattern 114 together with the random pattern 112 on a single mask 88', the predetermined pattern 114 preferably is convolved with the random pattern 112 and recorded to produce a phase convolved mask 88'. An example of the mask 88' is shown in FIG. 23 and contains the random pattern 112 shown in FIG. 21 convolved with the non-random fingerprint pattern 114 shown in FIG. 22. Replication of the mask 88' can be done as described above. The predetermined pattern 114 preferably is a non-random pattern. When convolved together, the result preferably is a pseudo-random pattern.

Figure 22:
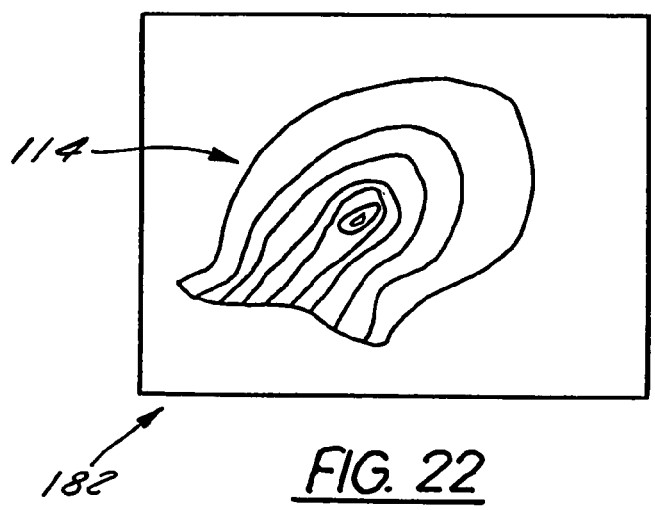
FIG. 22 illustrates a predetermined pattern that is a biometric fingerprint pattern.
Figure 23:
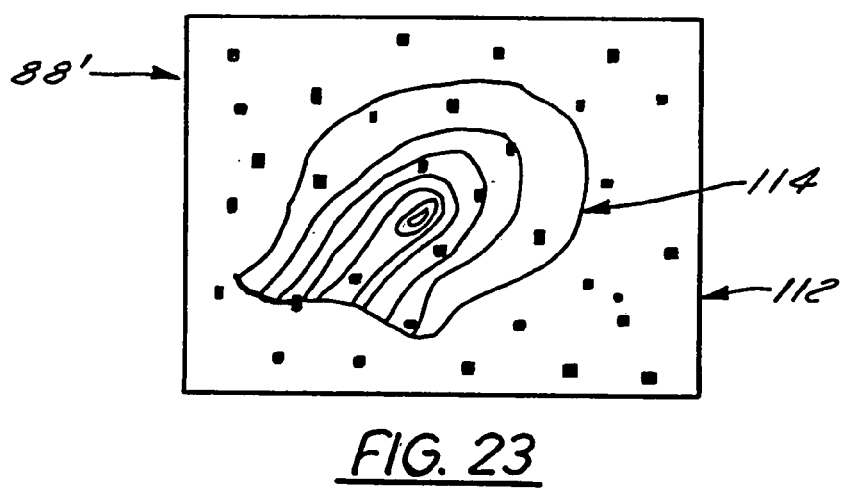
FIG. 23 is a simplified representation of the pattern of the random pattern convolved with the predetermined pattern.
Figure 24:
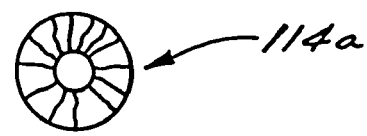
FIG. 24 depicts an iris pattern.
Figure 25:
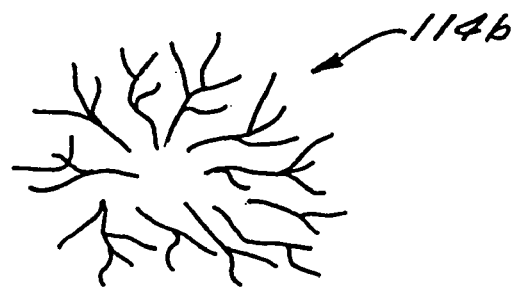
FIG. 25 illustrates an exemplary retina pattern.
Figure 26:
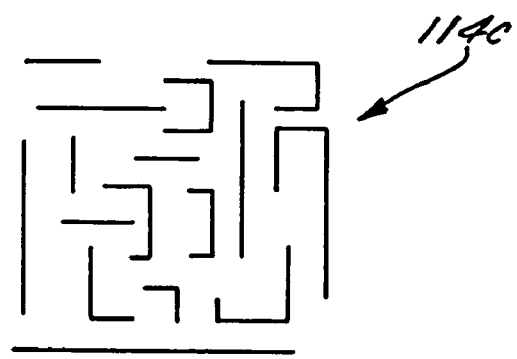
FIG. 26 depicts a predetermined pattern that is not a biometric pattern.

Examples of such non-random patterns 114 are shown in FIGS. 1, 22, and 24–26. FIGS. 1 and 22 show a biometric pattern 114 that is a fingerprint. FIG. 24 depicts another biometric pattern 114a that is an iris pattern. FIG. 25 illustrates a further biometric pattern 114b that is a retina pattern. FIG. 26 depicts a non-biometric pattern 114c that is a barcode-like pattern.

Other biometric information, such as facial images, hand profiles, handwriting, typing rhythm, and other biometric information that can be read from a human whose identity is sought to be authenticated can be used. Examples of other non-biometric information that can be used include: keys, digital keys, digital information, bar codes, labels, geometrical patterns, high-resolution images, high-resolution markings, watermarks and others.

Figure 4:
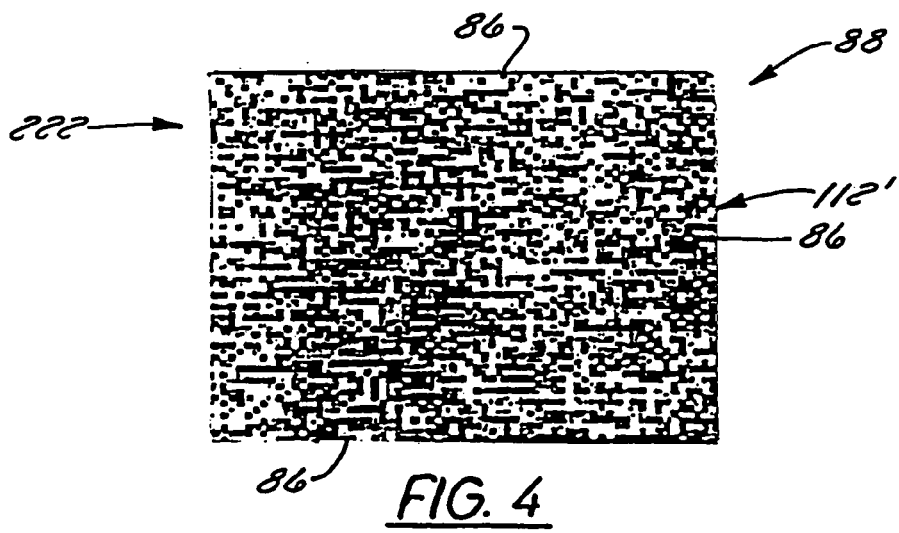
FIG. 4 illustrates a preferred enlarged random pattern that preferably is phase encoded or replicated into a mask.

The mask 88' shown in FIG. 23 has been simplified for ease of explanation. Preferably, the resultant phase convolved mask 88' appears much more like masks 84 and 88 as they are depicted in FIGS. 1 and 4 with the random pattern 112 serving to scramble the non-random pattern 114 such that the non-random pattern is not visible and in fact cannot by ascertained by scanning, copying and replication methods discussed herein. During authentication, the random pattern 112 of the reference mask 88' must be the same as the random pattern 112 of the input mask 86' and the non-random pattern 114 of the reference mask 88' must be the same as the non-random pattern 114 of the input mask 86' for positive authentication. Moreover, this technique possesses a further security advantage in that a phase convolved mask can be volume phase encoded such that it is completely invisible to the eye and any other detector making even its mere presence difficult to detect.

Such a phase convolved mask is a random pattern that is a pseudo-random pattern. The pseudo-random pattern produced by convolving the information mask with the scrambler mask will have a larger correlation area of about 3–5 microns in contrast to the fully random patterns discussed above which have a smaller correlation area of no greater than about 1.5 microns to about 2 microns. The autocorrelation function of a phase convolved mask will be Dirac-like but have a peak 110 that is at least about 10 μm wide. This contrasts with random stochastic patterns which have a Dirac-like autocorrelation function but have a peak that typically is no greater than about 3–4 microns wide.

VI. Recording The Phase Convolved Mask

Figure 27:
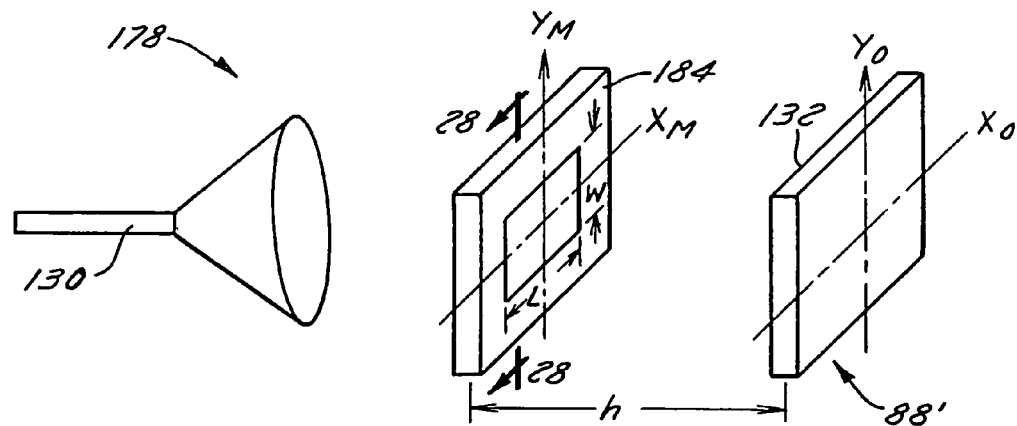
FIG. 27 illustrates a recording apparatus for recording a volume phase mask having a predetermined pattern in the form of an information mask convolved with a random pattern in the form of a scrambler mask.
Figure 28:
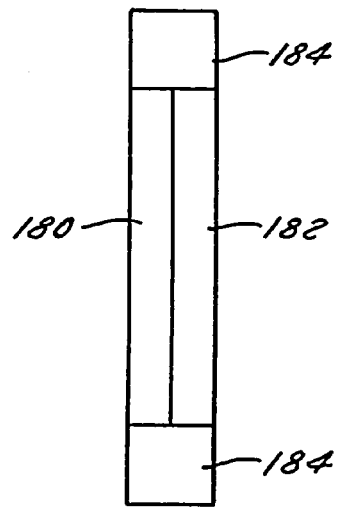
FIG. 28 illustrates the positioning of the information mask and scrambler mask in the convolved phase mask recording apparatus shown in FIG. 27.
Figure 29:
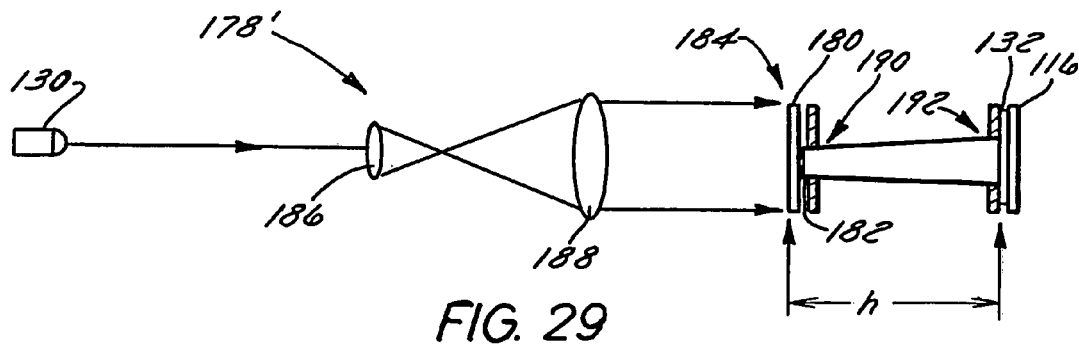
FIG. 29 illustrates a second preferred recording apparatus for recording phase convolved masks.

FIGS. 27–29 illustrate exemplary but preferred generalized aperture double scrambling recording arrangements 178 and 178' for recording the random pattern 112 and non-random pattern 114 as a phase convolved mask 88'.

Before recording the phase convolved mask 88', the random pattern 112 is recorded as a mask 180, substantially in the manner depicted in FIG. 5, and the non-random pattern 114 is recorded as a mask 182. The non-random pattern 114 can be recorded as a mask substantially in the manner depicted in FIG. 5 or can be provided in other ways, such as a spatial light modulator (SLM) in communication with a biometric information reader or scanner (not shown). Referring once again to FIGS. 21 and 22, the mask 180 into which the random pattern 112 is recorded is referred to further herein as the scrambler mask 180 and the mask 182 into which the non-random pattern 114 is recorded is referred to further herein as the information mask 182.

To combine and record both of the masks 180 and 182 as a phase convolved mask 88', the scrambler mask 180 and information mask 182 are placed close together and disposed between a coherent light source 130 and the volume phase recording medium 132 of the mask 88' to be recorded. As is shown in FIG. 28, the masks 180 and 182 are preferably placed adjacent to each other such that they overlap, with the information mask 182 disposed between the scrambler mask 180 and the phase convolved mask 88' being recorded. Light from the source 130 irradiates both masks 180 and 182 producing a combined image that is illuminated on the recording medium 132 to thereby record the combined image in the recording medium 132.

The masks 180 and 182, at plane $X_m$, $Y_m$, are received in a holder 184 having an aperture defined by the dimensions, W and L. The masks 180 and 182 are placed in optical contact with each other and illuminated by light emitted from the source 130. The mask 88' to be recorded is spaced a distance, h, from the masks 180 and 182 sufficient to cause a Fresnel transformation to occur to the resultant combined image to integrate and thereby convolve both mask patterns 112 and 114 into a single phase pattern that is recorded by phase encoding it into the recording medium 132 at plane $X_0$, $Y_0$.

Recording is accomplished by the convolved patterns 112 and 114 selectively changing the refractive index of the recording medium 132 in those locations where the light illuminates the medium 132. Such controlled refractive index change is represented by $n(x,y)=n(E(x,y))$ where n is the refractive index of the phase material, $n(x,y)$ is the refractive index of the phase material at locations x and y across the surface of the recording medium 132, i.e. in plane $(x_0,y_0)$, after exposure, and $E(x,y)$ is the exposure distribution across the surface of the recording medium 132 during recording. The result is that a phase convolved mask 88' having a phase distribution $\exp[jM(x,y)]$ is recorded.

FIG. 16 illustrates another generalized aperture double scrambling recording assembly 178'. Light from a laser 130 passes through a first lens 186 and a second lens 188 before passing through the masks 180 and 182 and a pair of apertures 190 and 192 disposed between the recording medium 132 and the masks 180 and 182. The first lens 186 preferably is a microscope objective lens and the second lens preferably is a collimating lens 188. The masks 180 and 182 and the recording medium 132 are spaced apart a distance, h, such that the image from each mask 180 and 182 is Fresnel transformed to convolve them before they reach the recording medium 132. The scrambler mask 180 and the information mask 182 are placed together in front of the front aperture 190 and the recording medium 132 is placed behind the rear aperture 192. The front aperture 190 is located behind both masks 180 and 182 to block non-useful light from the light source 130. The rear aperture 192 is located in front of the recording medium 132 also to block non-useful light.

In one preferred embodiment, a fingerprint pattern comprises the information mask 182. A holographic diffuser, used as the scrambler mask 180, is configured to provide a random speckle pattern or the like is placed in front of the information mask 182. The light source 130 is a collimated Argon laser having a wavelength, λ, of about 457 nanometers. The distance, h, between the masks 180 and 182 and the recording medium 132 preferably is about 15 centimeters. With a recording intensity of about 7 mW/cm², the time to record the convolved mask images onto the recording medium 132 is about 20 seconds. Thereafter, the recording medium 132 is placed into developer for about 90 seconds. If the pattern recorded is suitable, the recording medium is baked at a temperature of about 100° Celsius to cure the structures 86 of the recorded pattern. Thereafter, if desired, the resultant structures 86 can be coated with hard coat 118 and filled with filler 120. Otherwise, the developed recording medium 132 can be used either as a master 134 to replicate other phase convolved masks or to create a submaster, such as submaster 142, to replicate labels with the same phase convolved mask pattern.

It is preferred that the scrambler mask 180 comprise a random stochastic speckle pattern because such a random pattern advantageously provides a double-scrambling security scheme. One level of scrambling is provided by the shape of the speckle being illuminated on the recording medium of the mask and the other level is the position of the speckle along the plane or surface of the recording medium.

VII. Correlator

Figure 30:
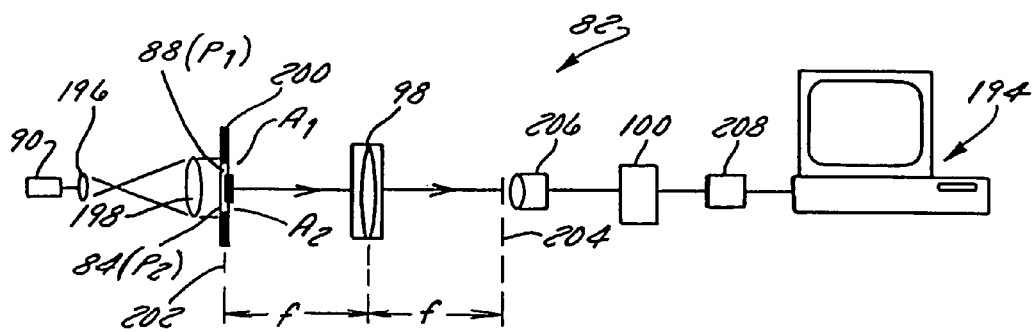
FIG. 30 is a schematic of a correlator.
Figure 32:
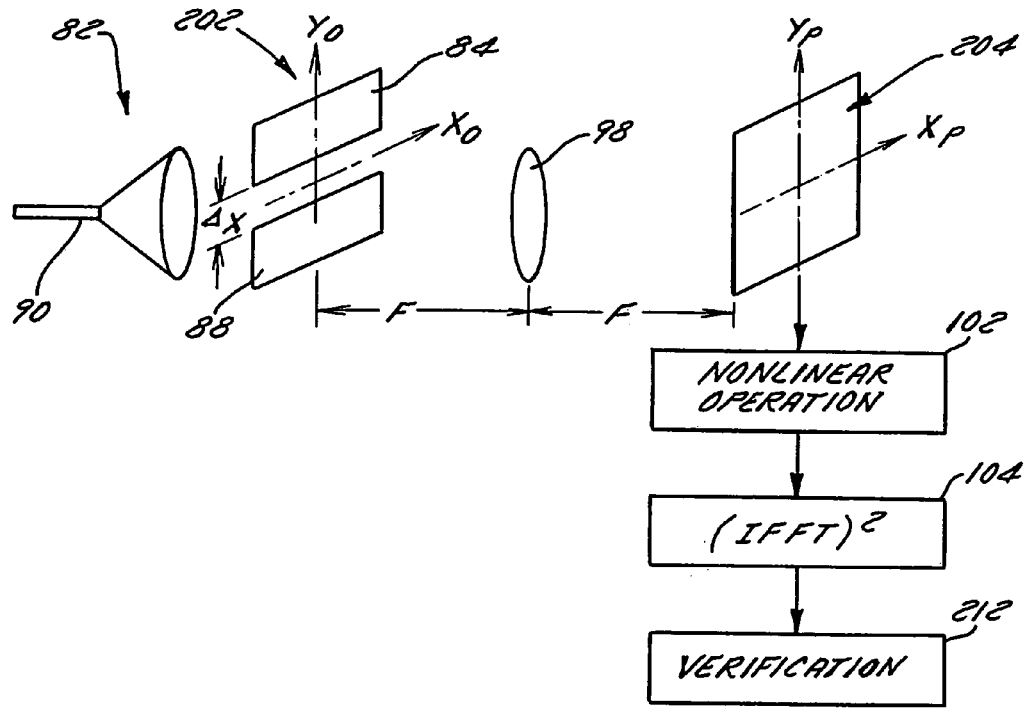
FIG. 32 is an optical and process schematic of the correlator shown in FIGS. 30 and 31.
Figure 31:
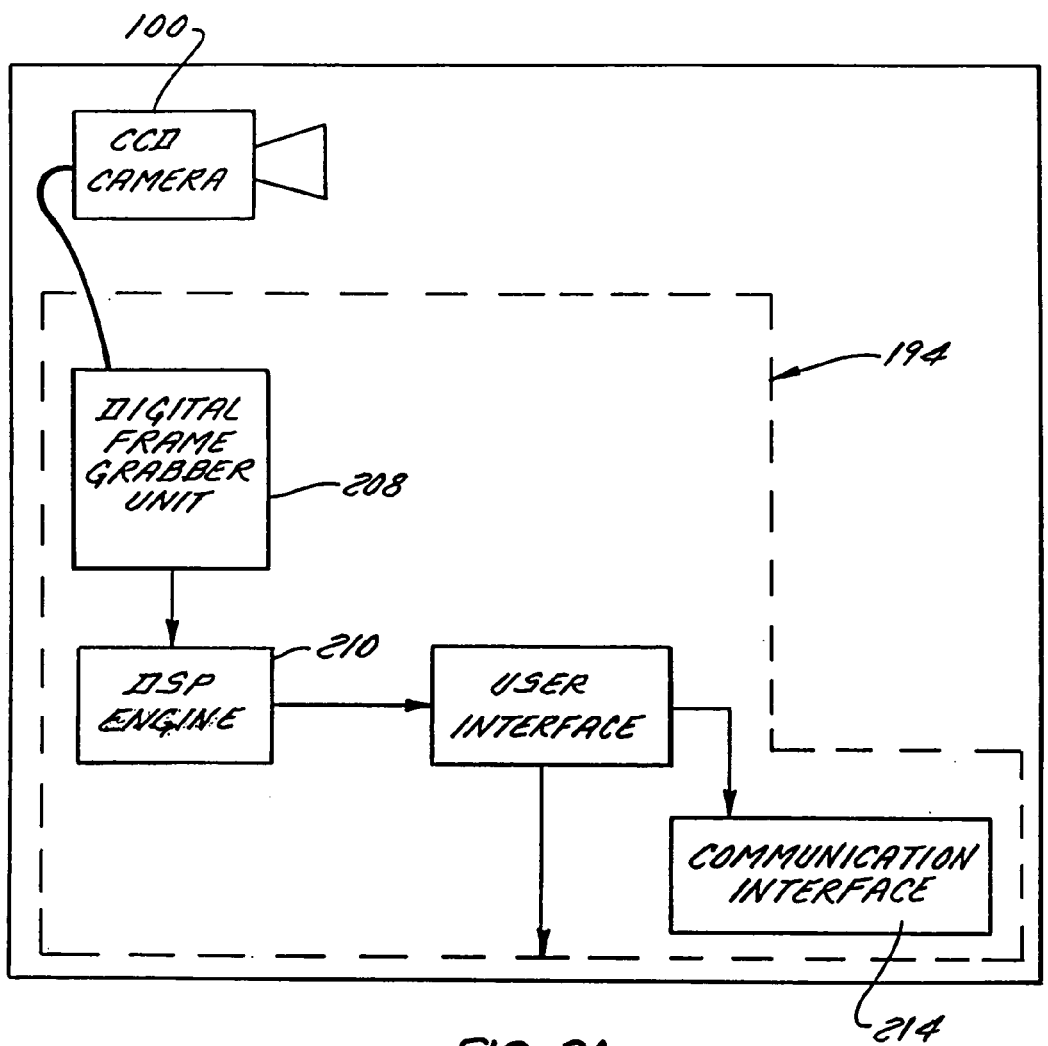
FIG. 31 depicts additional components of a preferred processor or computer of the correlator shown in FIG. 30.

A generic correlator 82 is shown in more detail in FIGS. 30–32. Such a correlator 82 uses nonlinearity at the Fourier plane, $(x_P, y_P)$ to nonlinearly transform the Fourier transform interference intensity that results when the patterns from the input mask 84 and reference mask 88 are Fourier transformed during operation. As compared to other correlators, including linear joint transform correlators, the nonlinear joint transform correlator 82 of this invention provides a higher correlation peak intensity, a larger peak-to-sidelobe ratio, a narrower correlation width, and better correlation sensitivity all while being of advantageous compact construction. Also advantageously, the nonlinear joint transform correlator 82 can be implemented using binary encoding techniques so that a computer or processor 194 can be used to quickly carry out the necessary transform calculations.

To enable a correlator of this invention to possess submicron resolution and to at least resolve structures 86 of a phase volume mask 84 or 88 having structures with a size less than six microns, the correlator inherently processes optically in parallel at a much higher resolution than other correlators (such as those using template or sequential matching). Moreover, because of the advantageous mask construction and correlator arrangement, processing speed is independent of the number of elements being compared.

The correlator 82 has a light source 90 that preferably is a laser, such as a laser diode, an Argon laser, a He—Ne laser, or another source of collimated light. In FIG. 30, a beam of collimated light from the source 90 is directed through a first lens 196 that preferably is a microscope objective lens and a second lens 198 that preferably is a collimating lens of f/3 construction. The microscope objective lens 196 spreads the collimated light out while the collimating lens 198 focuses it in a direction generally parallel to the direction of the lens 198 so the light is directed toward the input mask 84 and the reference mask 88.

The light then passes through a mask holder 200 that includes a pair of spaced apart apertures, $A_1$ and $A_2$, with one of the apertures, $A_1$, holding the reference mask 88, $(P_1)$, and the other of the apertures, $A_1$, holding the input mask 84, $(P_2)$. The arrangement of the apertures, $A_1$ and $A_2$, is designed to locate both the reference mask 88 and the input mask 84 in the front focal plane 202 of the Fourier lens 98 located behind the mask holder 200. The apertures, $A_1$ and $A_2$, are also arranged so as to space apart the masks by a distance of Δx. The front focal plane 202 $(x_0, y_0)$, the reference mask 88, and the input mask 84 are all spaced a distance, f, away from the Fourier lens 98.

The energy recording device 100 is located at or adjacent the rear focal plane 204, $(x_P, y_P)$, of the Fourier lens 98 so as to record the intensity of the joint power spectrum of the interference patterns of the reference mask 88 and the input mask 84 after the patterns have passed through the Fourier lens 98. Preferably, the energy recording device 100 is a square law detector or an energy detector located in the rear focal plane 204, $(x_P, y_P)$, of the Fourier lens 98. One example of a suitable energy recording device 100 is a CCD camera. Another example of a suitable energy recording device 100 is an SLM, i.e. a Fourier plane SLM. The energy recording device 100 preferably is constructed and arranged to output the image that it records as an electronic signal or a series of such signals. Such a recording device has a recording element with recording pixels no greater than about 6 µm in size to be able to record the interference fringes produced by such small phase structures 86, when Fourier transformer.

The rear focal plane 204, $(x_P, y_P)$, is spaced a distance, f, from the Fourier lens 98. Preferably, however, a focusing lens 206 that is a microscope objective lens is located at or in the rear focal plane 204, $(x_P, y_P)$, to gather the high-frequency interference fringes from the Fourier transformed mask patterns, magnify them, and focus them toward or onto the recording device 100.

The recording device 100 is connected to a capturing device 208 that preferably is a frame grabber constructed and arranged to electronically capture the image recorded by the recording device 100. An example of a suitable frame grabber 208 is a commercially available frame grabber marketed under the tradename SNAPPY 3.0 by Play Incorporated of 2890 Kilgore Road, Rancho Cordova, Calif. Other such commercially available devices can also be used.

The capturing device 208 is connected to the computer 194 or a processor 210 of the computer 194 that preferably can comprise one or more digital signal processors that form a digital signal processing engine. If desired, software executed by the main processor of the computer 194 can process the image captured from the recording device 100.

The captured signals of the Fourier transformed reference mask and input mask patterns are processed by the computer 194 or processor 210 to inverse Fourier transform 104 them. Preferably, the captured signals are nonlinearly transformed 102 before being inverse Fourier transformed 104. The inverse Fourier transformation applied can be an inverse Fast Fourier transformation represented by the block labeled "FFT$^2$" in FIG. 32. An example of software suitable for performing these transforms on a personal computer is MATLAB, math processing software commercially distributed by The Mathworks Inc., of 24 Prime Park Way, Natick, Mass.

The nonlinear transform 102 and the inverse Fourier transform 104 can also be performed by the digital signal processing engine 210. Examples of suitable digital signal processors include a TMS320C40 and TMS320C80 made by Texas Instruments, Inc, of 8505 Forest Lane, Dallas, Tex. For example, the processing power of a single TMS320C40 processor can perform a 256×256 inverse Fourier transform calculation in less than about 0.6 seconds. If faster processing speeds are required, the engine 210 can be configured with a plurality of pairs of processors. For example, a CNAPS PC accelerator single-slot board commercially distributed by Adaptive Solutions, Inc., of 1400 NW Compton Drive, Beaverton, Oreg., contains 128 simple processors enabling a 4×9 correlation of a 640×480 pixel image to be performed in just 14 milliseconds. If desired, the engine 210 can have a processor for each pixel of the image grabbed by the frame grabber 208.

Referring once again to FIG. 1, the result 96 after performing the nonlinear transform 102 and the inverse Fourier transform 104 is an inverse Fourier transform spectrum 106 that can be displayed on a display terminal or monitor in a manner that enables visual verification of whether the correlation spot or spike 110 exists. Preferably, a verification step 212 is executed by the computer or processor to determine in an automated manner whether or not the correlation spot or spike 110 exists. For example, the digital signal processing engine and digital signal processing software can also be used to quickly analyze the result without requiring human intervention to determine whether or not the correlation spot or spike 110 exists without having to display the result.

After verification 212 is completed, additional steps can be executed based on whether or not verification determined that the input mask 84 was authentic or not authentic. For example, a communication interface 214 of the computer 194 can cause a door to be unlocked, a signal to be transmitted, or perform another task depending upon whether the input mask 84 is authentic or not.

Figure 33:
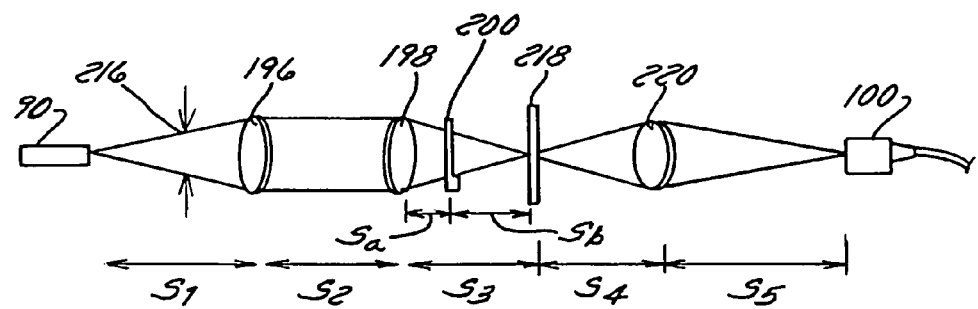
FIG. 33 is a schematic of another correlator.

Another preferred correlator embodiment that advantageously is scalable is shown in FIG. 33. The light source 90 is a laser diode, such as a LASERMAX model no. LAX-200-680-20 laser diode or LAS-685-30 laser diode commercially distributed by LaserMax, Inc., of 3495 Winton Place, Building B, Rochester, N.Y. Light from the source 90 passes through an iris aperture 216 before reaching a first lens 196 that is a collimating lens, such as an achromatic doublet collimating lens having a focal length of about 194.5 millimeters commercially distributed by JML Optical Industries, Inc., of 690 Portland Avenue, Rochester, N.Y. The light then passes through a second lens 198 that preferably is a JML achromatic doublet transform lens also having a focal length of about 194.5 millimeters.

After passing through the second lens 198, the light passes through both the input mask 84 and the reference mask 88. The masks 84 and 88 can be arranged side by side, such as coplanar, or such that one is in front of the other. When the light passes through both masks 84 and 88, it produces patterns of both masks that are Fourier transformed when the passes through a DC block 218 that preferably is a one millimeter square chrome DC block on soda lime glass.

After passing through the DC block 218, the patterns are focused by an imaging lens 220, preferably a JML achromatic doublet imaging lens having a focal length of about 100 mm, onto a recording device 100 that preferably is a CCD camera, such as a Cohu 6415-2100/AL16 CCD camera commercially distributed by Cohu, Inc., of 5755 Kearny Villa Road, San Diego, Calif. Although not shown in FIG. 33, the camera 100 preferably is connected to an image capture device 208 and computer 194 for performing an inverse Fourier transform 104 on the combined mask and reference patterns to thereafter verify whether a correlation spot or spike exists.

In a preferred implementation of the correlator shown in FIG. 33, the laser 90 is spaced a distance, $s_1$, of about 19 centimeters (cm) from the collimating lens 196, the collimating lens 196 is spaced a distance, $s_2$, of about 24 cm from the transform lens 198, the transform lens 198 is spaced a distance, $s_3$, of about 19 cm from the DC block 200, the DC block 200 is spaced a distance, $s_4$, of about 17.5 cm from the imaging lens 220, and the imaging lens 220 is spaced a distance, $s_5$, of about 25 cm in front of the camera 100. Preferably, transform lens 198 is spaced a distance, $s_a$, of about 4 cm in front of the input mask 84 and reference mask 88, and the DC block 218 is spaced a distance, $S_b$, of about 9 cm behind the masks 84 and 88.

Figure 34:
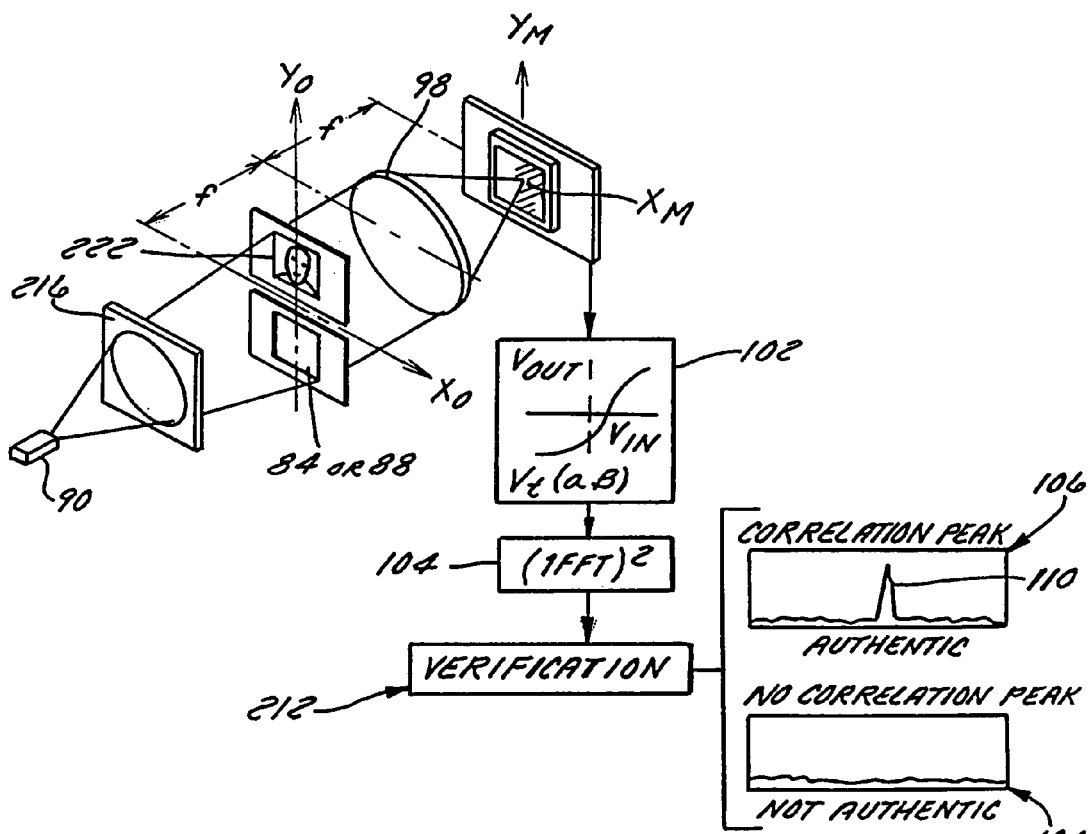
FIG. 34 is a perspective view of a correlator where a spatial light modulator comprises its input or reference.

FIG. 34 illustrates another preferred correlator embodiment where one of the masks comprises an SLM 222 that is displaying a biometric pattern that is a pattern of a facial image that is to be compared with mask 84 or 88 of another facial image pattern depending upon whether the non-SLM mask is the reference or the input. The SLM 220 can be connected by a control apparatus, such as the computer 194, to a source of reference mask pattern information that preferably comprises a database of such reference masks. Where the biometric information mask is to be scrambled, the source of pattern information provided to the SLM 222 preferably includes the both a reference scrambler mask and the information mask such that the mask or pattern displayed by the SLM 222 comprises an equivalent to a phase convolved mask.

An example of a mask pattern that can be generated using an SLM 222 is shown in FIG. 4. For example, SLM 222 preferably comprises a liquid crystal display (LCD). In one embodiment, the SLM 222 comprises a LCD panel having an array of 64 rows by 64 columns of liquid crystal elements or pixels whose phase can be selectively varied. Such pixels are analogous to the structures 86 shown in FIG. 4. Preferably, each phase element or pixel of the SLM 222 can have assume any of 256 phase levels, each of which can be represented digitally by an 8-bit word. The SLM 222 is of digital construction such that it is driven by digital driver circuitry in communication with the computer that executes the reference mask database.

For example, in another preferred embodiment, the SLM 222 is a high resolution, flat liquid-crystal (LC) panel, typically used for display applications like television, sold by Epson of 20770 Madrona Avenue, Torrance, Calif., and which requires a video graphics array (VGA) input. Such an SLM 222 has a high resolution of 640×480 pixels. Its input can be connected to an output of a video graphics card of a computer such that all of the pixels of the SLM 222 are driven by the computer. The characteristics of the Epson LCTV are shown below in Table 1:

TABLE 1

| Resolution | 640 × 480 pixels |
| --- | --- |
| Diagonal Dimension | 34 mm |
| Pixel Size | 23 μm × 19 μm |
| Array Period | 42 μm × 42 μm |
| Active Area | 40% |
| Transmission efficiency | 33% |

For a particular pixel of the SLM 222, a grey scale level of zero (black) results in minimum light transmission of less than about 8%. Light transmission increases nonlinearly with increasing grey scale such that it approaches 100% transmission when the grey scale is 255 (white).

Other LC panels believed to be suitable for use as the SLM 222 include a Sony LCX 003BK LC panel and a SONY LCX007AK LC panel, both commercially distributed by Sony of 550 Madison Avenue, Floor 33, New York, N.Y., and an LC panel marketed under the tradename DIGITAL MICROVIEWER by Texas Instruments, Inc. The Sony LCX007AK LC panel is believed to be particularly well suited for use in transmission-mode correlators because it possesses a high resolution and a high contrast ratio. The DIGITAL MICROVIEWER LC panel is believed to be well suited for reflection-mode correlators.

If desired, the volume phase mask 84 or 88 shown in FIG. 34 can comprise the reference mask 88 so that real-time biometric authentication information can be processed. For example, the SLM 222 can be coupled to an image recording and capturing device or a scanner (not shown) that scans in real-time the facial image of a person so it can be correlated against the mask 84 or 88 to determine whether the person has the identity they claim to possess. If desired, both the input mask and the reference mask can both comprise SLMs 222 such that real time biometric information can be displayed by one SLM 222 and the reference information can be displayed by the other SLM 222 which also preferably communicates with a database of reference patterns.

Figure 35:
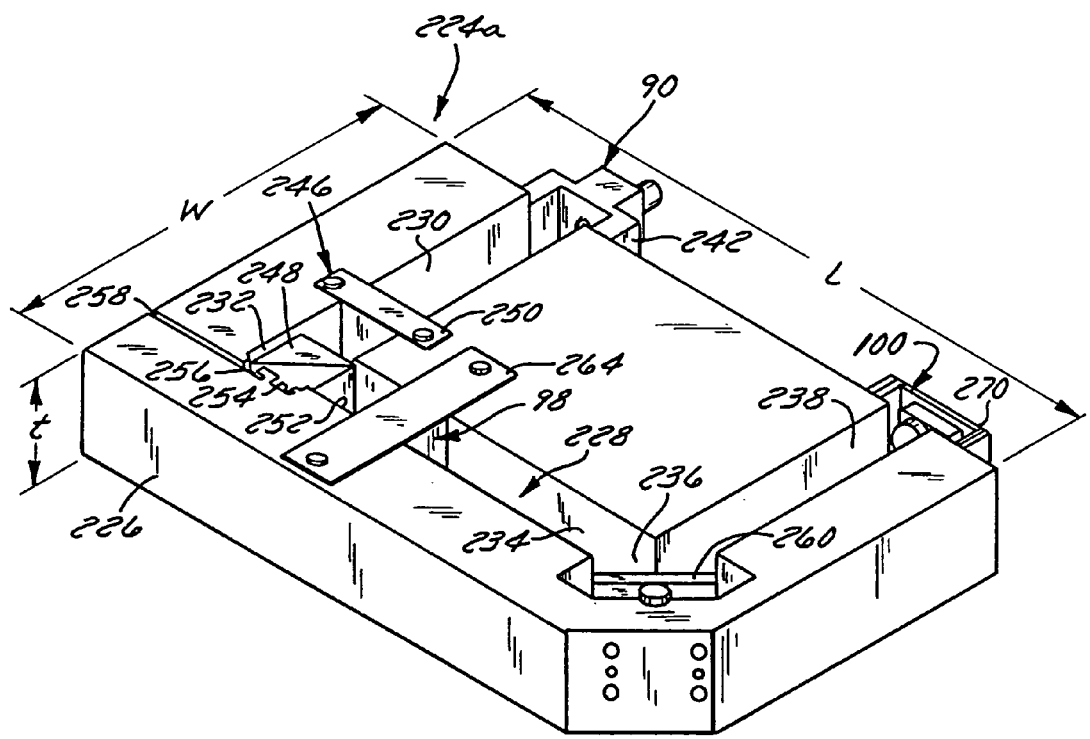
FIG. 35 is a perspective view of a first preferred compact correlator embodiment.
Figure 36:
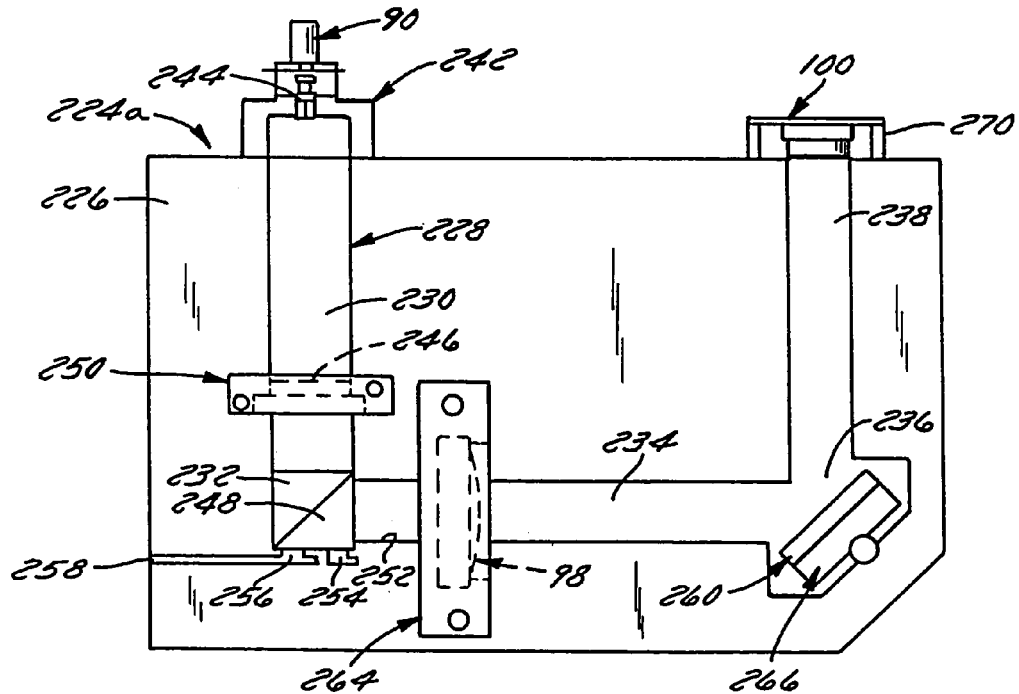
FIG. 36 is a top view of the compact correlator.

FIGS. 35 and 36 illustrate a preferred reflection-mode correlator assembly 224a that is of compact construction. Its housing 226 is preferably made of a plastic or a metal, such as aluminum, but can also be made of other materials. Its light tunnel 228 preferably is generally U-shaped having a first leg 230, a first bend 232, a middle leg 234, a second bend 236, and a last leg 238.

A laser 90 is disposed at one end of the first leg 230. The laser 90 is carried by a holder or bracket 242 that is mounted by fasteners to the housing 226. The output of the laser 90 is directed through a double concave lens 244 toward a collimating lens 246 that is located between lens 244 and a beam-splitting prism 248 located at the first bend 232. The collimating lens 246 is received in a lens holder 250 that is disposed in a slot in the housing 226.

A sidewall 252 of the middle leg 234 adjacent the intersection between the first leg 230 and middle leg 234 has a pair of spaced apart aperture windows 254 and 256 therein with one of the aperture windows 254 receiving the reference mask 88 or SLM 222 and the other of the aperture windows 256 receiving the input mask 84. The outer window 256 communicates with a slot 258 in the housing 226 into which can be inserted a card or tag carrying the input mask 84. The windows 254 and 256 are spaced apart so as to space the reference mask 88 from the input mask 84 a distance Δx.

The middle leg 234 of the tunnel 228 preferably is disposed at an angle of about 90° relative to the first leg 230. The prism 248 is located at one end of the middle leg 234 and a mirror 260 is located at its opposite end. A Fourier transform lens 98 is mounted in a holder 264 received in a slot in the housing 226 that is located between the prism 248 and the mirror 260. The mirror 260 preferably is attached to a holder 266 that is mounted to the housing 226 and which is constructed to permit precise angular adjustments to be made to the mirror 260.

The last leg 238 of the tunnel 228 preferably is disposed at an angle of about 90° relative to the middle leg 234. The mirror 260 is located at one end of the last leg 238 and a recording device 100 is disposed at its opposite end. The recording device 268 is mounted by a bracket 270 to the housing 226.

In a preferred embodiment of the compact correlator 224a, the housing 226 is of solid block design to maintain the accurate location and alignment of its components. The laser 90 is a laser diode packaged in a TO can having an output power of at least about 1 milliwatt to provide a high enough signal-to-noise ratio for successful correlator operation. The collimating lens 246 preferably has a focal length of 45 mm with a 22 mm open aperture. The beam splitter 248 preferably is a cube-type prism to help make the correlator 224a more compact by enabling reflection-mode correlation to be used. The Fourier lens 98 is 45 mm in focal length. Preferably, the recording device is a CCD camera or CCD chip carried by a bracket that is removably mounted to the housing. Such a correlator 224a is of compact construction because it has a thickness, t, of no greater than about 1.625 inches, a width, w, of no greater than about 7 inches, and a length, l, of no greater than about 10 inches.

Figure 37:
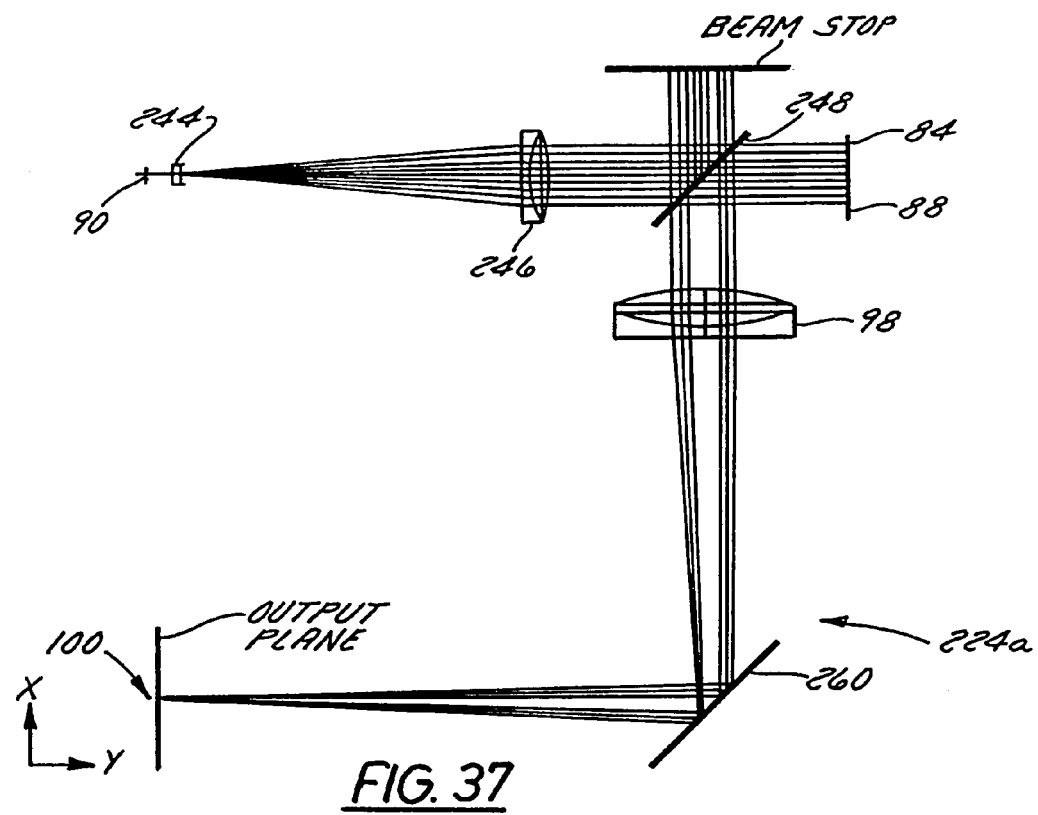
FIG. 37 is a ray tracing of the compact correlator.

FIG. 37 depicts a ray tracing of the correlator 224a. Light from the laser 90 passes through the double concave lens 244 and the collimating lens 248 where it reaches the beam splitter 248. Light passing through the splitter 248 irradiates the input mask 84 and the reference mask 88. Light reflected back from the masks 84 and 88 carries images of them back to the splitter 248 where it is directed at an angle toward the Fourier lens 98. After passing through the lens 98, the light is reflected or folded by the mirror 260 toward an output plane where the camera 100 is located. The Fourier-transformed mask patterns recorded by the camera are first electronically non-linearly transformed and thereafter inverse Fourier transformed to determine whether the input mask is authentic.

Figure 38:
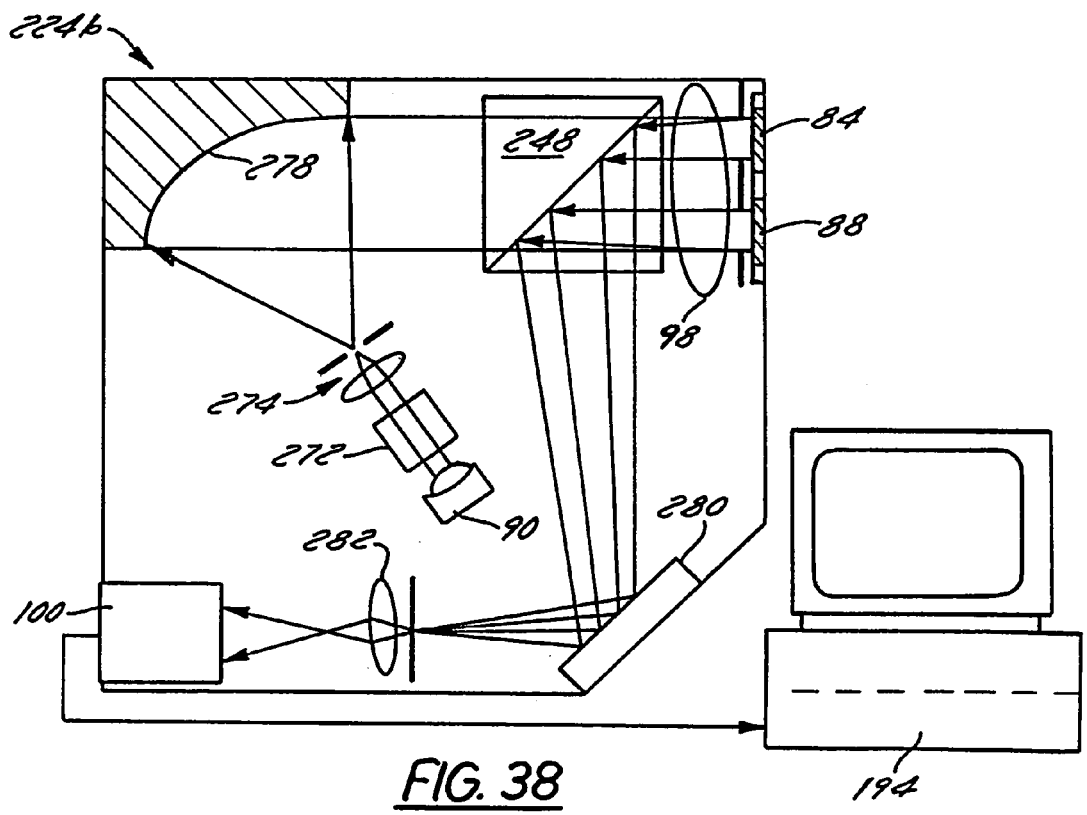
FIG. 38 is a top view of a second preferred embodiment of a compact correlator.

FIG. 38 depicts another preferred embodiment of a compact reflection-mode correlator 224b where both the laser 90 and camera 100 are disposed inside the housing. Light from the laser 90 passes through an attenuator 272 and a spatial filter 274 before reflecting off a parabolic mirror 287 toward the beam splitter 248. Light passing through the splitter 248 reflects off of the masks 84 and 88 back toward the splitter 248. The reflected light carrying the mask patterns passes through the Fourier transform lens 98 before the splitter 248 deflects the reflected light toward a second mirror 280. After being folded by the mirror 280, the light passes through a micro-objective lens 282 that focuses the light onto the camera 100. The camera 100 is connected to a frame grabber of a personal computer 194.

As is generally depicted by FIG. 38, the laser 100 is disposed at an acute angle relative to mirror 278. Preferably, the laser 278 is disposed at an angle between about 30° and about 60° relative to the mirror 278. Preferably, the laser 278 is disposed at an angle of about 45°. By using a parabolic mirror 278 and because the laser 100 is located inboard of the components 278, 248, 84, 88, 280 and 282 of the correlator 224b, the correlator 224b of this invention is also advantageously compact.

Figure 39:
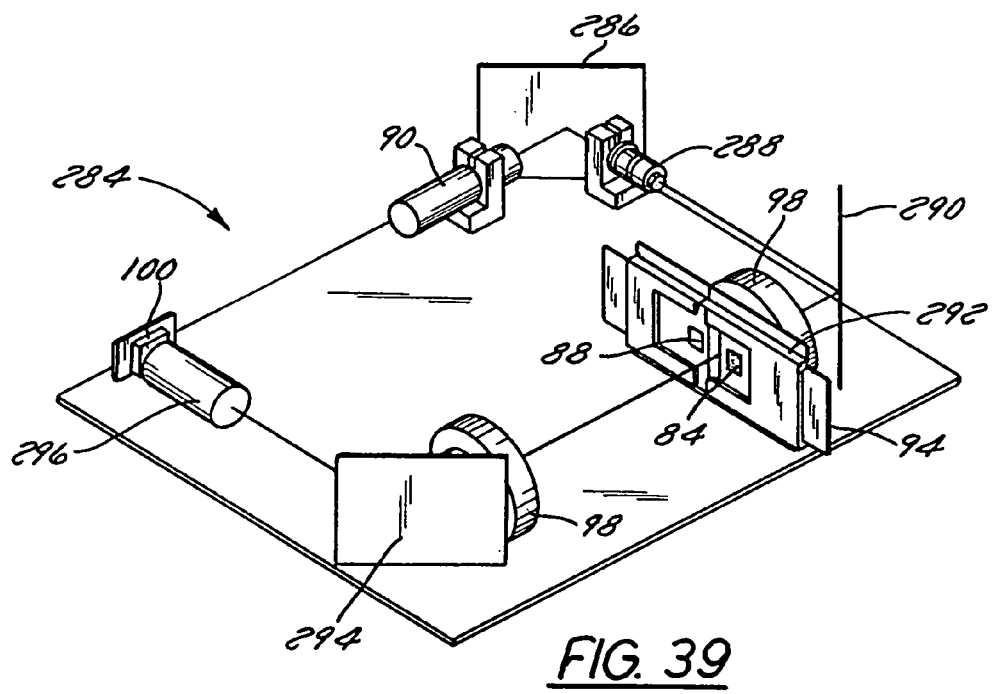
FIG. 39 is a perspective view of a third preferred embodiment of a compact correlator.

FIG. 39 illustrates a preferred embodiment of a compact transmission-mode correlator 284 where the laser 90 and camera 100 are both disposed inside the housing. Light from the laser 90 reflects off of a first mirror 286 before passing through a spatial filter 288. The light then reflects off of a second mirror 290 where it is transmitted through the reference mask 88 and the input mask 84 carried by a mask holder 292. The light passes through the Fourier lens 98 before being reflected by a third mirror 294 to a zero order lens 296 between the camera 100 and the mirror 294.

Figure 40A:
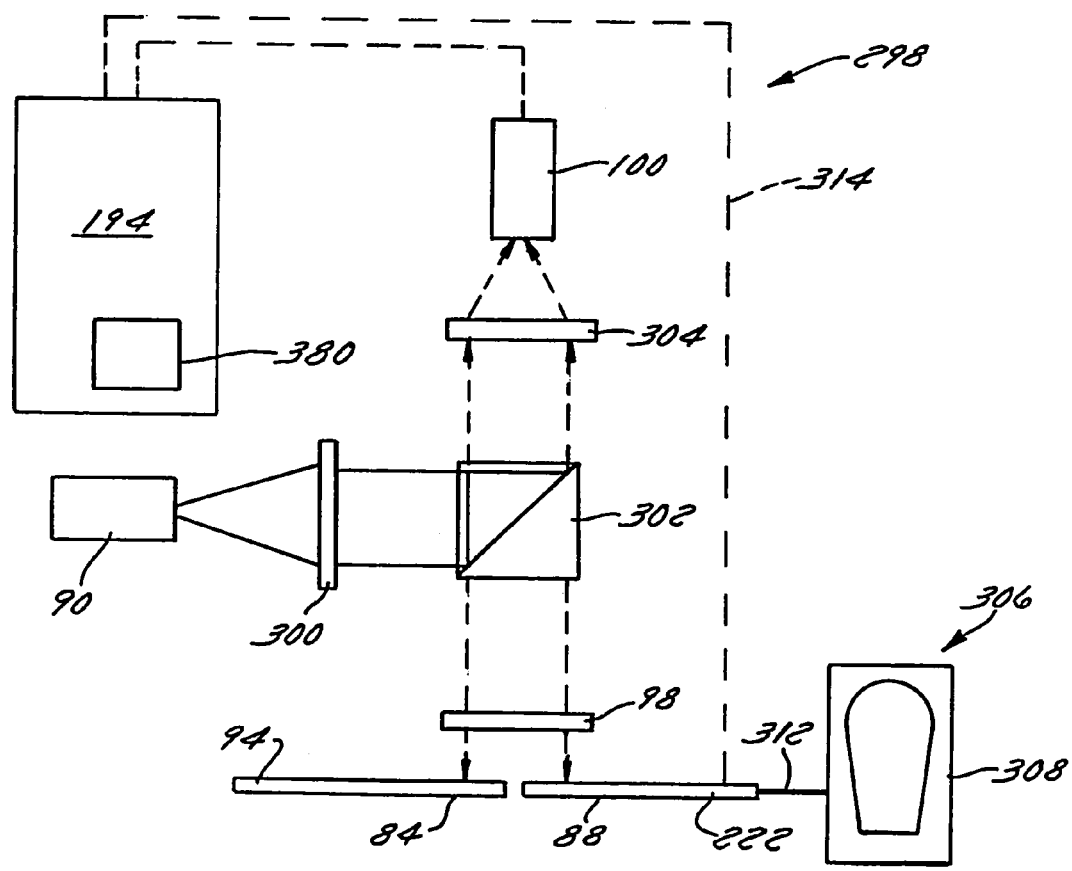
FIGS. 40A, 40B and 40C depict a correlator that uses a biometric pattern scanned from a person as its input or reference.
Figures 40B, 40C:
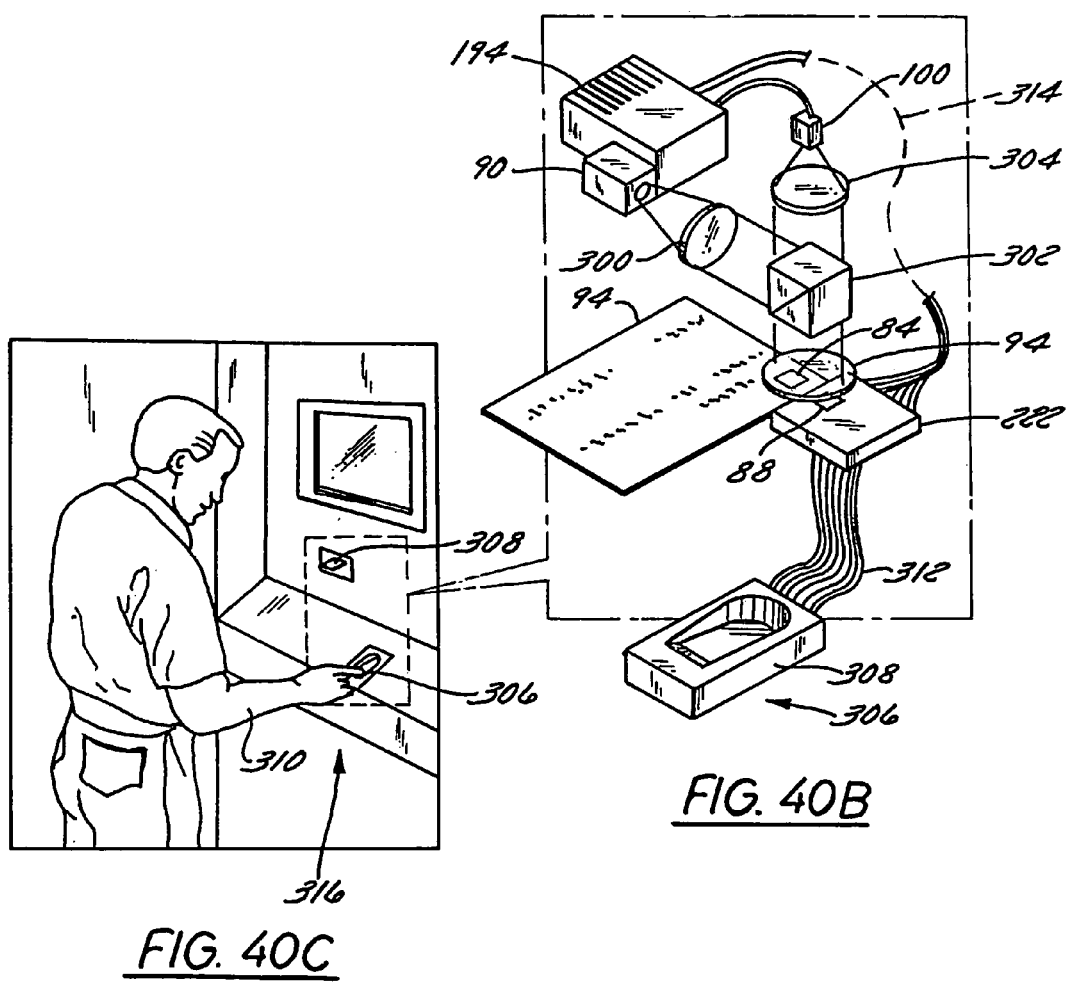

FIGS. 40A–40C illustrate use of a correlator 298 to authenticate using real-time biometric information that is, in this case, a fingerprint. Light from the laser 90 passes through a collimating lens 300 and a beam splitter 302 where it irradiates both mask 84, a volume phase mask label on a card 94, and mask 88, a fingerprint pattern on an SLM 222. Patterns from both masks 84 and 88 are reflected through the Fourier lens 98, the splitter 302, and an imaging lens 304 before being recorded by the camera 100. The camera 100 is connected to the processor 194 that nonlinearly transforms and inverse Fourier transforms the recorded mask patterns to determine whether the input mask is the same as the reference mask. So that the patterns interfere, the coherent length of the laser 100 should be longer than the largest path difference between the patterns.

Mask 88 is provided by an SLM 222 connected to a fingerprint acquisition system 306 that includes a scanner 308 that scans the fingerprint of a person 310 seeking their authenticity verified. Commercially available fingerprint acquisition systems can be used. The scanner 308 is connected by wiring 312 to the SLM 222 to provide the SLM 222 with the fingerprint scanned from the person 310. Wiring 314 also connects the processor 194 to the SLM 222 to provide the SLM 222 with the scrambler mask where a phase convolved mask is being used.

Referring to FIG. 40C, such an embodiment is well suited for use at a terminal 316, such as an ATM machine or the like, where the fingerprint of the person 310 using the terminal 316 is compared with a mask 84 of a label on the card 94. In operation, the card 94 is inserted such that the label is inside the machine 316 and can be read by the correlator 298. The person 310 inserting the card places their finger onto the scanner 308. The scanner 308 scans the fingerprint and provides the scanned fingerprint to the SLM 222. The scrambler mask can be downloaded to the SLM 222 prior to, during, or after scanning the fingerprint. The SLM 222 then displays the scanned fingerprint so it can be correlated against the mask on the card 94. The phase pattern down loaded to the SLM 222 can be provided from a database 390 (FIG. 40a) of patterns stored in a location accessible by the computer 194.

Figure 41A:
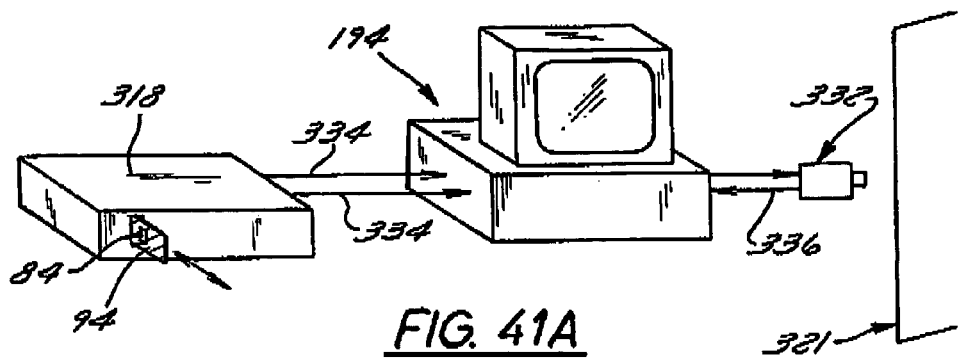
FIGS. 41A and 41B depict a correlator and processor that control access to a location.
Figure 41B:
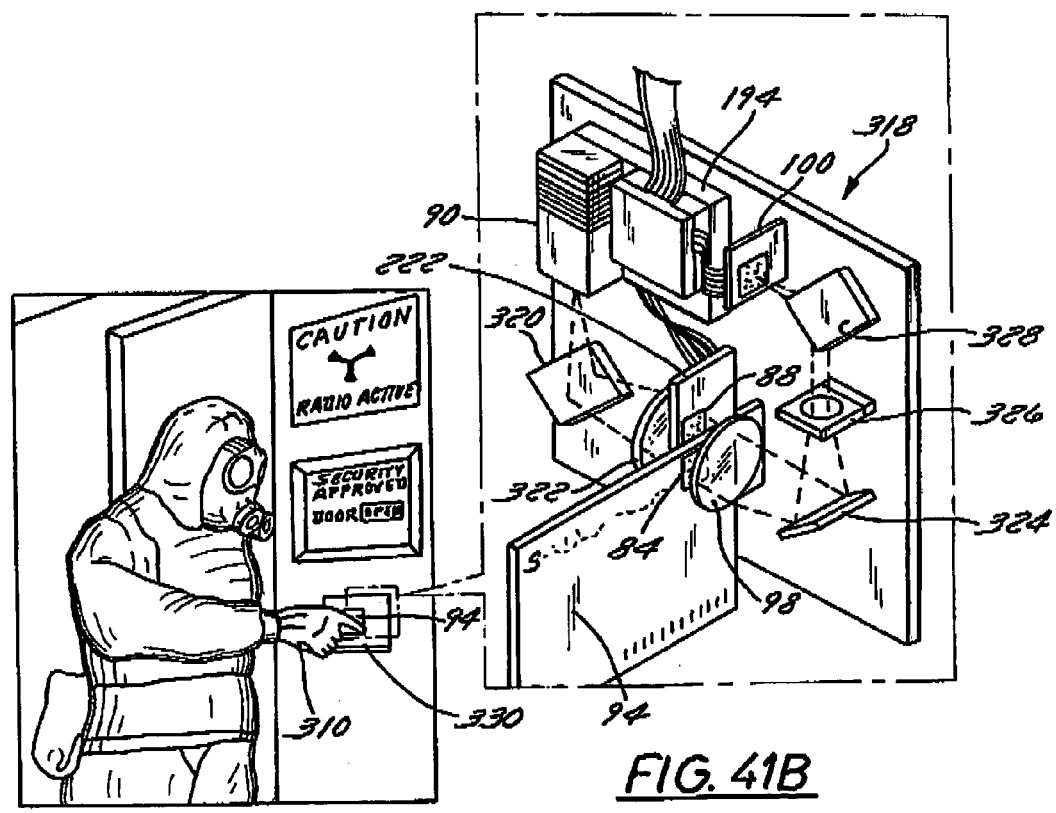

FIGS. 41A and 41B illustrate use of a correlator 318 of a card reader 330 to provide clearance to unlock a door 321 to enter a secure area. An identification card 94 carried on the person seeking access is inserted into the correlator 318 such that its label 84 is located inside the correlator 318 adjacent the reference mask 88. Referring to FIG. 41B, light from the laser 90 is reflected by a mirror 320 through a collimating lens 322 through the reference mask 88 and the input mask 84 of the label. The patterns from both masks 84 and 88 pass through the Fourier lens 98 and then are reflected by a second mirror 324 through another lens 326 before a third mirror 328 directs both patterns to a camera 100 coupled to a processor 194. The reference mask 88 preferably is provided by an SLM 222 coupled to the processor 194.

As is shown in FIG. 41A, the processor 194, generically represented in FIG. 41A as a computer, is electrically connected to an electric door opener 332 or electronic door lock 332 that is unlocked by the processor 194 if the authenticity of the input mask 84 on the card 94 is verified by the reference mask 88. The camera 100 preferably outputs a video signal that can be an NTSC-type video signal to the frame grabber 208 of the processor 194 on a bus 334 that preferably can be a RS-232 type bus. Another bus 336, that preferably is a bidirectional bus, connects the door opener 332 to the computer 194 and permits the computer 194 to monitor its status and unlock and/or lock the door 321.

Figures 42A, 42B:
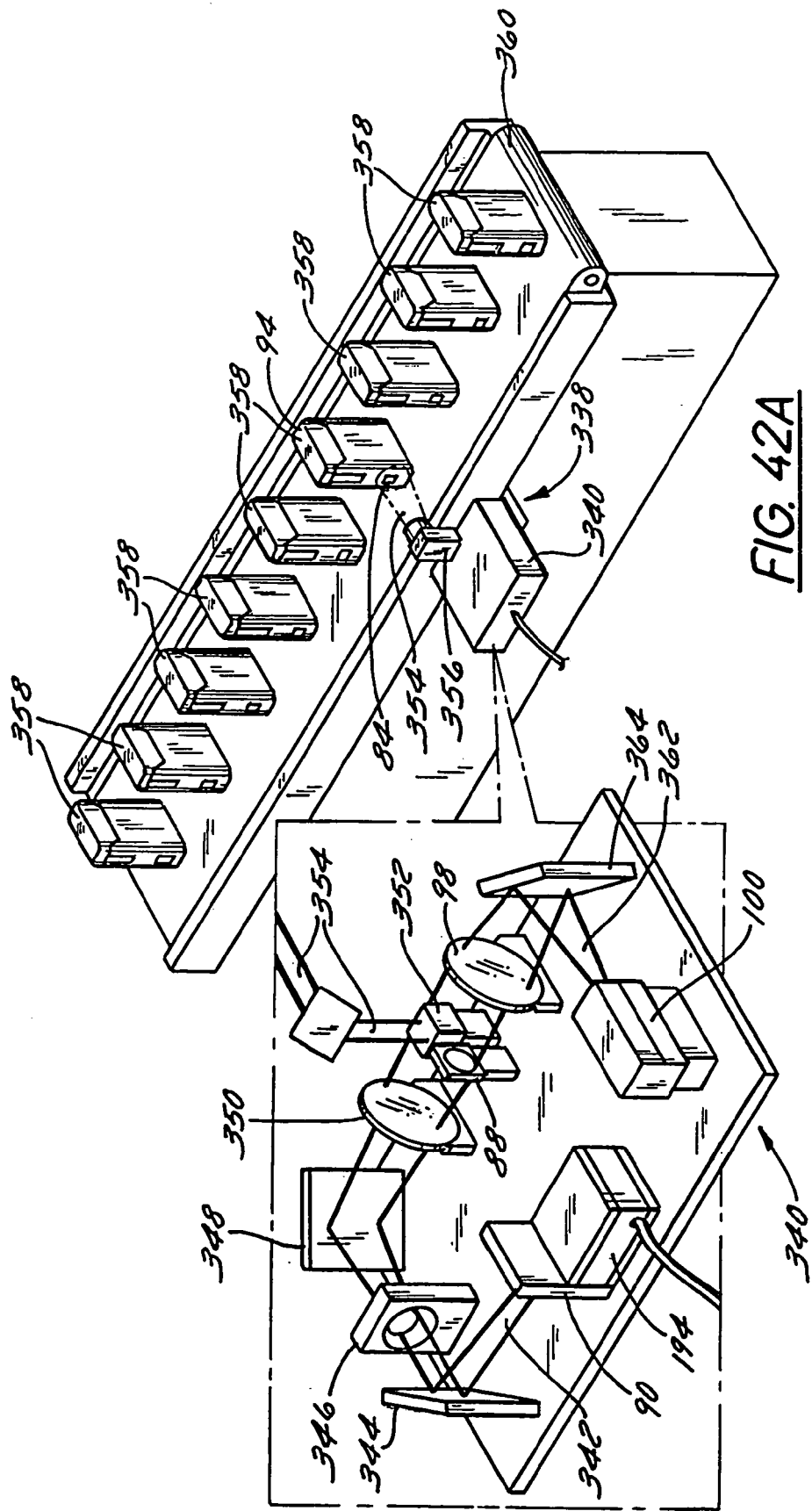
FIGS. 42A and 42B illustrate a correlator where the input and reference are not located on the same plane.

FIGS. 42A and 42B illustrate another correlator assembly 338 where a correlator 340 is being used to verify the authenticity of an input mask or input label 84 that is not located at or adjacent the plane of the reference mask 88. The laser 90 outputs a beam 342 that reflects off a first mirror 344 through a pin-hole 346 before reflecting off a second mirror 348 toward a collimating lens 350. After passing through the collimating lens 350, the beam 342 substantially simultaneously passes through the reference mask 88 and a beam splitter 352. The splitter 352 split off a portion 354 of the beam 342 and directs it toward an input mask scanning assembly 356 that includes a mirror 358 that directs the beam 354 toward an input mask or label 84 on an object 94 that can be a box 358 of a plurality of pairs of boxes 358 on an assembly line conveyor 360 or the like.

The beam 356 reflects off the mask or label 84 and returns to the scanning assembly 356 where it reflects off mirror 358 back toward the splitter 352. The splitter 352 directs the returned beam 356 toward the Fourier transform lens 98. The remainder of beam 342 that has passed through the reference mask 88 also is directed toward the Fourier transform lens 98. The pattern from the reference mask 88 and the pattern from the input mask or label 84 are transformed by the Fourier lens 98 and the result is a beam 362 that is folded by a mirror 364 toward the camera 100.

Although not shown in FIGS. 42A and 42B, the camera 100 is coupled to a frame grabber and processor that performs a nonlinear transformation and an inverse Fourier transformation on the result to verify whether the input mask or label 84 is authentic. A further quadratic term compensation is applied to the result to resolve a quadratic term that occurs because the masks 84 and 88 are not disposed in the same plane during correlation.

More specifically, while splitter 352 is located at the front focal plane of the Fourier lens 98, the input mask 84 is not. A quadratic term is introduced because the beam 354 split by the splitter 352 has to travel a path length to and from the input mask or label 84 before reaching the Fourier lens 98 that is greater than the path length from the reference mask 88 to the lens 98. This quadratic term is resolved so as to permit correlation to be accurately performed.

While the correlator assembly 338 is shown scanning labels 84 on boxes 358, the correlator 340 can be part of a hand-held correlator assembly used to scan a label 84 on a product in a store, warehouse or other location to determine the authenticity of the item with the label 84.

Other Correlator Applications are Possible.

VIII. Theory of Operation

A. Volume Phase Mask

Referring to FIG. 5, consider, for example, a transmission-type mask modulated by the aperture function, $P(x_M, y_N)$. A collimated coherent laser beam illuminates the recording medium 132 at plane, $x_M, y_N$, producing an angular distribution of the intensity pattern at the second plane, $x_0, y_0$, that is defined by the equation presented below:

$$J(\vec{s}) = A\cos\partial \int\int dx_o dy_o e^{-ik\vec{s}\vec{r}_o} W(\vec{r}_o) \quad \text{(Equation 1)}$$

where W is the variable intensity cross-correlation function, $W(\vec{r}) = \langle \tilde{I}(\vec{r}+\vec{r}')\tilde{I}(\vec{r}')\rangle$, $\langle \ldots \rangle$ is the statistical ensemble average, $\vec{s} = (s_x, s_y)$ is the directional cosine vector, $(s_x^2 + s_y^2 + s_z^2 = 1)$ is the angle between the direction of observation and the z-axis, and $k = 2\pi/\lambda$. By theoretical analysis it is obtained:

$$J(\vec{s}) = P \otimes P = A\cos\partial \int\int P(x_M, x_M) \times \quad \text{(Equation 2)}$$
$$P\left(x_M - \frac{\lambda_R}{\lambda}s_x \cdot h, y_M - \frac{\lambda_R}{\lambda}s_y h\right) dx_M dy_M$$

where δ is the angle between the observation direction and the z-axis, $\lambda_R$ is the recording wavelength, and ⊗ is the auto-correlation or cross-correlation symbol. The above equation is based on the fundamental statistical optics theorem for stochastic patterns.

Assuming, for simplicity, the simplest rectangular form of the aperture function and that $\lambda = \lambda_R$, the following is obtained:

$$P(x, y) = rect\frac{x}{L} rect\frac{y}{W} \quad \text{(Equation 3)}$$

where rect( . . . ) is the rectus function and (L,W) are aperture dimensions in the $(x_M, y_M)$ plane. Equation 2 above becomes:

$$J(s_x, s_y) = D\cos\partial \Lambda\left(\frac{s_x}{s_{x_o}}\right)\Lambda\left(\frac{s_y}{s_{y_o}}\right) \quad \text{(Equation 4)}$$

where is ( . . . ) is the triangular function:

$$s_x = \frac{L}{h}, s_{y_o} = \frac{W}{h} \quad \text{(Equation 5)}$$

The phase mask used to hold the authentication information, i.e. either a random pattern or the convolution of an information mask pattern and a scrambler mask pattern, is based upon a generalized aperture concept where the aperture function, P(x,y), which typically characterizes only the window effect, is replaced by the generalized aperture function, G(x,y), that is, in general, a complex function preferably in the form of a transparency that provides general information content. For the specific phase mask where the information mask is scrambled by the scrambler mask, the generalized aperture function becomes a purely phase function in the form:

$$G(x,y) = \exp[i\phi(x,y)] \quad \text{(Equation 6)}$$

For the simplified case of two relatively "smooth" functions, the autocorrelation function produces the same sort of profile as Equation 4, while the cross-correlation function does not identically vanish where the "smooth" functions are different. For the case of two "noise-like" functions, the autocorrelation is of the Dirac-delta type, while the cross-correlation function identically vanishes.

The Dirac-delta response for a fully-random stochastic phase encoded mask pattern is similar to the process described by the basic Gabor theorem for noise-like patterns representing so-called "Gabor memories," that is it is identically zero until the patterns being correlated are completely identical. Any higher-correlation "islands" can destroy this.

As a result, for the case of the generalized aperture function where $\lambda = \lambda R$, Equation 2 becomes:

$$J(\vec{s}) = G \otimes G = A\cos\partial \int\int G(x_M, y_M) \times \quad \text{(Equation 7)}$$
$$G^*(x_M - s_x \cdot h, y_M - S_{y_M} \cdot h) dx_M dy_M$$

where the asterisk (*) is the conjunction symbol. Where a purely phase noise-like function, such as Equation 6, is considered, Equation 7 becomes the Delta-dirac function for two identical aperture functions and vanishes identically for two different aperture functions.

Figure 43:
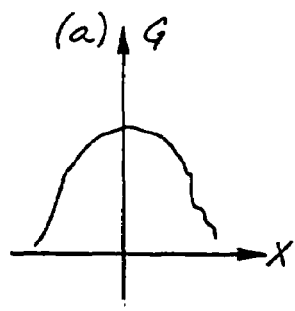
FIGS. 43 and 44 are graphs of two "smooth" functions.
Figure 44:
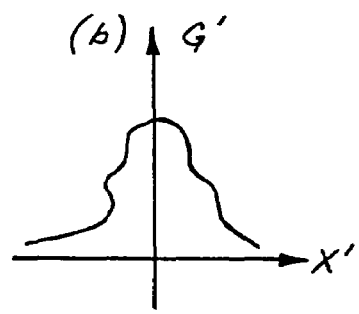
Figure 45:
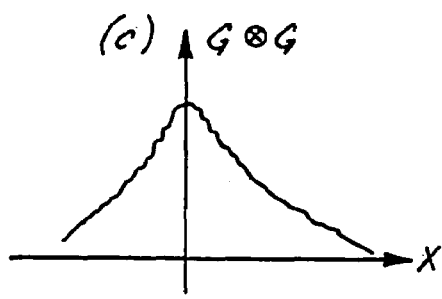
FIG. 45 is a graph of their autocorrelation function.
Figure 46:
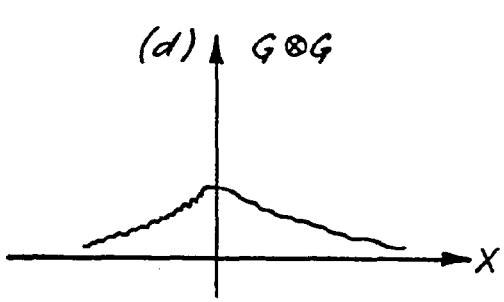
FIG. 46 is a graph of their cross-correlation function.
Figure 47:
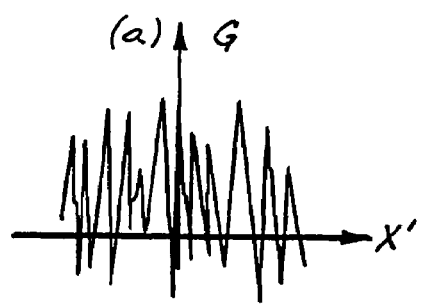
FIGS. 47 and 48 are graphs of two "noise-like" functions.
Figure 48:
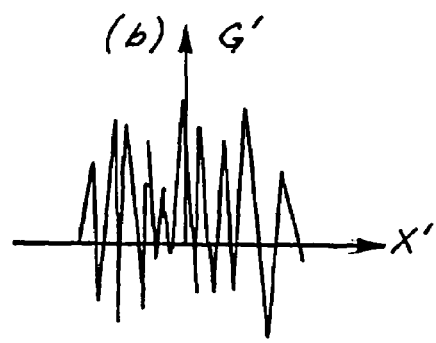
Figure 49:
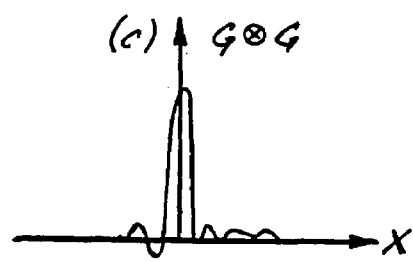
FIG. 49 is a graph of their autocorrelation function.
Figure 50:
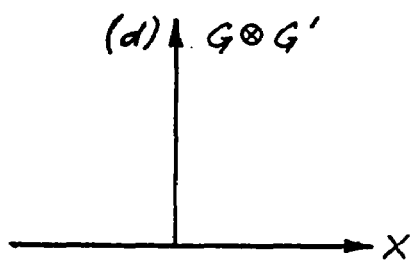
FIG. 50 is a graph of their cross-correlation function.

Examples of this are shown in FIGS. 43–50. FIGS. 43 and 44 illustrate two exemplary "smooth" functions, G and G'. FIG. 45 illustrates their autocorrelation function and FIG. 46 depicts their cross-correlation function. Note that their autocorrelation does not have a Dirac-delta profile and the cross-correlation does not vanish identically. FIGS. 47 and 48 show two exemplary "noise-like" functions, G and G'. FIG. 49 illustrates their autocorrelation and FIG. 50 depicts their cross-correlation function. Note that the autocorrelation of the "noise-like" functions does have a Delta-dirac profile and that the cross-correlation does vanish.

Figure 51:
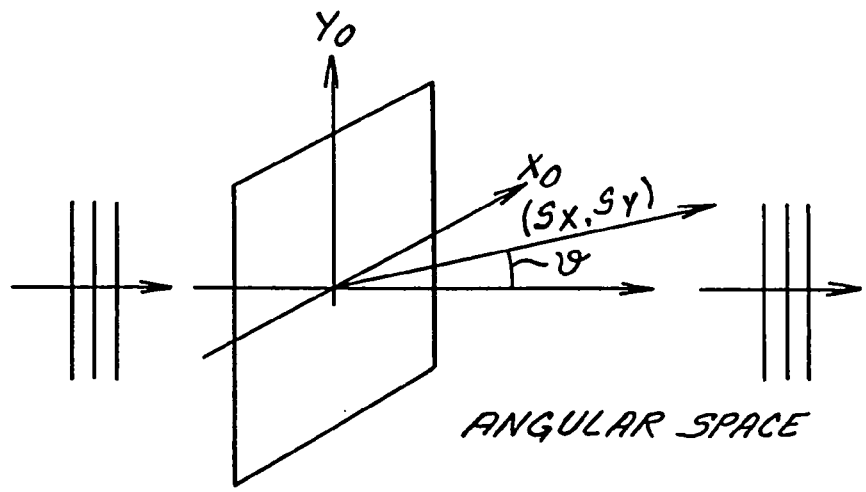
FIG. 51 is a schematic depicting angular space.
Figure 52:
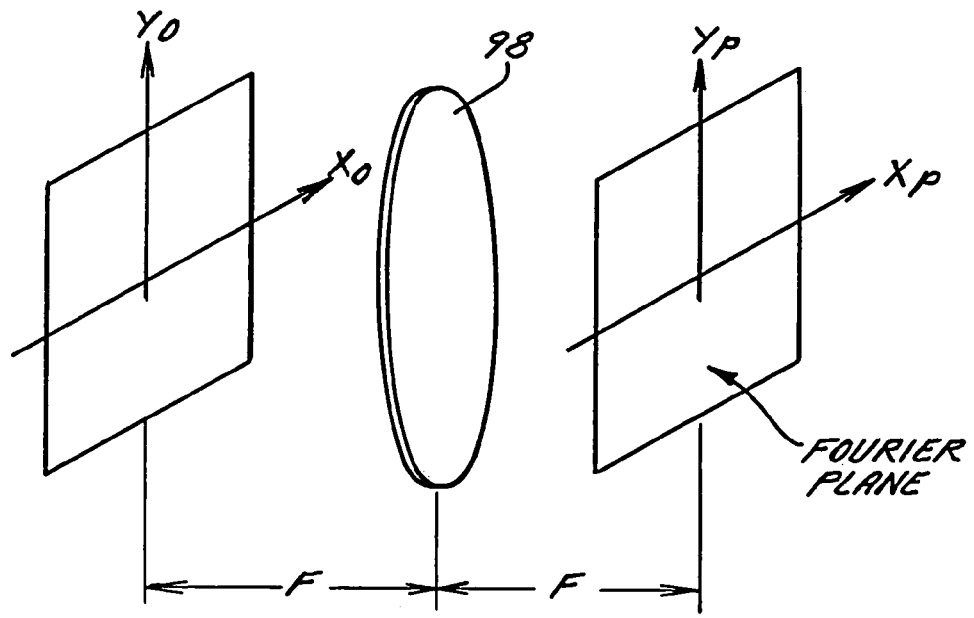
FIG. 52 is a schematic depicting Fourier space.

Referring to FIGS. 32, 51, and 52, during verification of authenticity of an input mask 84, by providing a Fourier transform lens behind the $(x_o,y_o)$ plane, the following transformations between angular space and Fourier space are obtained:

$$s_x \to f_x = \frac{s_x}{\lambda}; f_x = \frac{x}{\lambda F} \quad \text{(Equation 8)}$$

$$s_y \to = f_y = \frac{s_y}{\lambda}; f_y = \frac{y}{\lambda F} \quad \text{(Equation 9)}$$

where $(f_x,f_y)$ are spatial frequencies and F is the focal length of the Fourier transform lens. Equations 8 and 9 demonstrate that angular space can always be transformed into Fourier space and vice-versa. Using equations 8 and 9, the following is obtained:

$$x + \lambda F \cdot f_x = \lambda F \frac{s_x}{\lambda} = F \cdot s_x \quad \text{(Equation 10)}$$

$$x = \lambda F \cdot f_x = \lambda F \frac{s_x}{\lambda} = F = F \cdot s_y \quad \text{(Equation 11)}$$

Thus, Equation 7 can be transformed to the following form for case where $\lambda=\lambda_R$:

$$J(x, y) = A\cos\theta \quad \text{(Equation 12)}$$

$$\int\int P(x_M, y_M) \cdot P^*\left(x_M - \frac{x \cdot h}{F}, y_M - \frac{yh}{F}\right) d x_M D y_M$$

here (x,y) represents the Fourier plane $(x_P,y_P)$, as shown in FIGS. 32 and 52. In this context, the inverse joint Fourier transform (JFT) has the following form (in the Fourier plane):

$$J(x,y)=|R(x,y)|^2+|S(x,y)|^2+|R||S|I(x,y) \quad \text{(Equation 13)}$$

where R and S are Fourier transforms of generally complex object functions r and s and $2|R||S|I(x,y)$ is an Interference Term, while the cosine term $I(x,y)$ has the form:

$$I(x, y) = \cos[2\pi(f_x \cdot \Delta_x + f_y \cdot \Delta y) + \phi_o] = \quad \text{(Equation 14)}$$
$$\cos\left[2\frac{\pi}{\lambda F}(x \cdot \Delta x + y \cdot \Delta y) + \phi_o\right]$$

where Equations 10 and 11 were used, $\phi_0$ is the constant phase term, and $(\Delta x, \Delta y)$ determines the relative object shift in the $(x_0,y_0)$ plane.

The inverse JFT for two identical "noise-like" objects is equivalent to the translation of a single object by the $(\Delta x, \Delta y)$ value. Thus, a stable interference term I(x,y) is produced. This situation is nearly identical in the case of the translation of a diffuse object without deformation, in the case of double-exposure holographic interferometry. The analogy is complete, with the exception that in the latter case, reference beams are used to holographically record the same object twice. Nevertheless, from the mathematical point of view, the interference term in equation 14 is almost identical to the interferometric term in double-exposure holographic interferometry.

The inverse JFT for two different "noise-like" objects is equivalent to significant deformation of a diffuse object structure between two exposures in the holographic interferometry analogy. However, in the present case, the $(\Delta x, \Delta y)$ translation cannot be precisely defined. In other words, it becomes a random variable, and the cosine term in Equation 14 must be replaced by its statistical ensemble average, in the form:

$$<I(x,y)>=0 \quad \text{(Equation 15)}$$

Therefore, as in the holographic interferometry analog, stable interference fringes do not exist, and the interference term in Equation 14 vanishes.

The general aperture double scrambling system of this invention is best illustrated by reference to FIGS. 4, 21–23 and 32. A generic representation of preferred system geometry is shown in FIG. 32 and is a JFT correlator that correlates a pair of masks 84 and 88, each capable of having both an information mask and a scrambler mask scrambled together, to determine whether the input mask 84 is authentic in view of the reference mask 88.

By generalizing Equation 4 into the form given in Equation 7 and using the transformation in Equations 10 and 11, the inverse JFT formula in Equations 13 and 14 are combined as shown below to provide the intensity of the light in the Fourier plane, $(x_P,y_P)$ after it has passed through or been reflected off of both masks 84 and 88:

$$J(x,y)=G\otimes G+H\otimes H+2G\otimes HI(x,y) \quad \text{(Equation 16)}$$

where G and H are generalized apertures representing information, and can be recorded in contact with random masks, such as in the manner shown in FIGS. 27–29 and $2G\otimes HI(x,y)$ is an Interference Term. The $\otimes$ symbol determines autocorrelation, or cross-correlation, and I(x,y) is the cosine term from Equation 14. According to Equation 12 and referring to FIG. 14, the cross-correlation function has the following form:

$$G \otimes H = A\cos\nu \quad \text{(Equation 17)}$$
$$\int\int G(x_M, y_M) x H^*\left(x_M - \frac{x \cdot h}{F}, y_M - \frac{yh}{F}\right) dx_M dy_M$$

where $(x_M, y_M)$ determines the primary recording plane of the mask, h is the recording distance between the pattern or patterns being recorded (FIGS. 5 and 27–29) and the recording plane $(x_0, y_0)$, and the F is the focal length of the Fourier lens 98.

Referring to FIG. 28, the patterns to be recorded can be in the form of a compound mask. An example of a compound mask, used during recording a phase convolved mask where an information mask 180 is convolved with a scrambler mask 182, is shown in FIG. 28 and is comprised of the information mask 180 and scrambler mask 182 placed together in overlapping relationship. High security is attained when a Fresnel or diffraction transformation is performed on the combined image patterns from the compound mask 180 and 182 located at plane $(x_M, y_M)$ in the manner depicted in FIGS. 14 and 16 and thereafter recorded in a volume phase mask at plane $(x_0, y_0)$.

The Fresnel transformation convolves or integrates both masks 180 and 182 together such that when they are recorded in the volume phase mask 132 they form a phase convolved mask and the information mask and scrambler mask are so convolved that they cannot be separated, either optically or otherwise. This is also reflected in the significant difference between Equations 13 and 17. The primary difference between the two equations is that Equation 17 reflects providing the additional recording step of performing the Fresnel transformation. It is the additional novel step of performing the Fresnel transformation that convolves the information mask and the scrambler mask to produce a double-security level, general aperture double scrambling authentication system of this invention.

In this novel system, the interference term in Equation 16, and, thus the JFT correlation peak is stable, i.e. does not vanish, if, and, only if, the following conditions are satisfied independently and simultaneously of two phase convolved masks being correlated: (1) the information mask of the input mask 84 is the same as the information mask of the reference mask 88, and (2) scrambler mask of the input mask 84 is the same as the scrambler mask of the reference mask 88. The four possible cases for the phase convolved masks of the invention and their interference term outcomes are summarized below in Table 2:

TABLE 2

| Case | SPMs | IPMs | Interference Term Exists |
|---|---|---|---|
| 1 | Different | Different | No |
| 2 | Different | Same | No |
| 3 | Same | Different | No |
| 4 | Same | Same | Yes |

It should be noted that where only a random pattern mask is used, both random mask patterns of the input mask 84 and the reference mask 88 must be the same for authentication to occur. Where only a random pattern is used, there is no information mask pattern to compare.

In case 1 and 2 of Table 2 above, it is clear from Equation 16 that the interference term vanishes providing no correlation peak. In case 3, the interference term vanishes in Equation 17 because the cross-correlation function is identically zero for different noise like objects, as was shown in FIG. 54. For case 4, the interference term does not vanish. This can be explained in two ways: (1) as in double-exposure interferometry, case 4 is equivalent to only diffuse object translation which thereby provides stable interferometric fringes, and (2) where random masks are identical, the $I(x,y)$ cosine term is stable and for $G=H$, the autocorrelation function $G \otimes G$ does not vanish.

For example, a random Gaussian pattern can be used as the scrambler mask and can be a Gaussian diffuser or the like. The pattern is transmitted as the phase parameter. Advantageously, the smallest details of the security mask, particularly those that define its spatial resolution, can be selectively controlled in accordance with the following equations:

$$a_x = \frac{\lambda h}{L}, \quad a_y = \frac{\lambda h}{w}$$ (Equation 18)

where L and W are the aperture dimensions of the recording plane $(x_M, y_M)$(FIG. 14) and h is the distance between the recording plane and the plane $(x_0, y_0)$ where the mask 132 is being recorded. Therefore, the recording parameters define the spatial resolution of the scrambler mask, i.e. how far apart the structures of the random pattern of the scrambler mask are spaced when recorded.

Where the information mask is a "noise-like" pattern, such as a fingerprint pattern, its resolving element can be defined as $(\delta_x, \delta_y)$ and transformed to the following resolving element of the cross-correlation in the $(x,y)$ plane:

$$W_x = \frac{\delta_x \cdot F}{h}, \quad W_y = \frac{\delta_y \cdot F}{h}$$ (Equation 19)

Figure 55:
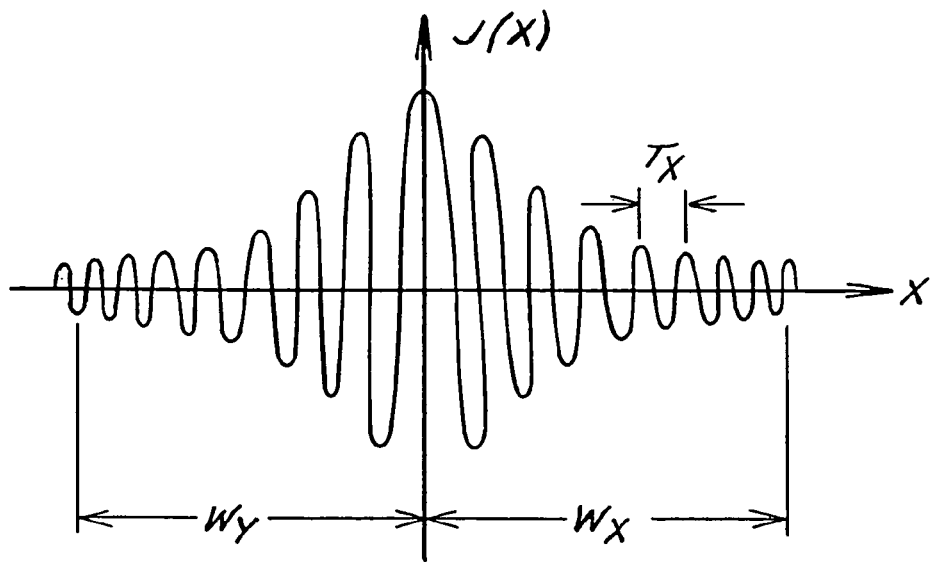
FIG. 55 is a graph of the autocorrelation function.
Figure 56:
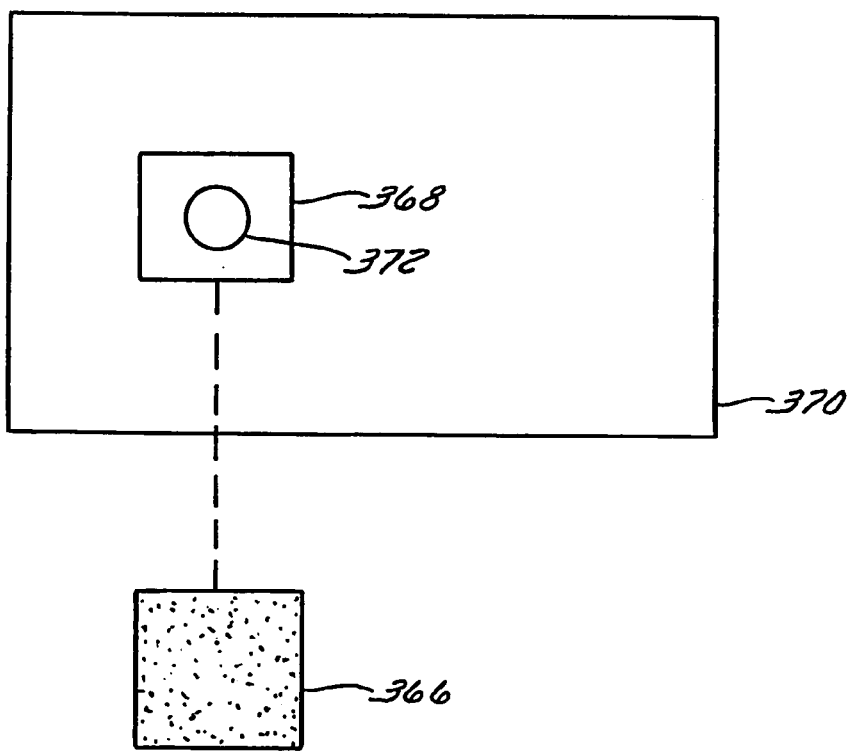
FIG. 56 represents an initial preparatory step of a second preferred adhesive-type replication process.
Figure 57:
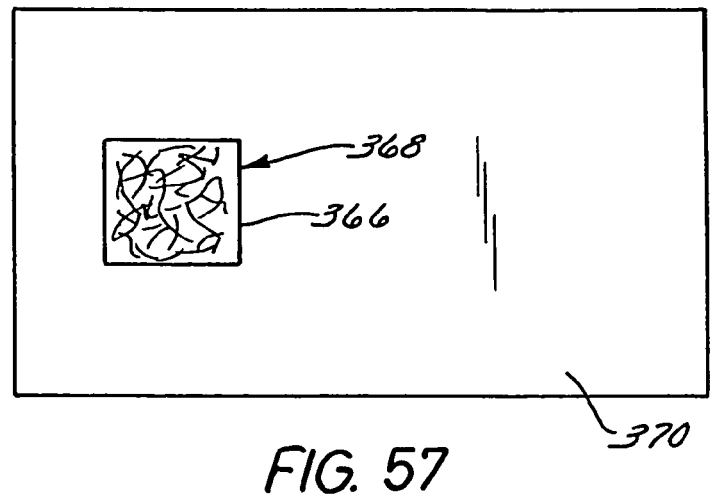
FIG. 57 illustrates application of a phase mask pattern maker onto the adhesive after the adhesive has been placed on a prepared portion of a substrate.
Figure 58:
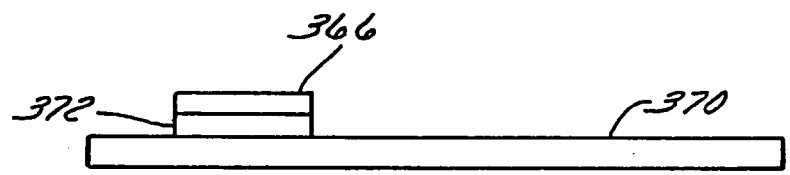
FIG. 58 is a side view of the arrangement shown in FIG. 57.

The autocorrelation function, $G \otimes G$, is shown in FIG. 55. According to Equation 14, the spatial periods of the cosine term or the I term are:

$$T_x = \frac{\lambda F}{\Delta x}, \quad T_y = \frac{\lambda F}{\Delta y}$$ (Equation 20)

Therefore, the number of periods observed in the interference term shown in Equation 14 are:

$$N_x = \frac{2W_x}{T_x} = \frac{2\delta_x \cdot \Delta_x}{\lambda h}$$ (Equation 21)

$$N_y = \frac{2W_y}{T_y} = \frac{2\delta_y \cdot \Delta_y}{\lambda h}$$ (Equation 22)

For example, for $\delta_x = 200$ μm, $\lambda = 0.8$ μm, $\Delta x = 1$ cm, and $h = 5$ cm, $N_x = 100$.

This is a sufficient number of fringes to produce a strong correlation peak in the JFT output (verification) plane $(x_P, y_P)$ of the nonlinear joint transform correlator of this invention.

B. Correlator

Referring generally to FIGS. 33–40A, 40B, 41B, and 42B, and particularly to FIGS. 30 and 32, during operation of the correlator, light is directed toward the reference mask 88, having a pattern $P_1$, and the input mask 84, having a pattern $P_2$. The input mask 84 is located in aperture window, $A_1$, and the reference mask is located in aperture window, $A_2$ in the front focal plane or input plane $(x_P, y_P)$ of the Fourier lens 98. The phase of the input plane-wave of the light is distorted when it passes through the masks 84 and 88 or is reflected off of the masks 84 and 88. The Fourier transform of the mask patterns is performed when the light passes through the Fourier transform lens 98 and results in interference between the two patterns. Where the mask is a phase convolved mask, each pattern comprises the convolved pattern of the input mask pattern and the scrambler mask pattern.

After being Fourier transformed, the intensity of the interference power spectrum of the light in the rear focal plane, i.e. the Fourier plane $(x_P, y_P)$ or output plane, is recorded by the CCD camera 100. Image processing software, preferably executed by the computer 194, along with a frame grabber 208, is used to read a bitmap image of the interference power spectrum from the camera 100 into the computer 194.

The intensity, I, of the power spectrum produced in the Fourier plane can be represented by the following equation:

and preferably is recorded by the camera 100. In Equation 23 above an asterisk (*) denotes the convolution and a superscript asterisk (*) denotes the complex conjugate.

$$I = |F\{P_1A_1 + p_2A_2\}|^2 \quad \text{(Equation 23)}$$

$$= \frac{1}{\lambda^2 f^2}\left[\begin{array}{l}|P_1*A_1|^2 + |P_2*A_2|^2 + (P_1*A_1)(P_2*A_2)^* \\ e^{-j\frac{x_2\Delta x}{f\lambda}} + (P_1*A_1)^*(P_2*A_2)e^{-j\frac{x_2\Delta x}{f\lambda}}\end{array}\right]$$

The first two terms of Equation 23 are not important to the verification process. The last two terms are the critical cross-correlations of the patterns from the input mask 84 and the reference mask 88, patterns $P_1$ and $P_2$.

An inverse Fourier transform, that preferably is an inverse FFT, is performed by the computer 194, such as by a digital signal processing engine of the computer, on the recorded power spectrum. The inverse FFT spectrum includes four terms and provides the inverse Fourier spectrum, I', of the spectrum, I:

$$I' = \frac{1}{\lambda f}[(P_1A_1)\otimes(P_1A_1)^* + (P_2A_2)\otimes(P_2A_2)^*] \quad \text{(Equation 24)}$$

$$[+(P_1A_1)\otimes(P_2A_2)^* * \delta(x_3 + \Delta x_3)]$$

where $\otimes$ denotes the correlation operation, $A_1$ and $A_2$ are the aperture windows of the correlator, $A_1$ and $A2$ are the aperture windows, f is a focal length of the Fourier lens 98, and $\lambda$ is the optical wavelength of the light source 90.

The first two terms of Equation 24 above are the auto-correlation of the two mask patterns, $P_1$ and $P_2$, centered at $\xi=0$, i.e. pixel=320 of the CCD camera on the shifted FFT spectrum. The last two terms in Equation 24 are the cross-correlation of the patterns, $P_1$ and $P_2$, centered at $x_3$ and $-x_3$, respectively. It is the cross-correlation terms that are critical to verifying authenticity of the input mask 84.

The corresponding distance, $\Delta$, on the inverse FFT transform is calculated to be:

$$\Delta = \frac{Na}{\Delta x_3} = \frac{Na\Delta x}{Mf\lambda} \quad \text{(Equation 25)}$$

where N is the total number of pixels of the camera 100, $\Delta x$ is the separation of the two mask patterns at the front focal plane of the Fourier lens, a is the pixel size of each pixel of the camera, f is the focal length of the Fourier transform lens, $\lambda$, is the wavelength of the light, and M is the magnification of the microscope objective lens.

The purpose of placing a microscope objective lens 206 in front of the camera 100 is to magnify high-frequency interference fringes that are created when the patterns of both masks 84 and 88 are transformed by the Fourier lens 98. Magnifying the fringes at the rear focal plane of the Fourier lens 98 enables the fringes to be recorded by a CCD-type camera 100 having a spatial resolution of at least about 10 microns. The amount of magnification, M, of the fringes provided by the lens 206 can be adjusted by moving the lens toward or away from the Fourier lens 98. The magnification, M, preferably is optimum or near optimum when the spacing of the fringes (f$\lambda$/$\Delta$x) is at least about four times larger than the camera pixel size, a. Preferably, the Fourier-transformed pattern recorded, i.e. the power spectrum, has at least about one hundred fringes with enough grey scale such that strong correlation peaks having a large separation are produced when the inverse Fourier transform is performed.

Placement of the camera 100 is critical. It is desirable that the camera 100 be located in a high-frequency zone in the power spectrum plane, the Fourier lens rear focal plane, so as to prevent zero-order diffraction light from entering the camera 100. This is because the zero-order diffraction light does not contain pattern information, but contains aperture information, and therefore has straight interference fringes whether the mask patterns are the same or different. Moreover, the zero-order diffraction light usually is several orders of magnitude stronger in intensity than light from the masks 84 and 88. Zero-order diffraction light should not enter the camera 100 because its higher intensity will saturate the camera 100 and undesirably bury the useful Fourier-transformed mask pattern information.

The recording element, such as the charge coupled device, of the camera 100 must be placed as close as possible to the rear focal plane of the Fourier lens 98 to record actual imaging of the Fourier-transformed mask patterns, i.e. power spectrum, by the camera 100. This is because any small deviation from this location can cause blurring and wiggling of the straight interference lines thereby resulting in a loss of the correlation peak in the inverse Fourier transform spectrum. It has been determined that the range of CCD element movement is about 1 mm for a peak signal-to-noise ratio above 2.

One way to relatively precisely locate the plane during placement of the camera 100 is to analyze the zero-order components of the power spectrum. When two zero-order spots from two mask patterns overlap, it indicates the recording element (CCD element) of the camera 100 is located in the rear focal plane of the Fourier lens 98. Strong intensity attenuation should be done when handling the zero order. Therefore, the recording element can be selectively moved toward or away from the Fourier lens 98 until this is achieved, in effect, tuning the correlator.

Figure 53:
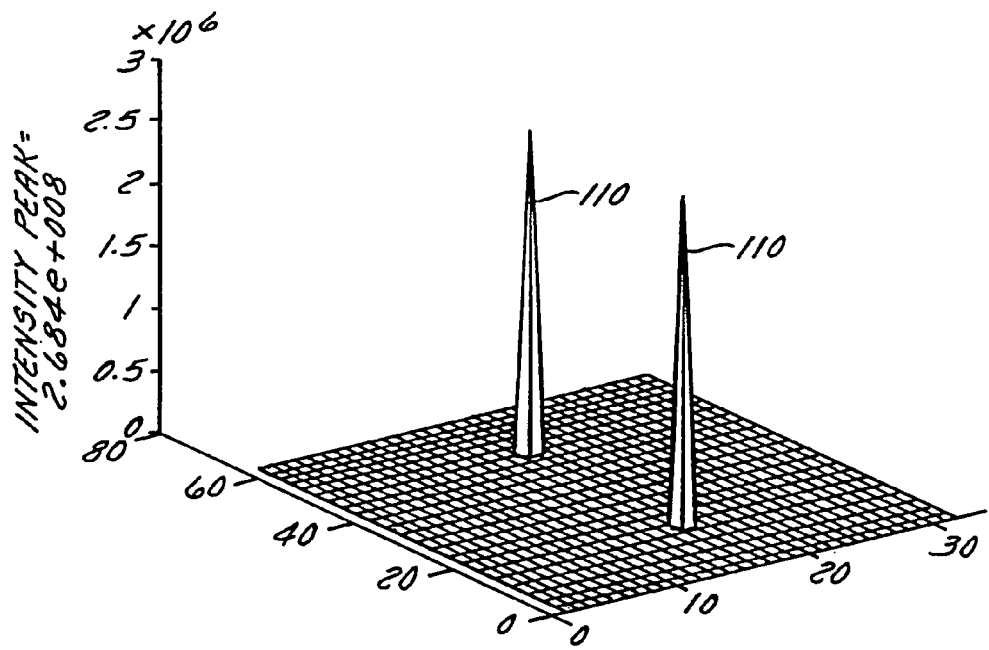
FIG. 53 is a perspective view of the spike-like correlation spots that result from correlation when the input and reference are identical.
Figure 54:
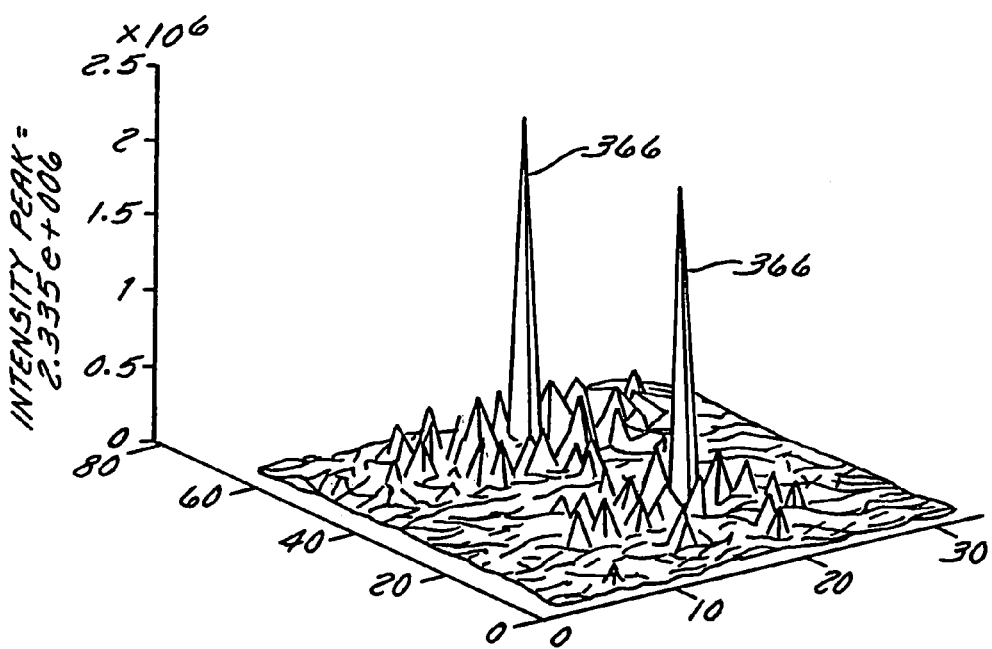
FIG. 54 depict a perspective view of spikes having a much lower magnitude that result from correlation when the input and reference are not identical.

The Fourier transform interference intensity detected by the camera 100 includes bias and interference terms, such as [FT{s(x,y)}]x[FT{R(x,y)}]*, where FT is the Fourier transform and the asterisk denotes phase conjugation. If a mask is designed to also have spatial frequencies higher than the spatial frequencies of the image, such as a pattern positioned under the mask, the camera will detect only the phase mask portion of the composite signal f(x,y)exp[j$\theta$(x,y)] produced by Fourier transforming the input mask pattern and the reference mask pattern.

Where the pattern of the input mask 84 and the pattern of the reference mask 88 are identical such that the input mask 84 is authentic, the power spectra and the inverse Fourier transform produce interference patterns that are straight fringes which correspond to the two peaks 110 shown in FIG. 53. When the masks are different, the interference patterns are wiggled and no such well defined peaks 366 exist. Such is shown in FIG. 54. Moreover, the magnitude of the peaks 366 is at least two orders of magnitude smaller than the peaks 110 making it relatively easy to verify authenticity in an automated fashion. Preferably, the analysis can produce a result where there is no peak where the input mask 84 is not authentic. This case is represented by reference numeral 108b in FIG. 1.

More specifically, the input mask 84 will be identified as authentic if the phase distribution of the input mask, $\theta$(x,y), is similar or identical to the phase distribution of the reference mask, q(x,y). Preferably, the correlator can be constructed to identify an input mask 84 as authentic if a significant portion of the input mask phase distribution, $\theta$(x,y), is similar or identical to the reference mask phase distribution, q(x,y).

In one preferred embodiment of the correlator shown in FIG. 30, the camera 100 is a CCD camera that can record an image that is 640 pixels by 480 pixels such that N=640 and a=10 μm. The separation, Δx, between the mask patterns, i.e. the masks 84 and 88, is 15 mm, the focal length, f, of the Fourier lens 98 is 17.5 cm, λ of the laser 90 is 514 nm, and the magnification, M, of the microscope objective lens 206 is 12. From Equation 2 above, the cross correlation peak should be centered at ξ=82. Referring to FIG. 53, a sharp peak will be produced at ξ=+Δ and at ξ=−Δ, among two side bands when the two mask patterns, $P_1$ and $P_2$, are identical while the center peak, at ξ=0 (not shown), remains.

However, it is desirable to compensate for the limited space-bandwidth product available in the input plane ($x_0,y_0$) that must be shared by the patterns from the input mask 84, the reference mask 88, and the gap, Δx, between them to ensure that the correlation patterns from the masks 84 and 88 are suitably separated from other undesired terms at the output plane ($x_P,y_P$). Additionally, other nonlinearities at the output plane exist. The result is that the phase information of the joint power spectrum at the output plane is nonlinear and the amount of nonlinearity can vary.

To compensate, the nonlinear joint transform correlator of this invention uses the nonlinearity at the Fourier plane ($x_P,y_P$) to nonlinearly transform the Fourier transform interference intensity. To adapt the correlator to digital processing and so digital SLMs can be used, the joint power spectrum recorded by the camera 100 is binarized into two values. Preferably, the joint power spectrum is transformed by various degrees of nonlinearity and represented in a binary format using a multiple level threshold function. For the case of a nonlinear matched filter, i.e. K=1 where K represents the magnitude of nonlinearity, the matched filter function is transformed by a general type of nonlinearity and represented in a binary format using a variable threshold function.

Referring, for example, to FIG. 34, the signal from the reference mask 88 is represented as r(x+$x_0$,y) and the signal from the input mask 84 is represented as s(x−$x_0$,y). The light distribution at the output plane is the interference between the Fourier transforms of the output image functions of the two masks 84 and 88. To compensate for the aforementioned nonlinearities, the Kozma model is applied to obtain the following corrected phase information of the joint power spectrum, in the first order Bessel harmonic term (v=1):

$$g_{1K}(E) = \frac{2\Gamma(k+1)[R(\alpha,\beta)S(\alpha,\beta)]^k}{\Gamma\left(1-\frac{v-k}{2}\right)\Gamma\left(1+\frac{v+k}{2}\right)} \quad \text{(Equation 26)}$$

$$\times \cos[2x+0\alpha+\phi_S(\alpha,\beta)-\phi_R(\alpha,\beta)]$$

where Γ is the Gamma function, R and S are the Fourier transforms of the aforementioned image functions, r(x+$x_0$,y) and s(x−$x_0$,y), $\Phi_R$ and $\Phi_S$ are their constant phases, α and β are their spatial frequencies, K=1 corresponds to a linear device, K=0 corresponds to a hard clipping nonlinearity, E is the interference intensity distribution, and $x_0$ is the image translation parameter. If the input mask signal and the reference mask signal are identical, Equation 26 can be simplified in the manner presented below:

$$g_{1K}(E) = \frac{2\Gamma(k+1)[R(\alpha,\beta)]^{2k}}{\Gamma\left(1-\frac{v-k}{2}\right)\Gamma\left(1+\frac{v+k}{2}\right)} \times \cos[2x_0\alpha] \quad \text{(Equation 27)}$$

and will produce the thresholded joint power spectrum for autocorrelation signals. It should be noted that varying the severity of the nonlinearity, K, will produce correlation signals with different characteristics. For highly nonlinear transformations, K is relatively small, high spatial frequencies are emphasized and the correlation becomes more sensitive to discrimination. Such a nonlinear transformation preferably is performed before performing the inverse Fourier transform and is particularly well suited for use where one or both of the masks 84 and/or 88 comprises an SLM.

Where a fingerprint is used as the information mask, a fingerprint window that is a morphological closing operation of the original amplitude fingerprint can be used to help increase discrimination of verification. Such a fingerprint window is particularly beneficial where a real time fingerprint is slightly angularly offset from the desired orientation of the fingerprint of the reference. In operation, the phase encoded fingerprint is multiplied by the fingerprint window.

Where the masks 84 and 88 do not lie in the same plane along the optical axis of the correlator, such as is depicted in FIGS. 42A and 42B, an additional quadratic phase term occurs in the input transmission function and must be resolved. In FIGS. 42A and 42B, the input transmission function comes from the reference mask 88. By resolving this quadratic phase term, the correlator is more flexible in use and operation and more simple in its fabrication.

A correlator where the input mask 84 and reference mask 88 are located in the same plane has an output contains three terms. One term is the sum of the autocorrelation of the signal or pattern from the input mask 84 and the autocorrelation of the signal or pattern from the reference mask 88 that is formed on the optical (DC) axis. The other two terms are the cross-correlation functions between the input mask signal and the reference mask signal that are diffracted off-axis. These two cross-correlation terms are positioned symmetrically from the optical axis, and they indicate the presence and location of the masks 84 and 88. Nonlinear transformations in the Fourier plane are used to improve the performance of the correlator.

The effect of the masks 84 and 88 lying in different planes is to encode the joint power spectrum with a different quadratic phase function or "chirp" function for each correlation term. As a result, the correlator has three output planes. The autocorrelation functions on the optical axis (DC terms) are focused onto one of the output planes. Referring to FIGS. 42A and 42B, such a correlator 340 is a chirp encoded joint transform correlator.

In a single input plane-single output plane correlator, such as is shown in FIGS. 30 and 32, both the signal from the reference mask 88 and the signal from the input mask 84 are located in the same input plane. For a reference mask phase signal, r(x+$x_0$,y) and an input signal s(x−$x_0$,y) the joint power spectrum is:

$$E(\alpha,\beta) = |I(\alpha,\beta)|^2 = \left|S\left(\frac{\alpha}{\lambda f},\frac{\beta}{\lambda f}\right)\right|^2 + \left|R\left(\frac{\alpha}{\lambda f},\frac{\beta}{\lambda f}\right)\right|^2 + \quad \text{(Equation 28)}$$

-continued $$S\left(\frac{\alpha}{\lambda f}, \frac{\beta}{\lambda ff}\right) R^*\left(\frac{\alpha}{\lambda f}, \frac{\beta}{\lambda f}\right) \exp\left(-j2x_0 \frac{\alpha}{\lambda f}\right) +$$

$$S^*\left(\frac{\alpha}{\lambda f}, \frac{\beta}{\lambda f}\right) R\left(\frac{\alpha}{\lambda f}, \frac{\beta}{\lambda f}\right) \exp\left(j2x_0 \frac{\alpha}{\lambda f}\right),$$

where $(\alpha,\beta)$ are the Fourier plane coordinates, $\lambda$ is the wavelength of the illuminating coherent light from the source 90, and f is the focal length of the Fourier lens 98. Here, $$R\left(\frac{\alpha}{\lambda f}, \frac{\beta}{\lambda f}\right), \text{ and } S\left(\frac{\alpha}{\lambda f}, \frac{\beta}{\lambda f}\right)$$

are the Fourier transforms of the input signal, r(x,y), and the reference signal, s(x,y), respectively:

$$R\left(\frac{\alpha}{\lambda f}, \frac{\beta}{\lambda f}\right) = \left|R\left(\frac{\alpha}{\lambda f}, \frac{\beta}{\lambda f}\right)\right| \exp\left[j\phi_r\left(\frac{\alpha}{\lambda f}, \frac{\beta}{\lambda f}\right)\right] \quad \text{(Equation 29)}$$

$$S\left(\frac{\alpha}{\lambda f}, \frac{\beta}{\lambda f}\right) = \left|S\left(\frac{\alpha}{\lambda f}, \frac{\beta}{\lambda f}\right)\right| \exp\left[j\phi_s\left(\frac{\alpha}{\lambda f}, \frac{\beta}{\lambda f}\right)\right],$$

In the case where the reference mask 88 and input mask 84 lie in the same plane, the correlator has a Fourier lens 98 that is placed behind the joint power spectrum plane to obtain the Fourier transform of Equation 28. The correlation signals are produced at the back focal plane of the lens 98. The first two terms of Equation 28 produce the autocorrelation functions of s(x,y) and r(x,y) on the optical axis. The third and fourth terms of Equation 28 produce the cross-correlation functions, which are separated by $2x_0$ from the optical axis.

The chirp encoded joint transform correlator of this invention can be implemented with an optically addressed SLM or a CCD array at the Fourier plane as the energy recording device. The reference signal and the input signal are located in different planes. The reference mask plane that contains the reference mask signal, $r(x+x_0,y)$ is spaced a distance, $d_r$, from the Fourier lens 98. The input mask plane that contains the input mask signal, $s(x-x_0,y)$ is spaced a distance, $d_s$, from the lens 98. For example, in FIGS. 42A and 42B, the distance, $d_s$, of the input mask signal from the Fourier lens 98 is greater than the distance, $d_r$, of the reference mask signal from the lens 98. The signals are Fourier transformed at the lens 98 and the interference between the Fourier transforms of the input signal and the reference signal at the input plane where the energy recording device 100 is located is:

$$I(\alpha, \beta) = \quad \text{(Equation 30)}$$

$$S\left(\frac{\alpha}{\lambda f}, \frac{\beta}{\lambda f}\right) \exp\left(-jx_0 \frac{\alpha}{\lambda f}\right) \exp\left\{j\frac{k}{2f}\left(1 - \frac{d_s}{f}\right)(\alpha^2 + \beta^2)\right\} +$$

$$R\left(\frac{\alpha}{\lambda f}, \frac{\beta}{\lambda f}\right) \exp\left(-jx_0 \frac{\alpha}{\lambda f}\right) \exp\left\{j\frac{k}{2f}\left(1 - \frac{d_s}{f}\right)(\alpha^2 + \beta^2)\right\},$$

where k is the corresponding wave number. The Fourier transform intensity distribution is obtained from the input device, which can be written as:

$$E(\alpha, \beta) = |I'(\alpha, \beta)|^2 = \left|S\left(\frac{\alpha}{\lambda f}, \frac{\beta}{\lambda f}\right)\right|^2 + \left|R\left(\frac{\alpha}{\lambda f}, \frac{\beta}{\lambda f}\right)\right|^2 + \quad \text{(Equation 31)}$$

$$S\left(\frac{\alpha}{\lambda f}, \frac{\beta}{\lambda f}\right) R^*\left(\frac{\alpha}{\lambda f}, \frac{\beta}{\lambda f}\right) \exp\left(-j2x_0 \frac{\alpha}{\lambda f}\right) \exp$$

$$\left\{j\frac{k}{2}f\left(\frac{d_r - d_s}{f}\right)(\alpha^2 + \beta^2)\right\} + S^*\left(\frac{\alpha}{\lambda f}, \frac{\beta}{\lambda f}\right) R\left(\frac{\alpha}{\lambda f}, \frac{\beta}{\lambda f}\right)$$

$$\exp\left(-j2x_0 \frac{\alpha}{\lambda f}\right) \exp\left\{j\frac{k}{2}f\left(\frac{d_r - d_s}{f}\right)(\alpha^2 + \beta^2)\right\},$$

where * indicates complex phase conjugation.

The difference between the joint power spectrum of a correlator where the input mask 84 and reference mask 88 lie in the same plane represented by Equation 28 and the joint power spectrum in Equation 31 is the quadratic phase functions $$\exp\left\{\pm j\frac{k}{2f}\left(\frac{d_r - d_s}{f}\right)(\alpha^2 + \beta^2)\right\},$$

which modulate the cross-power spectra of the reference signal and the input signal. The quadratic phase is in the form of a "chirp" signal.

A consequence of chirp phase encoding is that when a Fourier lens 98 is used to obtain the Fourier transform of Equation 31, the correlation signals are focused in different output planes. The transform lens 98 itself introduces a quadratic phase function. Fresnel diffraction that occurs introduces additional quadratic phase functions that are dependent upon on the distance the signal is from the lens 98. The output correlation functions are formed in the output planes where the phase functions become zero. This is illustrated in the following analysis.

The joint power spectrum, $E(\alpha,\beta)$ from the output of the recording device 100 can be Fourier transformed either optically or electronically. Assuming that a lens 98 with a focal length, f, is used, the light distribution at plane, $P_z$, located a distance z from the lens 98 is given by:

$$g(x', y') = \frac{\exp\{jkz\}}{j\lambda z} \exp\left\{j\frac{k}{2z}(x^2, y^2)\right\} FT \quad \text{(Equation 33)}$$

$$\left\{E(\alpha, \beta) \exp\left\{-j\frac{k}{2f}(\alpha^2, \beta^2)\right\} \exp\left\{j\frac{k}{2z}(\alpha^2, \beta^2)\right\}\right\},$$

where FT indicates the Fourier transform operator, and (x',y') are the coordinates of the plane, $P_z$. Here the Fourier transform is computed at frequencies scaled by $1/\lambda z$. Using the expression for the joint power spectrum of Equation 31, the output light distribution can be written as:

$$g(x', y') = \frac{\exp\{jkz\}}{j\lambda z} \exp\left\{j\frac{k}{2z}(x^2, y^2)\right\}$$

$$\left\{FT\left\{\left[\left|S\left(\frac{\alpha}{\lambda f}, \frac{\beta}{\lambda f}\right)\right|^2 + \left|R\left(\frac{\alpha}{\lambda f}, \frac{\beta}{\lambda f}\right)\right|^2\right] \cdot \exp\left[-j\left(\frac{k}{2f} \frac{k}{2z}\right)(\alpha^2 + \beta^2)\right]\right\} + \right.$$

$$FT\left\{S\left(\frac{\alpha}{\lambda f}, \frac{\beta}{\lambda f}\right) R^*\left(\frac{\alpha}{\lambda f}, \frac{\beta}{\lambda f}\right) \exp\left(-j2x_0 \frac{\alpha}{\lambda f}\right)\right.$$

-continued
$$\exp\left[+j\frac{k}{2f}\left(\frac{d_r-d_s}{f}-1+\frac{f}{z}\right)(\alpha^2+\beta^2)\right]+$$

$$FT\left\{S^*\left(\frac{\alpha}{\lambda f},\frac{\beta}{\lambda f}\right)R\left(\frac{\alpha}{\lambda f},\frac{\beta}{\lambda f}\right)\exp\left(j2x_0\frac{\alpha}{\lambda f}\right)\right.$$

$$\left.\exp\left[+j\frac{k}{2f}\left(\frac{d_r-d_s}{f}-1+\frac{f}{z}\right)(\alpha^2+\beta^2)\right]\right\},$$

where the Fourier transform is evaluated at $$\frac{x'}{\lambda z},\frac{y'}{\lambda z}.$$

The first term of Equation 33 will produce the autocorrelation terms, $s(x',y')\otimes s^*(x',y')$ and $r(x',y')\otimes r^*(x',y')$ where $\otimes$ denotes correlation. The sum of the autocorrelation of the input signal and the autocorrelation of the reference signal will appear in the plane behind the Fourier lens where the quadratic phase becomes zero, i.e. at $z_0=f$ or a distance f away from the lens. For real signals, the complex conjugate of the signal is equal to the signal.

The second and third terms of Equation 33 produce the cross-correlation terms between the input signal and the reference signal, i.e. $s(x',y')\otimes r^*(x',y')$ and $s^*(x',y')\otimes r(x',y')$. The cross-correlation terms are produced at different planes according to their corresponding quadratic phase modulations. To determine the plane in which each cross-correlation term appears, the corresponding quadratic phase term is set equal to zero. For the second term of Equation 33, the zero phase quadratic phase modulation is produced at:

$$\frac{d_r d_s}{f}-1+\frac{f}{z}=0 \quad \text{(Equation 34)}$$

The first cross correlation term is produced at the plane, $z_1$, away from the transform lens:

$$z_1=\frac{f^2}{f-(d_r-d_s)}. \quad \text{(Equation 35)}$$

The separation between the correlation function and the optical axis is given by:

$$x'_1=\frac{2x_0}{\lambda f}\lambda z_1=\frac{2x_0 f}{f-(d_r-d_s)}, \quad \text{(Equation 36)}$$

where $x_1$ and $z_1$ indicate the distance of the correlation term $s(x',y')\otimes r^*(x',y')$ from the optical axis and the transform lens, respectively.

Similarly, the other cross-correlation term, $s^*(x',y')\otimes r(x',y')$, is produced behind the lens in the plane where the quadratic phase modulation is zero:

$$z_2=\frac{f^2}{f+(d_r-d_s)}. \quad \text{(Equation 37)}$$

In this case, the separation between the correlation function and the optical axis is given by:

$$x'_2=-\frac{2x_0\lambda z_2}{\lambda f}=-\frac{2x_0 f}{f+(d_r-d_s)}. \quad \text{(Equation 38)}$$

When $d_r>d_s$ and $f>d_r-d_s$, the correlation planes are located at planes $z_2<f<z_1$.

When $d_r=d_s$, the single input plane-single output plane correlator is obtained. The correlation planes coincide and all outputs are formed in one plane, i.e. $z_2=z_1=f$. In this case, the separation of the correlation signals from the optical axis becomes equal to $2x_0$.

When $d_r \neq d_s$, the various terms of the joint power spectrum produce their corresponding correlation signals at different planes along the optical axis. The autocorrelation functions produced by the self product terms of the joint power spectrum $[s(x',y')\otimes s^*(x',y')+r(x',y')\otimes r^*(x',y')]$ are separated along the optical axis from the cross-correlation functions produced by the cross-product terms of the joint power spectrum $[s^*(x',y')\otimes r(x',y')$ and $s(x',y')\otimes r^*(x',y')]$.

At the output plane, $P_z$, located at $z=z_1$ (see Equation 35) from the lens, the correlation signal $s(x',y')\otimes r^*(x',y')$ is obtained. The other terms $[s^*(x',y')\otimes s^*(x',y')$, $r^*(x',y')\otimes r^*(x',y')$ and $s^*(x',y')\otimes r(x',y')]$ are out of focus in this plane because of the non-zero quadratic phase modulation of the spectrum. Their corresponding correlation signal intensities are relatively small compared to that of the desired correlation signal $s^*(x',y')\otimes r^*(x',y')$.

For example, consider a single input plane, single output plane correlator where the input mask 84 and reference mask 88 are located in the same plane. Nonlinear transformation is applied to the joint power spectrum to obtain a nonlinear joint transform correlation. The effect of the nonlinearity is to produce high peak intensity, large peak-to-sidelobe ratio, and narrow correlation width. For the chirp encoded correlator, each term of the joint power spectrum produces a correlation function in a different output plane. The nonlinear transformation of the joint power spectrum improves correlation shape in each output plane. The nonlinear characteristic is denoted by g(E) where E is the Fourier transform interference intensity. An expression for the nonlinearly transformed interference intensity is:

$$g(E) = \sum_{v=0}^{\infty} H_v \left[ \left| R\left(\frac{\alpha}{\lambda f}, \frac{\beta}{\lambda f}\right) \right|, \left| S\left(\frac{\alpha}{\lambda f}, \frac{\beta}{\lambda f}\right) \right| \right]$$ (Equation 39)

$$\cos \left\{ 2vx_0 \frac{\alpha}{\lambda f} + v\phi_s\left(\frac{\alpha}{\lambda f}, \frac{\beta}{\lambda f}\right) - v\phi_r\left(\frac{\alpha}{\lambda f}, \frac{\beta}{\lambda f}\right) + v\left[\frac{k}{2f} \cdot \frac{d_s - d_r}{f} \cdot (\alpha^2 + \beta^2)\right] \right\},$$

where (Equation 40)

$$H_v \left[ \left| R\left(\frac{\alpha}{\lambda f}, \frac{\beta}{\lambda f}\right) \right|, \left| S\left(\frac{\alpha}{\lambda f}, \frac{\beta}{\lambda f}\right) \right| \right] =$$

$$\frac{\varepsilon_v}{2\pi}(i)^v \times G(\omega) \exp\left\{ i\omega \left[ \left| R\left(\frac{\alpha}{\lambda f}, \frac{\beta}{\lambda f}\right) \right|^2 + \left| S\left(\frac{\alpha}{\lambda f}, \frac{\beta}{\lambda f}\right) \right|^2 \right] \right\}$$

$$J_v\left[ 2\omega \left| R\left(\frac{\alpha}{\lambda f}, \frac{\beta}{\lambda f}\right) \right| \left| S\left(\frac{\alpha}{\lambda f}, \frac{\beta}{\lambda f}\right) \right| \right] d\omega.$$

Here, $$\varepsilon_v \left\{ \begin{matrix} 1, v = 0 \\ 2, v > 0 \end{matrix}, \right\}$$

and $J_v$ is a Bessel function of the first kind, order V, and $G(\omega)$ is the Fourier transform of the nonlinearity.

Note that Equation 39 is similar to the expression of the output of the Fourier plane nonlinearity in the case of a single input plane, single output plane correlator, except that a quadratic phase term, $$v\left[ \frac{k}{2f} \cdot \frac{d_s - d_r}{f} \cdot (\alpha^2 + \beta^2) \right]$$

is introduced in the argument of the cosine function. When the separation of the two input planes is zero, Equation 39 is the same as the expression for a correlator where the images of the input mask 84 and reference mask 88 are in the same plane. In both cases, for v=1, the nonlinear system can preserve the correct phase of the cross-correlation term $$\left[ \phi_s\left(\frac{\alpha}{\lambda f}, \frac{\beta}{\lambda f}\right) - \phi_r\left(\frac{\alpha}{\lambda f}, \frac{\beta}{\lambda f}\right) \right]$$

and only the amplitude is affected. For same input plane, same output plane correlator, two symmetric correlation signals appear at the same plane in the back focal plane of the Fourier lens 98. However, for the chirp encoded correlator, the correlation signals are located at different planes because of the phase modulation $$\left[ \frac{k}{2f} \cdot \frac{d_s - d_r}{f} \cdot (\alpha^2 + \beta^2) \right].$$

The locations of the correlation peaks are given by Equations 36–38. For the same input plane, same output plane correlator, each harmonic term is phase modulated by v times the Fourier phase difference of the input signal and the reference signal. The higher order correlation signals are diffracted to $2vx_0$, and they are at the same output plane. However, for the chirp encoded correlator, the various higher order correlation signals are produced at the different output planes as a result of the different quadratic phase modulations applied to each harmonic term.

The position of the higher order harmonics can be derived by substituting g(E) (see Equation 39) for $E(\alpha,\beta)$ in Equation 32 and letting the corresponding quadratic phase terms go to zero. To find the vth-order correlation signal for the $s(x',y') \otimes r^*(x',y')$ term, we have:

$$v\frac{k}{2f}\left(\frac{d_s - d_r}{f}\right) + \frac{f}{2z} - \frac{k}{2f} = 0.$$ (Equation 41)

The various orders of the correlation terms are produced at planes, $z_1$, away from the transform lens:

$$z_1 = \frac{f^2}{f - v(d_r - d_s)}.$$ (Equation 42)

Note that $z_1$ is dependent on the harmonic order, v. The separation of the correlation function from the optical axis is given by:

$$x'_1 = \frac{2x_0}{\lambda f}\lambda z_1 = \frac{2x_0 f}{f - v(d_r - d_s)}.$$ (Equation 43)

Similarly, the vth order correlation signal for $[s^*(x',y') \otimes r(x',y')]$ is produced behind the lens at the plane:

In this case, the separation of the correlation function from the optical axis is:

$$z_2 = \frac{f^2}{f + v(d_r - d_s)}.$$ (Equation 44)

$$x'_2 = -\frac{2x_0 \lambda z_2}{\lambda f} = -\frac{2x_0 f}{f + v(d_r - d_s)}.$$ (Equation 45)

For the first order harmonic term, v=1 in Equations 42 through 45, the same results are obtained. Thus, the location of the first order correlation signal for the chirp encoded correlator is the same as in the linear case. The nonlinear, transformation of the joint power spectrum sharpens the correlation peaks of interest and spreads out the diffused correlation signal functions.

For a quadratic phase encoded binary joint transform correlator, only the first order correlation term is present at the output plane of interest. This may result in an increase in the correlation peak-to-sidelobe ratio. The higher order harmonic terms are produced in the other different output planes. The formation of these terms in different output planes reduces the overlap of the on-axis autocorrelation (DC) terms and the off-axis cross-correlation terms. Where the input mask 84 and the reference mask 88 are the same, the output at the cross-correlation plane will have the characteristic correlation spike 110. Where they are different, the spike 110 will be lacking.

To make the correlator of this invention invariant with respect to rotation, scale, and level of illumination, the authentication system 80 of this invention preferably is based on a special correlation algorithm that provides feature extraction when implemented using a joint Fourier transform correlator. A circular correlation is performed between the two-dimensional label pattern, i.e. reference mask 88, and its copy, i.e. input mask 84, rotated by angle η. This correlation is rotation invariant and can be expressed as:

$$C(x, y, \phi) = \int_{\infty}^{\infty} \int_{\infty}^{\infty} f^*(x - x', y - y')$$
$$f(x'\cos\phi + y'\cos\phi - x'\sin\phi + y'\sin\phi)\,dx'\,dy'.$$
(Equation 46)

For an arbitrary label or mask, the specific shape of the function C depends on the intrinsic label or mask structure. Therefore, the above function may provide a mask or label description without any reference pattern.

The rotation and scale invariance of the label or mask pattern circular correlation can be evaluated based on the following equation:

$$X^{(i)} = \frac{N(\phi_i)}{N(0)} = \frac{\sum_{k,l} 0.5\{\text{sign}[\hat{C}(x_k, y_k, \phi_i) - T_i] + 1\}}{\sum_{k,l} 0.5\{\text{sign}[\hat{C}(x_k, y_k, 0) - T_i] + 1\}},$$
(Equation 47)

where $C(x_k, y_k, \eta_i)$ are sampled values of C, $T_i$ is a threshold, and $N(\eta_i)$ is the number of samples whose values exceed the threshold $T_i$, and normalizing function $C(x,y,\eta)$ to $C(0,0,0)$, i.e. the central peak value of the auto-correlation. Since changes of the object scale and orientation result in proportional changes of $N(\eta)$ and $N(0)$, normalizing to $C(0,0,0)$ makes the features of Equation 47 above invariant to scale and orientation of the input angle. The circular correlation distribution is merely displaced with the initial image shift, its shape being unchanged, so the features of Equation 47 are shift-invariant. Note that different pseudo-random masks for product labeling can be designed to provide specific values of the features $N(\eta_i)$. For instance, the correlation maximum will exceed the threshold angle, Ti, at the angle, $\eta_i$, for the ith label only.

Preferably, label or mask verification will be illumination independent by nonlinear thresholding of the joint power spectrum. The component of transmittance that generates the first order cross-correlation signal (JPS) between the reference r(x−x₀,y) and the input label or mask, a·s(x+x0,y) is:

$$g(\alpha, \beta) = \frac{2}{\pi}\left\{1 - \left[\frac{R^2(\alpha, \beta) + a^2 S^2(\alpha, \beta) - E_r}{2ar(\alpha, \beta)S(\alpha, \beta)}\right]^2\right\}^{1/2}$$
$$\cos[2x_o\alpha + \phi_s(\alpha, \beta)],$$
(Equation 48)

here a is the illumination coefficient, α and β are angular spatial frequency coordinates, R(α,β) are their amplitudes, and $\phi_R(\alpha,\beta)$ and $\phi_S(\alpha,\beta)$ are the phases of the Fourier transforms of r and s, respectively, and $E_r$ is the threshold value.

The largest correlation peak is obtained when the threshold value used for binarization of the JPS is:

$$E_r = R^2(\alpha,\beta) + \alpha^2 S^2(\alpha,\beta)$$
(Equation 49)

In that case, the illumination dependence of the JPS disappears and the JPS (Equation 48) can be expressed as:

$$q'(\alpha, \beta) = \frac{1}{\pi}\exp[j\phi_s(\alpha, \beta)] \times \exp[-j\phi_R(\alpha, \beta)]\exp[j2x_o\alpha].$$
(Equation 50)

The result is that Equation 50 above shows that the JPS after nonlinear thresholding does not depend on the level of illumination, a, of the label or mask. Additional benefits of this nonlinear thresholding approach is that intermodulation and DC terms are eliminated.

As a result of the above discussed novel correlation methods, the correlator of this novel authenticator system 80 can be constructed of relatively inexpensive components. This is because a correlator using the above novel method is advantageously invariant with respect to scale, rotation and illumination, which is very important for preserving the accuracy of optical correlation processing.

The novel correlation methods discussed in Sections VII and VIII herein are preferably implemented in software that is executed during operator authentication system 80, such as by a processor of computer 194, by a digital signal processing engine that is part of or separate from the computer 194, or a combination thereof. Such software can be written in a programming language such as Fortran, Pascal, C, Matlab or another programming language capable of being used for digital signal processing applications.

It is also to be understood that, although the foregoing description and drawings describe and illustrate in detail preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. An authentication system comprising:
an input carried by an object;
a reference against which the input is correlated; and
a correlator that correlates the input against the reference to verify whether the input is authentic;
wherein one of the input and the reference comprises a phase volume mask having a plurality of pairs of phase volume structures;
wherein the other of the input and reference comprises a spatial light modulator; and
wherein the spatial light modulator comprises a liquid crystal panel having an array of pixels each of whose phase can be selectively varied.

2. The authentication system of claim 1 further comprising a processor operably connected to the liquid crystal panel for controlling the phase of each of its elements.

3. The authentication system of claim 1 wherein the correlator comprises a source of light that illuminates the input and the reference, a charge-couple-device camera, a Fourier lens disposed between the camera and the input and the reference, a processor operably connected to the camera for analyzing a joint power spectrum of light from both the input and the reference containing a Fourier interference pattern to determine whether the input is authentic; and wherein the reference comprises a spatial light modulator that is operably connected to a processor that provides the spatial light modulator with a phase pattern of a plurality of phase patterns stored in a database of phase patterns accessible by the processor.

4. The authentication system of claim 3 wherein the processor operably connected to the camera is also the processor that is operably connected to the spatial light modulator.

5. An authentication system comprising:
an input carried by an object;
a reference against which the input is correlated; and
a correlator that correlates the input against the reference to verify whether the input is authentic;
wherein one of the input and the reference comprises a phase volume mask having a plurality of pairs of phase volume structures;
wherein the other of the input and reference comprises a spatial light modulator;
wherein the spatial light modulator comprises a liquid crystal panel having an array of pixels each of whose phase can be selectively varied; and
further comprising a processor operably connected to the liquid crystal panel for controlling the phase of each of its elements;
wherein the phase of each pixel can be selectively varied from a phase of zero, where light transmittance is a minimum, to a phase of 255, where light transmittance is a maximum.

6. An authentication system comprising:
an input carried by an object;
a reference against which the input is correlated; and
a correlator that correlates the input against the reference to verify whether the input is authentic;
wherein the correlator comprises:
a housing;
a light source;
a pair of aperture windows with one of the aperture windows for receiving the input and the other of the aperture windows for receiving the reference wherein the aperture windows are spaced apart so as to space the input a distance from the reference;
a parabolic mirror disposed optically between the light source and the aperture windows;
a beam splitter disposed optically between the parabolic mirror and the aperture windows;
an energy recording device;
a Fourier lens disposed optically between the aperture windows and the energy recording device; and
wherein the light source is carried by the housing and acutely angled relative to the parabolic mirror so as to position the light source inboard of the parabolic mirror, the beam splitter, the Fourier lens, the aperture windows, and the energy recording device.

7. The authentication system of claim 6 further comprising a terminal carrying the biometric scanner and a card carrying the phase volume mask wherein the terminal has a slot for receiving at least a portion of the card.

8. An authentication system comprising:
an input carried by an object;
a reference against which the input is correlated; and
a correlator that correlates the input against the reference to verify whether the input is authentic;
wherein the correlator comprises;
a light source that produces a beam of light that illuminates the input and the reference;
an energy recording device disposed optically between 1) the light source and 2) the reference and the input;
a Fourier lens disposed optically between 1) the energy recording device and 2) the reference and the input;
a biometric scanner operably for scanning a biometric feature of a person;
wherein the input and the reference are spaced apart; and
wherein 1) the one of the input and the reference comprises a spatial light modulator that is connected to the biometric scanner for displaying a phase pattern comprising the biometric feature scanned by the biometric scanner and 2) the other of the input and the reference comprises a phase volume mask that includes a biometric pattern phase encoded therein.

9. The authentication system of claim 8 wherein the biometric scanner comprises a fingerprint scanner electrically connected to the spatial light modulator.

10. The authentication system of claim 8 wherein the spatial light modulator comprises the reference and the phase volume mask comprises the input.

11. The authentication system of claim 8 further comprising a beam splitter disposed optically between 1) the light source and 2) the reference and the input.

12. The authentication system of claim 11 wherein the correlator comprises a reflection-mode correlator.

13. The authentication system of claim 8 further comprising:
a processor operably connected to the spatial light modulator for providing the spatial light encoder with a random phase pattern that scrambles the scanned biometric pattern; and
wherein the phase volume mask further comprises a random phase pattern that scrambles the biometric pattern phase encoded therein.

14. The authentication system of claim 13 wherein the random phase pattern and biometric pattern are convolved to integrate the patterns so that the biometric pattern is scrambled by the random phase pattern such that the biometric pattern cannot be visually discerned when viewing the phase volume mask.

* * * * *